(12) United States Patent
Nishi et al.

(10) Patent No.: US 11,109,031 B2
(45) Date of Patent: Aug. 31, 2021

(54) DECODER, ENCODER, DECODING METHOD, AND ENCODING METHOD

(71) Applicant: Panasonic Intellectual Property Corporation of America, Torrance, CA (US)

(72) Inventors: Takahiro Nishi, Nara (JP); Tadamasa Toma, Osaka (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 0 days.

(21) Appl. No.: 16/240,055

(22) Filed: Jan. 4, 2019

(65) Prior Publication Data

US 2019/0141328 A1 May 9, 2019

Related U.S. Application Data

(63) Continuation of application No. PCT/JP2017/024624, filed on Jul. 5, 2017.

(Continued)

(51) Int. Cl.
| | |
|---|---|
| *H04B 1/66* | (2006.01) |
| *H04N 7/12* | (2006.01) |
| *H04N 11/02* | (2006.01) |
| *H04N 11/04* | (2006.01) |
| *H04N 19/126* | (2014.01) |
| *H04N 19/176* | (2014.01) |
| *H04N 19/137* | (2014.01) |

(Continued)

(52) U.S. Cl.
CPC ......... *H04N 19/126* (2014.11); *H04N 19/119* (2014.11); *H04N 19/137* (2014.11); *H04N 19/176* (2014.11); *H04N 19/517* (2014.11)

(58) Field of Classification Search
CPC .. H04N 19/115; H04N 19/119; H04N 19/137; H04N 19/176
See application file for complete search history.

(56) References Cited

U.S. PATENT DOCUMENTS

| | | | |
|---|---|---|---|
| 5,251,028 A | 10/1993 | Iu | |
| 9,986,236 B1* | 5/2018 | Mukherjee | ........... H04N 19/105 |

(Continued)

FOREIGN PATENT DOCUMENTS

| | | |
|---|---|---|
| JP | 6-6784 | 1/1994 |
| JP | 6-217292 | 8/1994 |

(Continued)

OTHER PUBLICATIONS

International Search Report (ISR) dated Oct. 10, 2017 in International (PCT) Application No. PCT/JP2017/024624.

(Continued)

*Primary Examiner* — Fabio S Lima

(74) *Attorney, Agent, or Firm* — Wenderoth, Lind & Ponack, L.L.P.

(57) ABSTRACT

An image decoder includes: a processor; and a memory. Using the memory, the processor obtains motion vectors of sub-blocks obtained by splitting a current frame; determines, for each of processing blocks obtained by splitting the current frame, quantization control to be performed on the processing block; and inversely quantizes each of the processing blocks by the quantization control determined for the processing block.

8 Claims, 37 Drawing Sheets

Related U.S. Application Data

(60) Provisional application No. 62/361,836, filed on Jul. 13, 2016.

(51) Int. Cl.
*H04N 19/517* (2014.01)
*H04N 19/119* (2014.01)

(56) References Cited

U.S. PATENT DOCUMENTS

| | | | |
|---|---|---|---|
| 2004/0158719 A1* | 8/2004 | Lee | H04N 19/124 713/176 |
| 2005/0243917 A1* | 11/2005 | Lee | H04N 19/137 375/240.03 |
| 2007/0074266 A1* | 3/2007 | Raveendran | H04N 5/144 725/135 |
| 2008/0192823 A1* | 8/2008 | Wang | H04N 19/197 375/240.03 |
| 2009/0097551 A1* | 4/2009 | Zhang | H04N 19/172 375/240.03 |
| 2009/0141938 A1* | 6/2009 | Lim | G06K 9/00664 382/103 |
| 2009/0290809 A1* | 11/2009 | Yamada | G06T 7/215 382/266 |
| 2011/0002383 A1* | 1/2011 | Yoshida | H04N 19/115 375/240.12 |
| 2011/0273449 A1* | 11/2011 | Kiuchi | G09G 3/2022 345/426 |
| 2018/0160113 A1* | 6/2018 | Jeong | H04N 19/593 |
| 2020/0084452 A1* | 3/2020 | Liao | H04N 19/159 |

FOREIGN PATENT DOCUMENTS

| | | | |
|---|---|---|---|
| JP | 8-331557 | | 12/1996 |
| JP | 2004-248285 | | 9/2004 |
| JP | 2011-130050 | | 6/2011 |
| JP | 2011130050 | A * | 6/2011 |
| JP | 2012-54759 | | 3/2012 |

OTHER PUBLICATIONS

ITU-T Recommendation H.265, "High efficiency video coding", Apr. 2015.

* cited by examiner

FIG. 3

| TRANSFORM TYPE | BASIS FUNCTION $T_i(j)$, $i, j = 0, 1, ..., N-1$ |
|---|---|
| DCT-II | $T_i(j) = \omega_0 \cdot \sqrt{\dfrac{2}{N}} \cdot \cos\left(\dfrac{\pi \cdot i \cdot (2j+1)}{2N}\right)$<br>WHERE $\omega_0 = \begin{cases} \sqrt{\dfrac{2}{N}} & i = 0 \\ 1 & i \neq 0 \end{cases}$ |
| DCT-V | $T_i(j) = \omega_0 \cdot \omega_1 \cdot \sqrt{\dfrac{2}{2N-1}} \cdot \cos\left(\dfrac{2\pi \cdot i \cdot j}{2N-1}\right)$<br>WHERE $\omega_0 = \begin{cases} \sqrt{\dfrac{2}{N}} & i = 0 \\ 1 & i \neq 0 \end{cases}$, $\omega_1 = \begin{cases} \sqrt{\dfrac{2}{N}} & j = 0 \\ 1 & j \neq 0 \end{cases}$ |
| DCT-VIII | $T_i(j) = \sqrt{\dfrac{4}{2N+1}} \cdot \cos\left(\dfrac{\pi \cdot (2i+1) \cdot (2j+1)}{4N+2}\right)$ |
| DST-I | $T_i(j) = \sqrt{\dfrac{2}{N+1}} \cdot \sin\left(\dfrac{\pi \cdot (i+1) \cdot (j+1)}{N+1}\right)$ |
| DST-VII | $T_i(j) = \sqrt{\dfrac{4}{2N+1}} \cdot \sin\left(\dfrac{\pi \cdot (2i+1) \cdot (j+1)}{2N+1}\right)$ |

DECODER, ENCODER, DECODING METHOD, AND ENCODING METHOD

CROSS REFERENCE TO RELATED APPLICATIONS

This application is a U.S. continuation application of PCT International Patent Application Number PCT/JP2017/024624 filed on Jul. 5, 2017, claiming the benefit of priority of U.S. Provisional Patent Application No. 62/361,836 filed on Jul. 13, 2016, the entire contents of which are hereby incorporated by reference.

BACKGROUND

1. Technical Field

The present disclosure relates to a decoder, an encoder, a decoding method, and an encoding method.

2. Description of the Related Art

In the High Efficiency Video Coding (HEVC) standard which is the latest video encoding standard, various examinations have been made in order to improve encoding efficiency (for example, see ITU-T Recommendation H.265 "High efficiency video coding", April, 2015). The method is based on the International Telecommunication Union Telecommunication Standardization Sector (ITU-T) standard indicated by H.26x and the International Organization for Standardization/International Electrotechnical Commission (ISO/IEC) standard indicated by MPEG-x, and has been examined as the next image encoding standard subsequent to the standard indicated by H.264/AVC or MPEG-4 AVC.

SUMMARY

There has been a demand for such an encoding method and a decoding method to achieve further improvement.

An object of the present disclosure is to provide a decoder, an encoder, a decoding method, and an encoding method which can achieve further improvement.

To achieve the above object, a decoder according to an aspect of the present disclosure includes: a processor; and a memory. Using the memory, the processor: obtains motion vectors of sub-blocks obtained by splitting a current frame; determines, based on the motion vectors, for each of processing blocks obtained by splitting the current frame, quantization control to be performed on the processing block; and inversely quantizes each of the processing blocks by the quantization control determined for the processing block.

Furthermore, an encoder according to an aspect of the present disclosure includes: a processor; and a memory. Using the memory, the processor: obtains motion vectors of sub-blocks obtained by splitting a current frame; determines, based on the motion vectors, for each of processing blocks obtained by splitting the current frame, quantization control to be performed on the processing block; and quantizes or inversely quantizes each of the processing blocks by the quantization control determined for the processing block.

These general and specific aspects may be implemented using a system, a method, an integrated circuit, a computer program, or a computer-readable recording medium such as a CD-ROM, or any combination of systems, methods, integrated circuits, computer programs, or recording media.

The present disclosure provides a decoder, an encoder, a decoding method, and an encoding method which can achieve further improvement.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 3 is a chart indicating transform basis functions for each transform type;

DETAILED DESCRIPTION OF THE EMBODIMENTS

Figure 1:
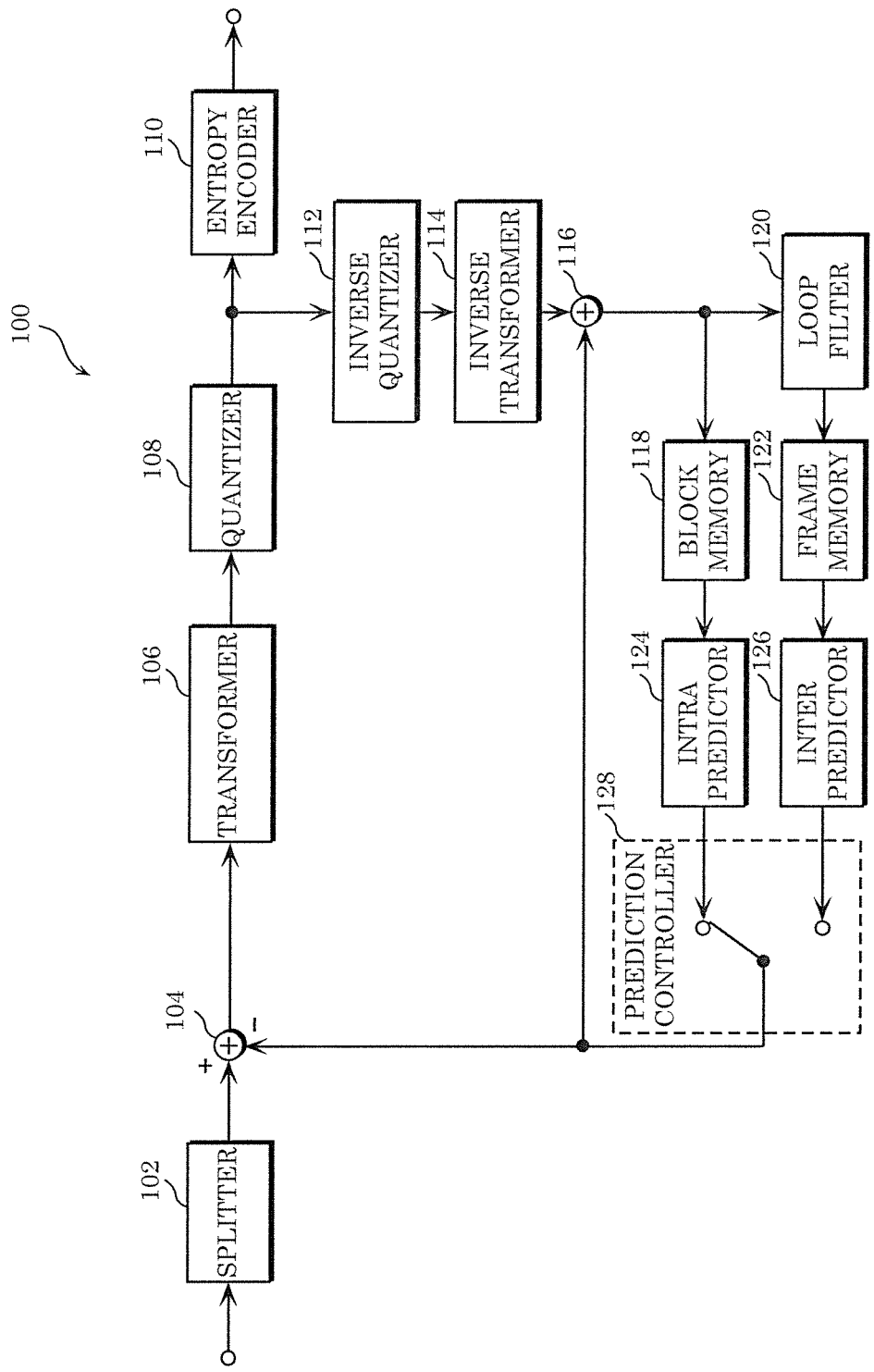
FIG. 1 is a block diagram illustrating a functional configuration of the encoder according to Embodiment 1.

An image decoding method according to an aspect of the present disclosure includes: obtaining, for each of processing units obtained by splitting a current frame, motion vectors assigned to the processing unit; selecting, for each of small regions obtained by splitting a processing unit among the processing units, a motion vector to be used from among the motion vectors assigned to the processing unit, based on the motion vectors and reference frames at different times; generating, for each of the small regions, a predicted image using the motion vector selected for the small region; and decoding each of the small regions using the predicted image generated for the small region.

According to this, an image decoder can select a motion vector to be used for a small region, from among a plurality of motion vectors associated with a processing unit. This allows different motion vectors to be used for a plurality of small regions included in a processing unit. It is not necessary to include, in an encoded bitstream, information for designating a motion vector for each small region, and thus an increase in the data volume of the encoded bitstream can be inhibited. Thus, the image decoding method improves encoding efficiency.

For example, the reference frames may include a first frame and a second frame, and in selecting the motion vector, a correlation between a region on the first frame and a region on the second frame may be obtained for each of the motion vectors, the region on the first frame and the region on the second frame being indicated by the motion vector from a current small region included in the current frame, and the motion vector to be used may be selected based on the correlations obtained for the motion vectors.

For example, the motion vectors may include a background vector indicating background motion, and a foreground vector indicating foreground motion.

For example, in selecting the motion vector, the background vector may be selected when a correlation between regions indicated by the background vector and a correlation between regions indicated by the foreground vector are each lower than a predetermined value.

According to this, a region covered by a foreground in a reference frame, for instance, can be determined to be a background region, and thus an appropriate motion vector can be selected.

For example, in generating the predicted image, when the correlation between the regions indicated by the background vector and the correlation between the regions indicated by the foreground vector are each lower than the predetermined value, the predicted image may be generated using a region that belongs to a background, among a first region on the first frame and a second region on the second frame, the first region and the second region being indicated by the background vector.

According to this, an appropriate predicted image can be generated also for a region covered by the foreground in a reference frame, for instance.

For example, in generating the predicted image, one of the first region and the second region may be determined to belong to the background when a corresponding point which is a region on the current frame belongs to the background, the corresponding point being indicated by the foreground vector from the one of the first region and the second region.

According to this, it can be appropriately determined whether a region on a reference frame indicated by a background vector is a background region or a foreground region.

For example, in generating the predicted image, when neither the first region nor the second region belongs to the background, a predicted image of a current small region within the current frame may be generated using a predicted image of a region near the current small region.

Accordingly, a predicted image can be generated even in the case where appropriate reference cannot be made.

An image encoding method according to an aspect of the present disclosure includes: detecting, for each of processing units obtained by splitting a current frame, motion vectors to be assigned to the processing unit; selecting, for each of small regions obtained by splitting a processing unit among the processing units, a motion vector to be used from among the motion vectors assigned to the processing unit, based on the motion vectors and reference frames at different times; generating, for each of the small regions, a predicted image using the motion vector selected for the small region; and encoding each of the small regions using the predicted image generated for the small region.

According to this, an image decoder can select a motion vector to be used for a small region, from among a plurality of motion vectors associated with a processing unit. This allows different motion vectors to be used for a plurality of small regions included in a processing unit. It is not necessary to include, in an encoded bitstream, information for designating a motion vector for each small region, and thus an increase in the data volume of the encoded bitstream can be inhibited. Thus, the image encoding method improves encoding efficiency.

For example, the reference frames may include a first frame and a second frame, and in selecting the motion vector, a correlation between a region on the first frame and a region on the second frame may be obtained for each of the motion vectors, the region on the first frame and the region on the second frame being indicated by the motion vector from a current small region included in the current frame, and the motion vector to be used may be selected based on the correlations obtained for the motion vectors.

For example, the motion vectors may include a background vector indicating background motion, and a foreground vector indicating foreground motion.

For example, in selecting the motion vector, the background vector may be selected when a correlation between regions indicated by the background vector and a correlation between regions indicated by the foreground vector are each lower than a predetermined value.

According to this, a region covered by a foreground in a reference frame, for instance, can be determined to be a background region, and thus an appropriate motion vector can be selected.

For example, in generating the predicted image, when the correlation between the regions indicated by the background vector and the correlation between the regions indicated by the foreground vector are each lower than the predetermined value, the predicted image may be generated using a region that belongs to a background, among a first region on the first frame and a second region on the second frame, the first region and the second region being indicated by the background vector.

According to this, an appropriate predicted image can be generated also for a region covered by the foreground in a reference frame, for instance.

For example, in generating the predicted image, one of the first region and the second region may be determined to belong to the background when a corresponding point which is a region on the current frame belongs to the background, the corresponding point being indicated by the foreground vector from the one of the first region and the second region.

According to this, it can be appropriately determined whether a region on a reference frame indicated by a background vector is a background region or a foreground region.

For example, when neither the first region nor the second region belongs to the background, a predicted image of a current small region within the current frame may be generated using a predicted image of a region near the current small region.

Accordingly, a predicted image can be generated even in the case where appropriate reference cannot be made.

An image decoder according to an aspect of the present disclosure includes: processing circuitry; and storage accessible from the processing circuitry. The processing circuitry performs the image decoding method, using the storage.

An image decoder according to an aspect of the present disclosure includes: an obtainer which obtains, for each of processing units obtained by splitting a current frame, motion vectors assigned to the processing unit; a selector which selects, for each of small regions obtained by splitting a processing unit among the processing units, a motion vector to be used from among the motion vectors assigned to the processing unit, based on the motion vectors and reference frames at different times; a generator which generates, for each of the small regions, a predicted image using the motion vector selected for the small region; and a decoder which decodes each of the small regions using the predicted image generated for the small region.

An image encoder according to an aspect of the present disclosure includes: processing circuitry; and storage accessible from the processing circuitry. The processing circuitry performs the image encoding method, using the storage.

An image encoder according to an aspect of the present disclosure includes: a detector which detects, for each of processing units obtained by splitting a current frame, motion vectors to be assigned to the processing unit; a selector which selects, for each of small regions obtained by splitting a processing unit among the processing units, a motion vector to be used from among the motion vectors assigned to the processing unit, based on the motion vectors and reference frames at different times; a generator which generates, for each of the small regions, a predicted image using the motion vector selected for the small region; and an encoder which encodes each of the small regions using the predicted image generated for the small region.

An image encoder/decoder according to an aspect of the present disclosure includes the image decoder, and the image encoder.

A decoder according to an aspect of the present disclosure includes: a processor; and a memory. Using the memory, the processor: obtains motion vectors of sub-blocks obtained by splitting a current frame; determines, based on the motion vectors, for each of processing blocks obtained by splitting the current frame, quantization control to be performed on the processing block; and inversely quantizes each of the processing blocks by the quantization control determined for the processing block.

According to this, an encoder does not need to transmit, to the decoder, information indicating change of quantization control, and thus the amount of data of an encoded stream can be decreased. Accordingly, encoding efficiency can be improved.

For example, the motion vectors may be obtained by calculation performed using decoded frames.

For example, in determining the quantization control, a boundary region between a foreground and a background may be located based on the motion vectors, and the quantization control may be determined for each of the processing blocks according to whether the processing block is included in the boundary region.

According to this, blocks can be quantized in a manner suitable for the boundary region.

For example, in determining the quantization control, the current frame may be split into determination blocks each of which includes at least two of the sub-blocks, and when, among the determination blocks, a determination block includes sub-blocks having different motion vectors, the determination block may be determined to be included in the boundary region.

For example, in determining the quantization control, when, among the sub-blocks, two sub-blocks adjacent to each other have different motion vectors, at least one of the two sub-blocks may be determined to be included in the boundary region.

For example, in determining the quantization control, it may be determined that among the processing blocks, a processing block not included in the boundary region is to be weighted for each of frequency components, and a processing block included in the boundary region is not to be weighted for each of frequency components.

According to this, image quality in the boundary region can be improved.

For example, in determining the quantization control, among the processing blocks, a quantization width of a first processing block included in the boundary region may be set to a width greater than a quantization width of a second processing block not included in the boundary region.

According to this, deterioration n image quality in the boundary region can be inhibited, and furthermore an amount of encoding can be decreased.

An encoder according to an aspect of the present disclosure includes: a processor; and a memory. Using the memory, the processor: obtains motion vectors of sub-blocks obtained by splitting a current frame; determines, based on the motion vectors, for each of processing blocks obtained by splitting the current frame, quantization control to be performed on the processing block; and quantizes or inversely quantizes each of the processing blocks by the quantization control determined for the processing block.

According to this, the encoder does not need to transmit, to a decoder, information indicating change of quantization control, and thus the amount of data of an encoded stream can be decreased. Accordingly, encoding efficiency can be improved.

For example, the motion vectors may be obtained by calculation performed using encoded frames.

For example, in determining the quantization control, a boundary region between a foreground and a background may be located based on the motion vectors, and the quantization control may be determined for each of the processing blocks according to whether the processing block is included in the boundary region.

According to this, blocks can be quantized in a manner suitable for the boundary region.

For example, in determining the quantization control, the current frame may be split into determination blocks each of which includes at least two of the sub-blocks, and when, among the determination blocks, a determination block includes sub-blocks having different motion vectors, the determination block may be determined to be included in the boundary region.

For example, in determining the quantization control, when, among the sub-blocks, two sub-blocks adjacent to each other have different motion vectors, at least one of the two sub-blocks may be determined to be included in the boundary region.

For example, in determining the quantization control, it may be determined that among the processing blocks, a processing block not included in the boundary region is to be weighted for each of frequency components, and a processing block included in the boundary region is not to be weighted for each of frequency components.

According to this, image quality in the boundary region can be improved.

For example, in determining the quantization control, among the processing blocks, a quantization width of a first processing block included in the boundary region may be set to a width greater than a quantization width of a second processing block not included in the boundary region.

According to this, deterioration in image quality in the boundary region can be inhibited, and furthermore an amount of encoding can be decreased.

A decoding method according to an aspect of the present disclosure includes: obtaining motion vectors of sub-blocks obtained by splitting a current frame; determining, based on the motion vectors, for each of processing blocks obtained by splitting the current frame, quantization control to be performed on the processing block; and inversely quantizing each of the processing blocks by the quantization control determined for the processing block.

According to this, an encoder does not need to transmit, to a decoder, information indicating change of quantization control, and thus the amount of data of an encoded stream can be decreased. Accordingly, encoding efficiency can be improved.

An encoding method according to an aspect of the present disclosure includes: obtaining motion vectors of sub-blocks obtained by splitting a current frame; determining, based on the motion vectors, for each of processing blocks obtained by splitting the current frame, quantization control to be performed on the processing block; and quantizing or inversely quantizing each of the processing blocks by the quantization control determined for the processing block.

According to this, an encoder does not need to transmit, to a decoder, information indicating change of quantization control, and thus the amount of data of an encoded stream can be decreased. Accordingly, encoding efficiency can be improved.

Note that these general and specific aspects may be implemented using a system, a method, an integrated circuit, a computer program, or a computer-readable recording medium such as a CD-ROM, or any combination of systems, methods, integrated circuits, computer programs, or recording media.

The following specifically describes embodiments, with reference to the drawings. Note that the embodiments described below each show a general or specific example. The numerical values, shapes, materials, elements, the arrangement and connection of the elements, steps, and the processing order of the steps, for instance, described in the following embodiments are mere examples, and thus are not intended to limit the present disclosure.

Note that a detailed description of a matter already known well and a redundant description of substantially the same configuration may be omitted. This is intended to avoid making the following description unnecessarily redundant and to facilitate understanding of persons skilled in the art.

In the present embodiment, a frame may be instead stated as a picture or an image. Furthermore, a frame (a picture or an image) or a block to be encoded or decoded may be instead stated as, for instance, a current picture (target picture), a current frame (target frame), or a current block (target block). Such terms are also instead stated as various terms generally used in the codec technical field, other than the above terms.

Hereinafter, embodiments will be described with reference to the drawings.

Note that the embodiments described below each show a general or specific example. The numerical values, shapes, materials, components, the arrangement and connection of the components, steps, order of the steps, etc., indicated in the following embodiments are mere examples, and therefore are not intended to limit the scope of the claims. Therefore, among the components in the following embodiments, those not recited in any of the independent claims defining the broadest inventive concepts are described as optional components.

Embodiment 1

(Encoder Outline)

First, the encoder according to Embodiment 1 will be outlined. FIG. 1 is a block diagram illustrating a functional configuration of encoder 100 according to Embodiment 1. Encoder 100 is a moving picture/picture encoder that encodes a moving picture/picture block by block.

As illustrated in FIG. 1, encoder 100 is a device that encodes a picture block by block, and includes splitter 102, subtractor 104, transformer 106, quantizer 108, entropy encoder 110, inverse quantizer 112, inverse transformer 114, adder 116, block memory 118, loop filter 120, frame memory 122, intra predictor 124, inter predictor 126, and prediction controller 128.

Encoder 100 is realized as, for example, a generic processor and memory. In this case, when a software program stored in the memory is executed by the processor, the processor functions as splitter 102, subtractor 104, transformer 106, quantizer 108, entropy encoder 110, inverse quantizer 112, inverse transformer 114, adder 116, loop filter 120, intra predictor 124, inter predictor 126, and prediction controller 128. Alternatively, encoder 100 may be realized as one or more dedicated electronic circuits corresponding to splitter 102, subtractor 104, transformer 106, quantizer 108, entropy encoder 110, inverse quantizer 112, inverse transformer 114, adder 116, loop filter 120, intra predictor 124, inter predictor 126, and prediction controller 128.

Hereinafter, each component included in encoder 100 will be described.

(Splitter)

Splitter 102 splits each picture included in an input moving picture into blocks, and outputs each block to subtractor 104. For example, splitter 102 first splits a picture into blocks of a fixed size (for example, 128×128). The fixed size block is also referred to as coding tree unit (CTU). Splitter 102 then splits each fixed size block into blocks of variable sizes (for example, 64×64 or smaller), based on recursive quadtree and/or binary tree block splitting. The variable size block is also referred to as a coding unit (CU), a prediction unit (PU), or a transform unit (TU). Note that in this embodiment, there is no need to differentiate between CU, PU, and TU; all or some of the blocks in a picture may be processed per CU, PU, or TU.

Figure 2:
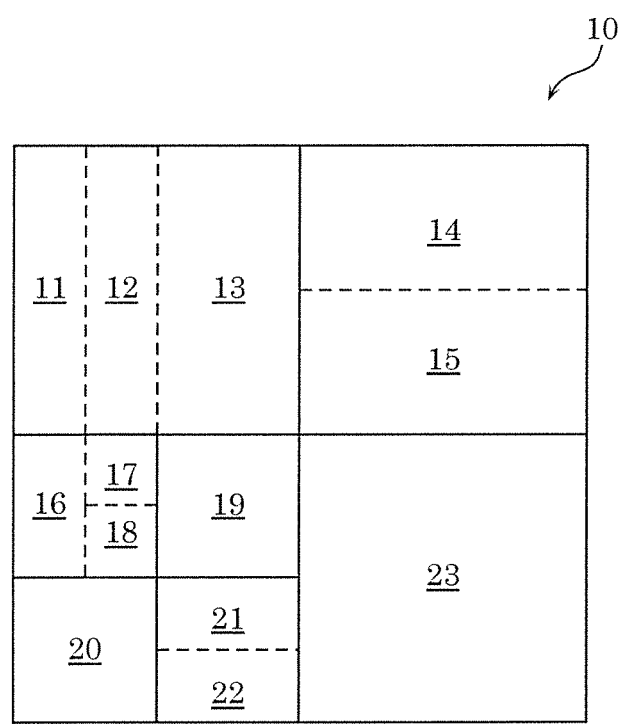
FIG. 2 illustrates one example of block splitting according to Embodiment 1.

FIG. 2 illustrates one example of block splitting according to Embodiment 1. In FIG. 2, the solid lines represent block boundaries of blocks split by quadtree block splitting, and the dashed lines represent block boundaries of blocks split by binary tree block splitting.

Here, block 10 is a square 128×128 pixel block (128×128 block). This 128×128 block 10 is first split into four square 64×64 blocks (quadtree block splitting).

The top left 64×64 block is further vertically split into two rectangle 32×64 blocks, and the left 32×64 block is further vertically split into two rectangle 16×64 blocks (binary tree block splitting). As a result, the top left 64×64 block is split into two 16×64 blocks 11 and 12 and one 32×64 block 13.

The top right 64×64 block is horizontally split into two rectangle 64×32 blocks 14 and 15 (binary tree block splitting).

The bottom left 64×64 block is first split into four square 32×32 blocks (quadtree block splitting). The top left block and the bottom right block among the four 32×32 blocks are further split. The top left 32×32 block is vertically split into two rectangle 16×32 blocks, and the right 16×32 block is further horizontally split into two 16×16 blocks (binary tree block splitting). The bottom right 32×32 block is horizontally split into two 32×16 blocks (binary tree block splitting). As a result, the bottom left 64×64 block is split into 16×32 block 16, two 16×16 blocks 17 and 18, two 32×32 blocks 19 and 20, and two 32×16 blocks 21 and 22.

The bottom right 64×64 block 23 is not split.

As described above, in FIG. 2, block 10 is split into 13 variable size blocks 11 through 23 based on recursive quadtree and binary tree block splitting. This type of splitting is also referred to as quadtree plus binary tree (QTBT) splitting.

Note that in FIG. 2, one block is split into four or two blocks (quadtree or binary tree block splitting), but splitting is not limited to this example. For example, one block may be split into three blocks (ternary block splitting). Splitting including such ternary block splitting is also referred to as multi-type tree (MBT) splitting.

(Subtractor)

Subtractor 104 subtracts a prediction signal (prediction sample) from an original signal (original sample) per block split by splitter 102. In other words, subtractor 104 calculates prediction errors (also referred to as residuals) of a block to be encoded (hereinafter referred to as a current block). Subtractor 104 then outputs the calculated prediction errors to transformer 106.

The original signal is a signal input into encoder 100, and is a signal representing an image for each picture included in a moving picture (for example, a lama signal and two chroma signals). Hereinafter, a signal representing an image is also referred to as a sample.

(Transformer)

Transformer 106 transforms spatial domain prediction errors into frequency domain transform coefficients, and outputs the transform coefficients to quantizer 108. More specifically, transformer 106 applies, for example, a predefined discrete cosine transform (DCT) or discrete sine transform (DST) to spatial domain prediction errors.

Note that transformer 106 may adaptively select a transform type from among a plurality of transform types, and transform prediction errors into transform coefficients by using a transform basis function corresponding to the selected transform type. This sort of transform is also referred to as explicit multiple core transform (EMT) or adaptive multiple transform (AMT).

The transform types include, for example, DCT-II, DCT-V, DCT VIII, DST-I, and DST-VII. FIG. 3 is a chart indicating transform basis functions for each transform type. In FIG. 3, N indicates the number of input pixels. For example, selection of a transform type from among the plurality of transform types may depend on the prediction type (intra prediction and inter prediction), and may depend on intra prediction mode.

Information indicating whether to apply such EMT or AMT (referred to as, for example, an AMT flag) and information indicating the selected transform type is signalled at the CU level. Note that the signaling of such information need not be performed at the CU level, and may be performed at another level (for example, at the sequence level, picture level, slice level, tile level, or CTU level).

Moreover, transformer 106 may apply a secondary transform to the transform coefficients (transform result). Such a secondary transform is also referred to as adaptive secondary transform (AST) or non-separable secondary transform (NSST). For example, transformer 106 applies a secondary transform to each sub-block (for example, each 4×4 sub-block) included in the block of the transform coefficients corresponding to the intra prediction errors. Information indicating whether to apply NSST and information related to the transform matrix used in NSST are signalled at the CU level. Note that the signaling of such information need not be performed at the CU level, and may be performed at another level (for example, at the sequence level, picture level, slice level, tile level, or CTU level).

(Quantizer)

Quantizer 108 quantizes the transform coefficients output from transformer 106. More specifically, quantizer 108 scans, in a predetermined scanning order, the transform coefficients of the current block, and quantizes the scanned transform coefficients based on quantization parameters (QP) corresponding to the transform coefficients. Quantizer 108 then outputs the quantized transform coefficients (hereinafter referred to as quantized coefficients) of the current block to entropy encoder 110 and inverse quantizer 112.

A predetermined order is an order for quantizing/inverse quantizing transform coefficients. For example, a predetermined scanning order is defined as ascending order of frequency (from low to high frequency) or descending order of frequency (from high to low frequency).

A quantization parameter is a parameter defining a quantization step size (quantization width). For example, if the value of the quantization parameter increases, the quantization step size also increases. In other words, if the value of the quantization parameter increases, the quantization error increases.

(Entropy Encoder)

Entropy encoder 110 generates an encoded signal (encoded bitstream) by variable length encoding quantized coefficients, which are inputs from quantizer 108. More specifically, entropy encoder 110, for example, binarizes quantized coefficients and arithmetic encodes the binary signal.

(Inverse Quantizer)

Inverse quantizer 112 inverse quantizes quantized coefficients, which are inputs from quantizer 108. More specifically, inverse quantizer 112 inverse quantizes, in a predetermined scanning order, quantized coefficients of the current block. Inverse quantizer 112 then outputs the inverse quantized transform coefficients of the current block to inverse transformer 114.

(Inverse Transformer)

Inverse transformer 114 restores prediction errors by inverse transforming transform coefficients, which are inputs from inverse quantizer 112. More specifically, inverse transformer 114 restores the prediction errors of the current block by applying an inverse transform corresponding to the transform applied by transformer 106 on the transform coefficients. Inverse transformer 114 then outputs the restored prediction errors to adder 116.

Note that since information is lost in quantization, the restored prediction errors do not match the prediction errors calculated by subtractor 104. In other words, the restored prediction errors include quantization errors.

(Adder)

Adder 116 reconstructs the current block by summing prediction errors, which are inputs from inverse transformer 114, and prediction samples, which are inputs from prediction controller 128. Adder 116 then outputs the reconstructed block to block memory 118 and loop filter 120. A reconstructed block is also referred to as a local decoded block.

(Block Memory)

Block memory 118 is storage for storing blocks in a picture to be encoded (hereinafter referred to as a current picture) for reference in intra prediction. More specifically, block memory 118 stores reconstructed blocks output from adder 116.

(Loop Filter)

Loop filter 120 applies a loop filter to blocks reconstructed by adder 116, and outputs the filtered reconstructed blocks to frame memory 122. A loop filter is a filter used in an encoding loop (in-loop filter), and includes, for example, a deblocking filter (DF), a sample adaptive offset (SAO), and an adaptive loop filter (ALF).

In ALF, a least square error filter for removing compression artifacts is applied. For example, one filter from among a plurality of filters is selected for each 2×2 sub-block in the current block based on direction and activity of local gradients, and is applied.

More specifically, first, each sub-block (for example, each 2×2 sub-block) is categorized into one out of a plurality of classes (for example, 15 or 25 classes). The classification of the sub-block is based on gradient directionality and activity. For example, classification index C is derived based on gradient directionality D (for example, 0 to 2 or 0 to 4) and gradient activity A (for example, 0 to 4) (for example, C=5D+A). Then, based on classification index C, each sub-block is categorized into one out of a plurality of classes (for example, 15 or 25 classes).

For example, gradient directionality D is calculated by comparing gradients of a plurality of directions (for example, the horizontal, vertical, and two diagonal directions). Moreover, for example, gradient activity A is calculated by summing gradients of a plurality of directions and quantizing the sum.

The filter to be used for each sub-block is determined from among the plurality of filters based on the result of such categorization.

Figure 4A:
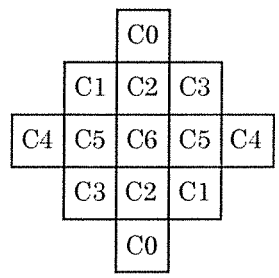
FIG. 4A illustrates one example of a filter shape used in ALF.
Figure 4B:
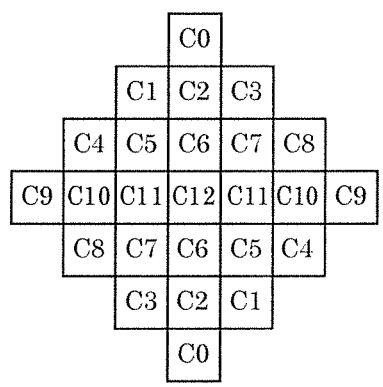
FIG. 4B illustrates another example of a filter shape used in ALF.
Figure 4C:
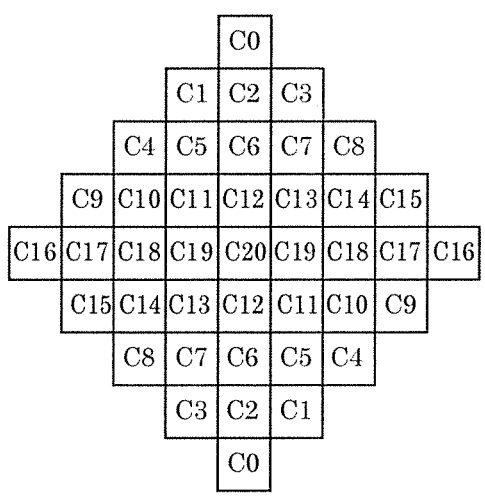
FIG. 4C illustrates another example of a filter shape used in ALF.

The filter shape to be used in ALF is, for example, a circular symmetric filter shape. FIG. 4A through FIG. 4C illustrate examples of filter shapes used in ALF. FIG. 4A illustrates a 5×5 diamond shape filter, FIG. 4B illustrates a 7×7 diamond shape filter, and FIG. 4C illustrates a 9×9 diamond shape filter. Information indicating the filter shape is signalled at the picture level. Note that the signaling of information indicating the filter shape need not be performed at the picture level, and may be performed at another level (for example, at the sequence level, slice level, tile level, CTU level, or CU level).

The enabling or disabling of ALF is determined at the picture level or CU level. For example, for luma, the decision to apply ALF or not is done at the CU level, and for chroma, the decision to apply ALF or not is done at the picture level. Information indicating whether ALF is enabled or disabled is signalled at the picture level or CU level. Note that the signaling of information indicating whether ALF is enabled or disabled need not be performed at the picture level or CU level, and may be performed at another level (for example, at the sequence level, slice level, tile level, or CTU The coefficients set for the plurality of selectable filters (for example, 15 or 25 filters) is signalled at the picture level. Note that the signaling of the coefficients set need not be performed at the picture level, and may be performed at another level (for example, at the sequence level, slice level, tile level, CTU level, CU level, or sub-block level).

(Frame Memory)

Frame memory 122 is storage for storing reference pictures used in inter prediction, and is also referred to as a frame buffer. More specifically, frame memory 122 stores reconstructed blocks filtered by loop filter 120.

(Intra Predictor)

Intra predictor 124 generates a prediction signal (intra prediction signal) by intra predicting the current block with reference to a block or blocks in the current picture and stored in block memory 118 (also referred to as intra frame prediction). More specifically, intra predictor 124 generates an intra prediction signal by intra prediction with reference to samples (for example, luma and/or chroma values) of a block or blocks neighboring the current block, and then outputs the intra prediction signal to prediction controller 128.

For example, intra predictor 124 performs intra prediction by using one mode from among a plurality of predefined intra prediction modes. The intra prediction modes include one or more non-directional prediction modes and a plurality of directional prediction modes.

The one or more non-directional prediction modes include, for example, planar prediction mode and DC prediction mode defined in the H.265/high-efficiency video coding (HEVC) standard (see NPTL 1).

Figure 5:
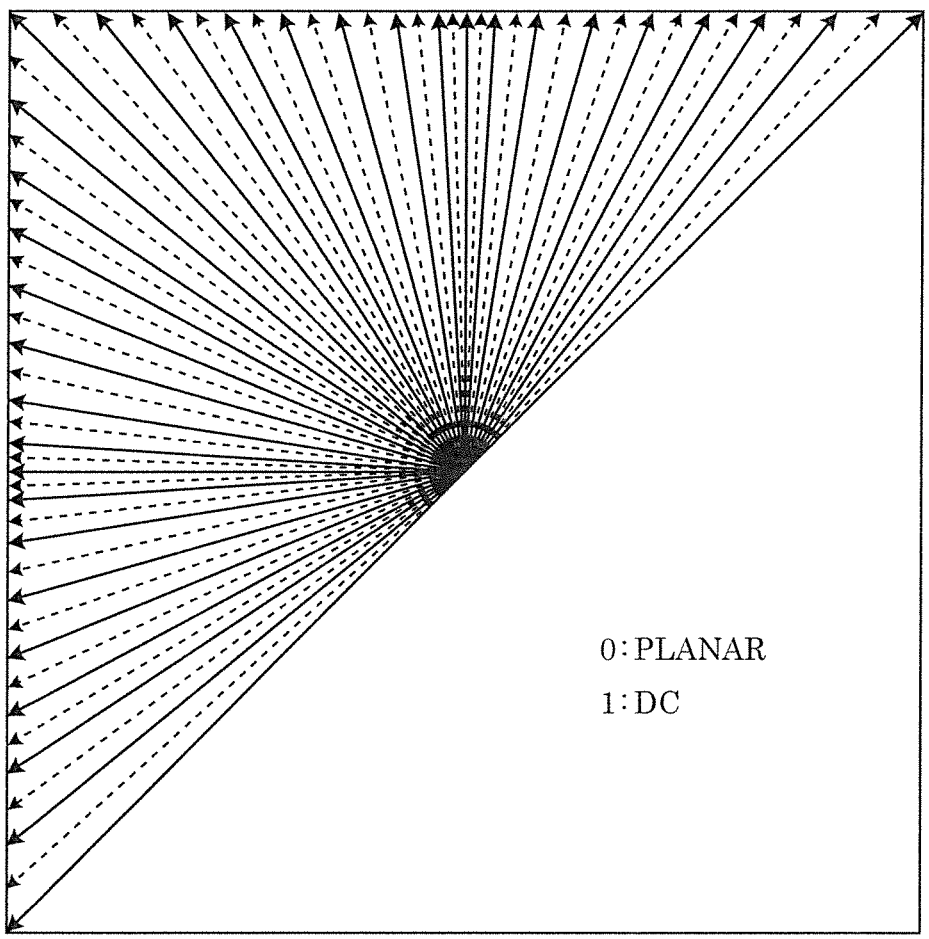
FIG. 5 illustrates 67 intra prediction modes used in intra prediction.

The plurality of directional prediction modes include, for example, the 33 directional prediction modes defined in the H.265/HEVC standard. Note that the plurality of directional prediction modes may further include 32 directional prediction modes in addition to the 33 directional prediction modes (for a total of 65 directional prediction modes). FIG. 5 illustrates 67 intra prediction modes used in intra prediction (two non-directional prediction modes and 65 directional prediction modes). The solid arrows represent the 33 directions defined in the H.265/HEVC standard, and the dashed arrows represent the additional 32 directions.

Note that a luma block may be referenced in chroma block intra prediction. In other words, a chroma component of the current block may be predicted based on a luma component of the current block. Such intra prediction is also referred to as cross-component linear model (CCLM) prediction. Such a chroma block intra prediction mode that references a luma block (referred to as, for example, CCLM mode) may be added as one of the chroma block intra prediction modes.

Intra predictor 124 may correct post-intra-prediction pixel values based on horizontal/vertical reference pixel gradients. Intra prediction accompanied by this sort of correcting is also referred to as position dependent intra prediction combination (PDPC). Information indicating whether to apply PDPC or not (referred to as, for example, a PDPC flag) is, for example, signalled at the CU level. Note that the signaling of this information need not be performed at the CU level, and may be performed at another level (for example, on the sequence level, picture level, slice level, tile level, or CTU (Inter Predictor)

Inter predictor 126 generates a prediction signal (inter prediction signal) by inter predicting the current block with reference to a block or blocks in a reference picture, which is different from the current picture and is stored in frame memory 122 (also referred to as inter frame prediction). Inter prediction is performed per current block or per sub-block (for example, per 4×4 block) in the current block. For example, inter predictor 126 performs motion estimation in a reference picture for the current block or sub-block. Inter predictor 126 then generates an inter prediction signal of the current block or sub-block by motion compensation by using motion information (for example, a motion vector) obtained from motion estimation. Inter predictor 126 then outputs the generated inter prediction signal to prediction controller 128.

The motion information used in motion compensation is signalled. A motion vector predictor may be used for the signaling of the motion vector. In other words, the difference between the motion vector and the motion vector predictor may be signalled.

Note that the inter prediction signal may be generated using motion information for a neighboring block in addition to motion information for the current block obtained from motion estimation. More specifically, the inter prediction signal may be generated per sub-block in the current block by calculating a weighted sum of a prediction signal based on motion information obtained from motion estimation and a prediction signal based on motion information for a neighboring block. Such inter prediction (motion compensation) is also referred to as overlapped block motion compensation (OBMC).

In such an OBMC mode, information indicating sub-block size for OBMC (referred to as, for example, OBMC block size) is signalled at the sequence level. Moreover, information indicating whether to apply the OBMC mode or not (referred to as, for example, an OBMC flag) is signalled at the CU level. Note that the signaling of such information need not be performed at the sequence level and CU level, and may be performed at another level (for example, at the picture level, slice level, tile level, CTU level, or sub-block level).

Note that the motion information may be derived on the decoder side without being signalled. For example, a merge mode defined in the H.265/HEVC standard may be used. Moreover, for example, the motion information may be derived by performing motion estimation on the decoder side. In this case, motion estimation is performed without using the pixel values of the current block.

Here, a mode for performing motion estimation on the decoder side will be described. A mode for performing motion estimation on the decoder side is also referred to as pattern matched motion vector derivation (PMMVD) mode or frame rate up-conversion (FRUC) mode.

First, a candidate list (a candidate list may be a merge list) of candidates each including a prediction motion vector is generated with reference to motion vectors of encoded blocks that spatially or temporally neighbor the current block. Then, evaluation values for the candidates included in the candidate list are calculated and one candidate is selected based on the calculated evaluation values.

Next, a motion vector for the current block is derived from the motion vector of the selected candidate. More specifically, for example, the motion vector for the current block is calculated as the motion vector of the selected candidate, as-is. Alternatively, the motion vector for the current block may be derived by pattern matching performed in the vicinity of a position in a reference picture corresponding to the motion vector of the selected candidate.

Note that an evaluation values is calculated by pattern matching performed between a region in a reference picture corresponding to a motion vector and a predetermined region.

The pattern matching used is either first pattern matching or second pattern matching. First pattern matching and second pattern matching are also referred to as bilateral matching and template matching, respectively.

In the first pattern matching, pattern matching is performed between two blocks along the motion trajectory of the current block in two different reference pictures. Therefore, in the first pattern matching, a region in another reference picture conforming to the motion trajectory of the current block is used as the predetermined region for the above-described calculation of the candidate evaluation value.

Figure 6:
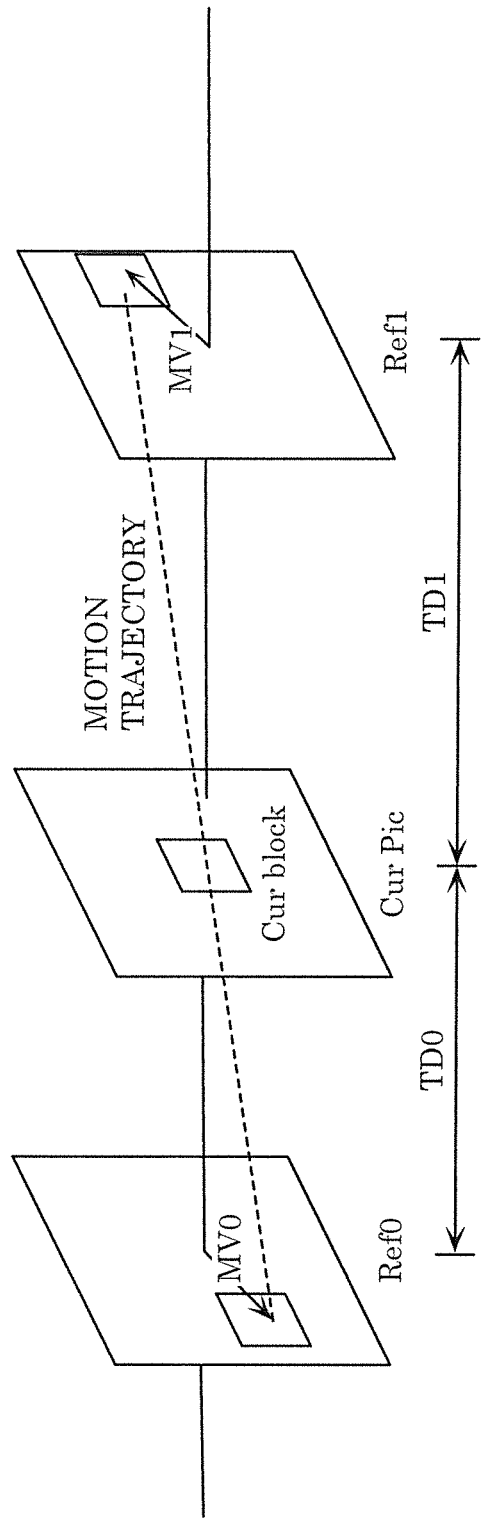
FIG. 6 is for illustrating pattern matching (bilateral matching) between two blocks along a motion trajectory.

FIG. 6 is for illustrating pattern matching (bilateral matching) between two blocks along a motion trajectory. As illustrated in FIG. 6, in the first pattern matching, two motion vectors (MV0, MV1) are derived by finding the best match between two blocks along the motion trajectory of the current block (Cur block) in two different reference pictures (Ref0, Ref1).

Under the assumption of continuous motion trajectory, the motion vectors (MV0, MV1) pointing to the two reference blocks shall be proportional to the temporal distances (TD0, TD1) between the current picture (Cur Pic) and the two reference pictures (Ref0, Ref1). For example, when the current picture is temporally between the two reference pictures and the temporal distance from the current picture to the two reference pictures is the same, the first pattern matching derives a mirror based bi-directional motion vector.

In the second pattern matching, pattern matching is performed between a template in the current picture (blocks neighboring the current block in the current picture (for example, the top and/or left neighboring blocks)) and a block in a reference picture. Therefore, in the second pattern matching, a block neighboring the current block in the current picture is used as the predetermined region for the above-described calculation of the candidate evaluation value.

Figure 7:
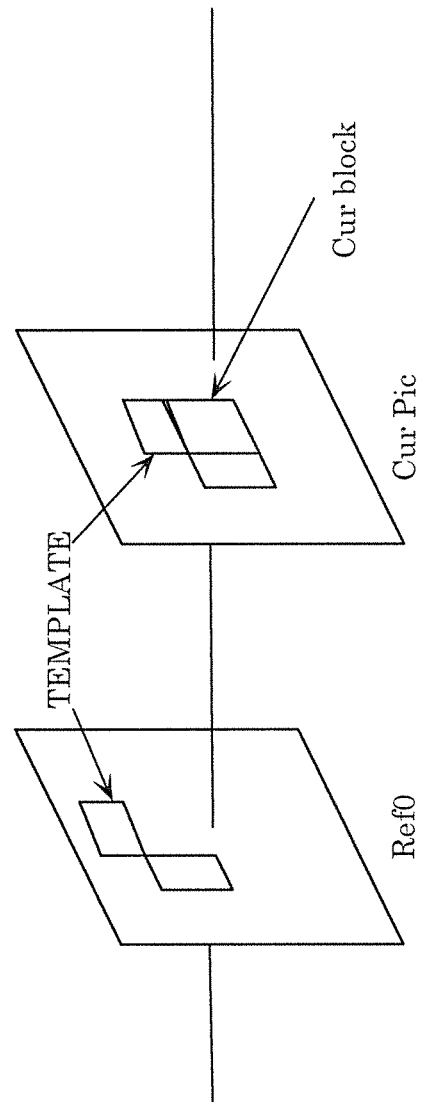
FIG. 7 is for illustrating pattern matching (template matching) between a template in the current picture and a block in a reference picture.

FIG. 7 is for illustrating pattern matching (template matching) between a template in the current picture and a block in a reference picture. As illustrated in FIG. 7, in the second pattern matching, a motion vector of the current block is derived by searching a reference picture (Ref0) to find the block that best matches neighboring blocks of the current block (Cur block) in the current picture (Cur Pic).

Information indicating whether to apply the FRUC mode or not (referred to as, for example, a FRUC flag) is signalled at the CU level. Moreover, when the FRUC mode is applied (for example, when the FRUC flag is set to true), information indicating the pattern matching method (first pattern matching or second pattern matching) is signalled at the CU level. Note that the signaling of such information need not be performed at the CU level, and may be performed at another level (for example, at the sequence level, picture level, slice level, tile level, CTU level, or sub-block level).

Note that a method other than motion estimation may be used to derive the motion information on the decoder side. For example, a motion vector correction amount may be derived per pixel by using values of surrounding pixels, based on a model assuming uniform linear motion.

Here, a mode for deriving a motion vector based on a model assuming uniform linear motion will be described. This mode is also referred to as a bi-directional optical flow (BIO) mode.

Figure 8:
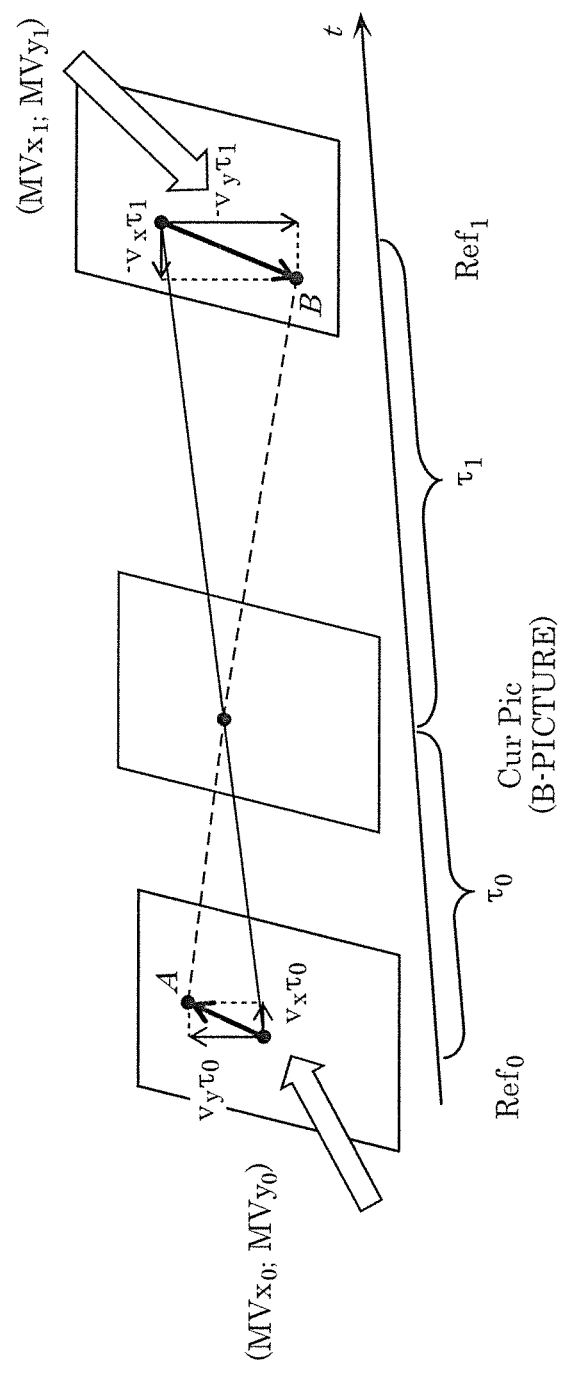
FIG. 8 is for illustrating a model assuming uniform linear motion.

FIG. 8 is for illustrating a model assuming uniform linear motion. In FIG. 8, $(v_x, v_y)$ denotes a velocity vector, and $\tau_0$ and $\tau_1$ denote temporal distances between the current picture (Cur Pic) and two reference pictures (Ref$_0$, Ref$_1$). (MVx$_0$, MVy$_0$) denotes a motion vector corresponding to reference picture Ref$_0$, and (MVx$_1$, MVy$_1$) denotes a motion vector corresponding to reference picture Ref$_1$.

Here, under the assumption of uniform linear motion exhibited by velocity vector $(v_x, v_y)$, (MVx$_0$, MVy$_0$) and (MVx$_1$, MVy$_1$) are represented as $(v_x\tau_0, v_y\tau_0)$ and $(-v_x\tau_1, -v_y\tau_1)$, respectively, and the following optical flow equation is given.

MATH 1

$$\partial I^{(k)}/\partial t + v_x \partial I^{(k)}/\partial x + v_y \partial I^{(k)}/\partial y = 0 \qquad (1)$$

Here, I(k) denotes a luma value from reference picture k (k=0, 1) after motion compensation. This optical flow equation shows that the sum of (i) the time derivative of the luma value, (ii) the product of the horizontal velocity and the horizontal component of the spatial gradient of a reference picture, and (iii) the product of the vertical velocity and the vertical component of the spatial gradient of a reference picture is equal to zero. A motion vector of each block obtained from, for example, a merge list is corrected pixel by pixel based on a combination of the optical flow equation and Hermite interpolation.

Note that a motion vector may be derived on the decoder side using a method other than deriving a motion vector based on a model assuming uniform linear motion. For example, a motion vector may be derived for each sub-block based on motion vectors of neighboring blocks.

Here, a mode in which a motion vector is derived for each sub-block based on motion vectors of neighboring blocks will be described. This mode is also referred to as affine motion compensation prediction mode.

Figure 9:
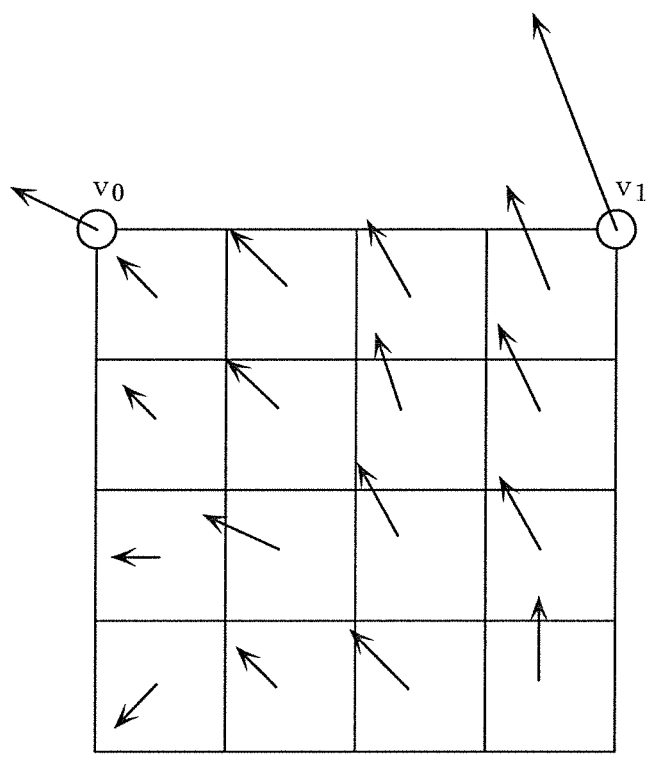
FIG. 9 is for illustrating deriving a motion vector of each sub-block based on motion vectors of neighboring blocks.

FIG. 9 is for illustrating deriving a motion vector of each sub-block based on motion vectors of neighboring blocks. In FIG. 9, the current block includes 16 4×4 sub-blocks. Here, motion vector $v_0$ of the top left corner control point in the current block is derived based on motion vectors of neighboring sub-blocks, and motion vector $v_1$ of the top right corner control point in the current block is derived based on motion vectors of neighboring blocks. Then, using the two motion vectors $v_0$ and $v_1$, the motion vector $(v_x, v_y)$ of each sub-block in the current block is derived using Equation 2 below.

MATH 2

$$\begin{cases} v_x = \dfrac{(v_{1x} - v_{0x})}{w}x - \dfrac{(v_{1y} - v_{0y})}{w}y + v_{0x} \\ v_y = \dfrac{(v_{1y} - v_{0y})}{w}x + \dfrac{(v_{1x} - v_{0x})}{w}y + v_{0y} \end{cases} \qquad (2)$$

Here, x and y are the horizontal and vertical positions of the sub-block, respectively, and w is a predetermined weighted coefficient.

Such an affine motion compensation prediction mode may include a number of modes of different methods of deriving the motion vectors of the top left and top right corner control points. Information indicating such an affine motion compensation prediction mode (referred to as, for example, an affine flag) is signalled at the CU level. Note that the signaling of information indicating the affine motion compensation prediction mode need not be performed at the CU level, and may be performed at another level (for example, at the sequence level, picture level, slice level, tile level, CTU level, or sub-block level).

(Prediction Controller)

Prediction controller 128 selects either the intra prediction signal or the inter prediction signal, and outputs the selected prediction signal to subtractor 104 and adder 116.

(Decoder Outline)

Figure 10:
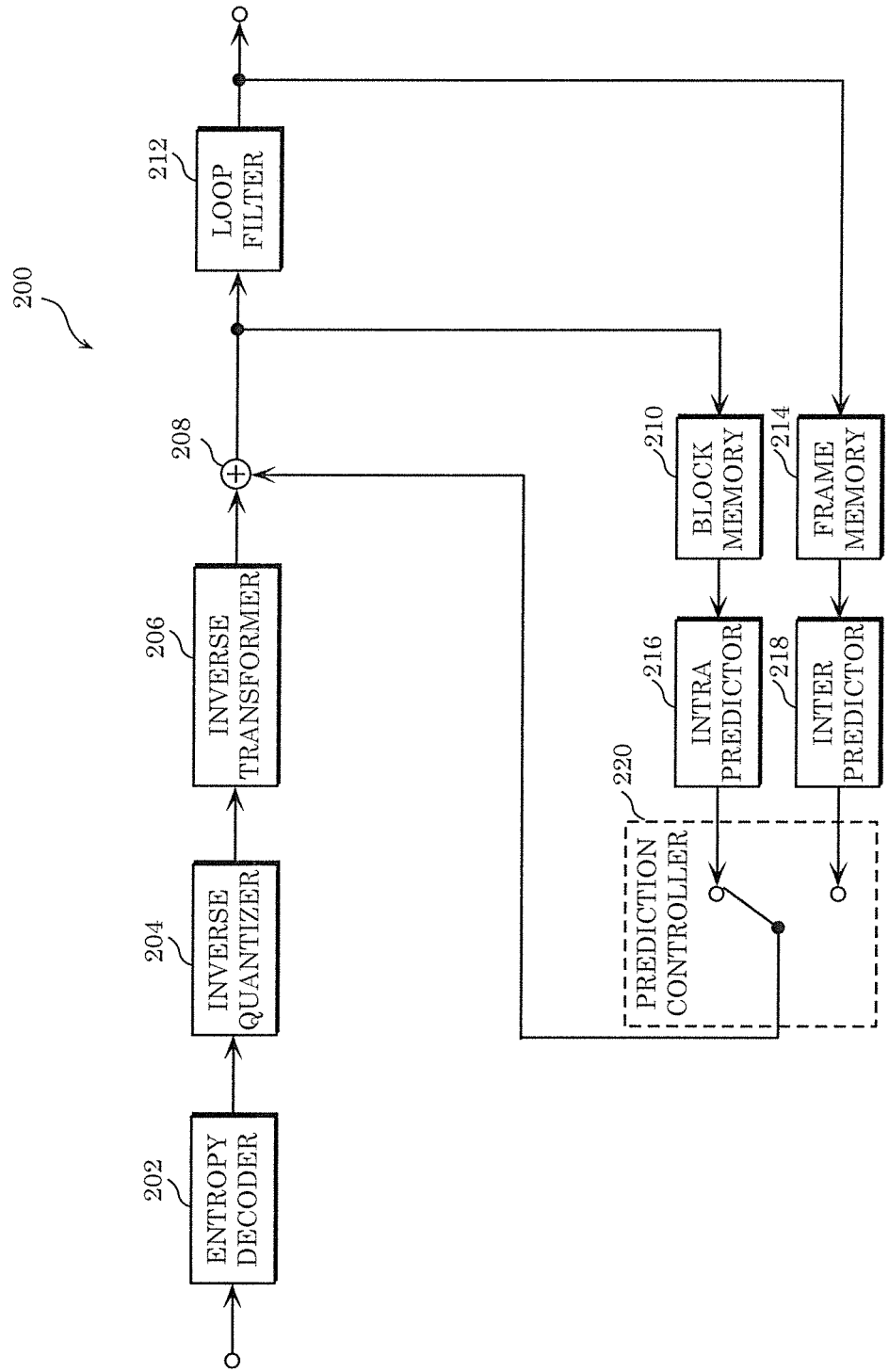
FIG. 10 is a block diagram illustrating a functional configuration of the decoder according to Embodiment 1.

Next, a decoder capable of decoding an encoded signal (encoded bitstream) output from encoder 100 will be described. FIG. 10 is a block diagram illustrating a functional configuration of decoder 200 according to Embodiment 1. Decoder 200 is a moving picture/picture decoder that decodes a moving picture/picture block by block.

As illustrated in FIG. 10, decoder 200 includes entropy decoder 202, inverse quantizer 204, inverse transformer 206, adder 208, block memory 210, loop filter 212, frame memory 214, intra predictor 216, inter predictor 218, and prediction controller 220.

Decoder 200 is realized as, for example, a generic processor and memory. In this case, when a software program stored in the memory is executed by the processor, the processor functions as entropy decoder 202, inverse quantizer 204, inverse transformer 206, adder 208, loop filter 212, intra predictor 216, inter predictor 218, and prediction controller 220. Alternatively, decoder 200 may be realized as one or more dedicated electronic circuits corresponding to entropy decoder 202, inverse quantizer 204, inverse transformer 206, adder 208, loop filter 212, intra predictor 216, inter predictor 218, and prediction controller 220.

Hereinafter, each component included in decoder 200 will be described.

(Entropy Decoder)

Entropy decoder 202 entropy decodes an encoded bitstream. More specifically, for example, entropy decoder 202 arithmetic decodes an encoded bitstream into a binary signal. Entropy decoder 202 then debinarizes the binary signal. With this, entropy decoder 202 outputs quantized coefficients of each block to inverse quantizer 204.

(Inverse Quantizer)

Inverse quantizer 204 inverse quantizes quantized coefficients of a block to be decoded (hereinafter referred to as a current block), which are inputs from entropy decoder 202. More specifically, inverse quantizer 204 inverse quantizes quantized coefficients of the current block based on quantization parameters corresponding to the quantized coefficients. Inverse quantizer 204 then outputs the inverse quantized coefficients (i.e., transform coefficients) of the current block to inverse transformer 206.

(Inverse Transformer)

Inverse transformer 206 restores prediction errors by inverse transforming transform coefficients, which are inputs from inverse quantizer 204.

For example, when information parsed from an encoded bitstream indicates application of EMT or AMT (for example, when the AMT flag is set to true), inverse transformer 206 inverse transforms the transform coefficients of the current block based on information indicating the parsed transform type.

Moreover, for example, when information parsed from an encoded bitstream indicates application of NSST, inverse transformer 206 applies a secondary inverse transform to the transform coefficients.

(Adder)

Adder 208 reconstructs the current block by summing prediction errors, which are inputs from inverse transformer 206, and prediction samples, which is an input from prediction controller 220. Adder 208 then outputs the reconstructed block to block memory 210 and loop filter 212.

(Block Memory)

Block memory 210 is storage for storing blocks in a picture to be decoded (hereinafter referred to as a current picture) for reference in intra prediction. More specifically, block memory 210 stores reconstructed blocks output from adder 208.

(Loop Filter)

Loop filter 212 applies a loop filter to blocks reconstructed by adder 208, and outputs the filtered reconstructed blocks to frame memory 214 and, for example, a display device.

When information indicating the enabling or disabling of ALF parsed from an encoded bitstream indicates enabled, one filter from among a plurality of filters is selected based on direction and activity of local gradients, and the selected filter is applied to the reconstructed block.

(Frame Memory)

Frame memory 214 is storage for storing reference pictures used in inter prediction, and is also referred to as a frame buffer. More specifically, frame memory 214 stores reconstructed blocks filtered by loop filter 212.

(Intra Predictor)

Intra predictor 216 generates a prediction signal (intra prediction signal) by intra prediction with reference to a block or blocks in the current picture and stored in block memory 210. More specifically, intra predictor 216 generates an intra prediction signal by intra prediction with reference to samples (for example, luma and/or chroma values) of a block or blocks neighboring the current block, and then outputs the intra prediction signal to prediction controller 220.

Note that when an intra prediction mode in which a chroma block is intra predicted from a luma block is selected, intra predictor 216 may predict the chroma component of the current block based on the luma component of the current block.

Moreover, when information indicating the application of PDPC is parsed from an encoded bitstream, intra predictor 216 corrects post-intra-prediction pixel values based on horizontal/vertical reference pixel gradients.

(Inter Predictor)

Inter predictor 218 predicts the current block with reference to a reference picture stored in frame memory 214. Inter prediction is performed per current block or per sub-block (for example, per 4×4 block) in the current block. For example, inter predictor 218 generates an inter prediction signal of the current block or sub-block by motion compensation by using motion information (for example, a motion vector) parsed from an encoded bitstream, and outputs the inter prediction signal to prediction controller 220.

Note that when the information parsed from the encoded bitstream indicates application of OBMC mode, inter predictor 218 generates the inter prediction signal using motion information for a neighboring block in addition to motion information for the current block obtained from motion estimation.

Moreover, when the information parsed from the encoded bitstream indicates application of FRUC mode, inter predictor 218 derives motion information by performing motion estimation in accordance with the pattern matching method (bilateral matching or template matching) parsed from the encoded bitstream. Inter predictor 218 then performs motion compensation using the derived motion information.

Moreover, when BIO mode is to be applied, inter predictor 218 derives a motion vector based on a model assuming uniform linear motion. Moreover, when the information parsed from the encoded bitstream indicates that affine motion compensation prediction mode is to be applied, inter predictor 218 derives a motion vector of each sub-block based on motion vectors of neighboring blocks.

(Prediction Controller)

Prediction controller 220 selects either the intra prediction signal or the inter prediction signal, and outputs the selected prediction signal to adder 208.

Embodiment 2

In the present embodiment, in inter prediction video encoding, based on motion vectors assigned to a predetermined processing unit and reference frames at different times, a motion vector and a reference frame which are to be used in inter prediction are selected for each small region (first sub-block) smaller than the predetermined processing unit on a current frame.

Motion vectors are determined by detecting individual motion of a moving object or a background in a predetermined processing unit at the time of encoding.

Selection of a motion vector and a reference frame is determined based on a correlation of reference pixels on at least two reference frames at different times.

When selecting a motion vector and a reference frame, it is determined, for a region for which a high correlation is not found from reference pixels on at least two reference frames at different times, whether to use the at least two reference frames to predict a small region, using a motion vector of a foreground.

When selecting a motion vector and a reference frame, for a region for which a reference frame is not successfully selected, a predicted value for pixels in the region is determined using a predicted value for neighboring pixels.

First, an outline of a prediction method according to the present embodiment is to be described.

In inter prediction video encoding, an image encoder (encoding device) notifies an image decoder (decoding device) of a plurality of motion vectors for a coding block (a processing unit for prediction processing). Based on correlations between corresponding regions (second sub-blocks) included in reference frames and indicated by motion vectors scaled according to inter-frame distances, the image encoder and the image decoder select, for each of small regions in a coding block, a motion vector and a reference frame to be used and make prediction. Examples of the size of a small region and the size of a corresponding region include 4×4, 3×3, and 2×2 pixels. A correlation between corresponding regions is evaluated based on a sum of absolute differences of pixel values in the corresponding regions.

Note that a small region which is a unit for selecting a motion vector and a corresponding region used for determining a correlation may have the same size or different sizes. For example, a corresponding region may include a region having the same size as the small region and a region in the vicinity thereof.

Accordingly, even if a coding block includes different motions of, for instance, a moving object and a background, the image encoder and the image decoder can appropriately change, for each small region, a motion vector and a reference frame to be used and make prediction, without the image encoder notifying the image decoder of the position of a boundary between the moving object and the background. Accordingly, prediction residual can be reduced without subdividing the coding block. As a result, encoding efficiency improves since overhead for notifying a motion vector and split of a coding block can be reduced while reducing prediction residual.

Figure 11:
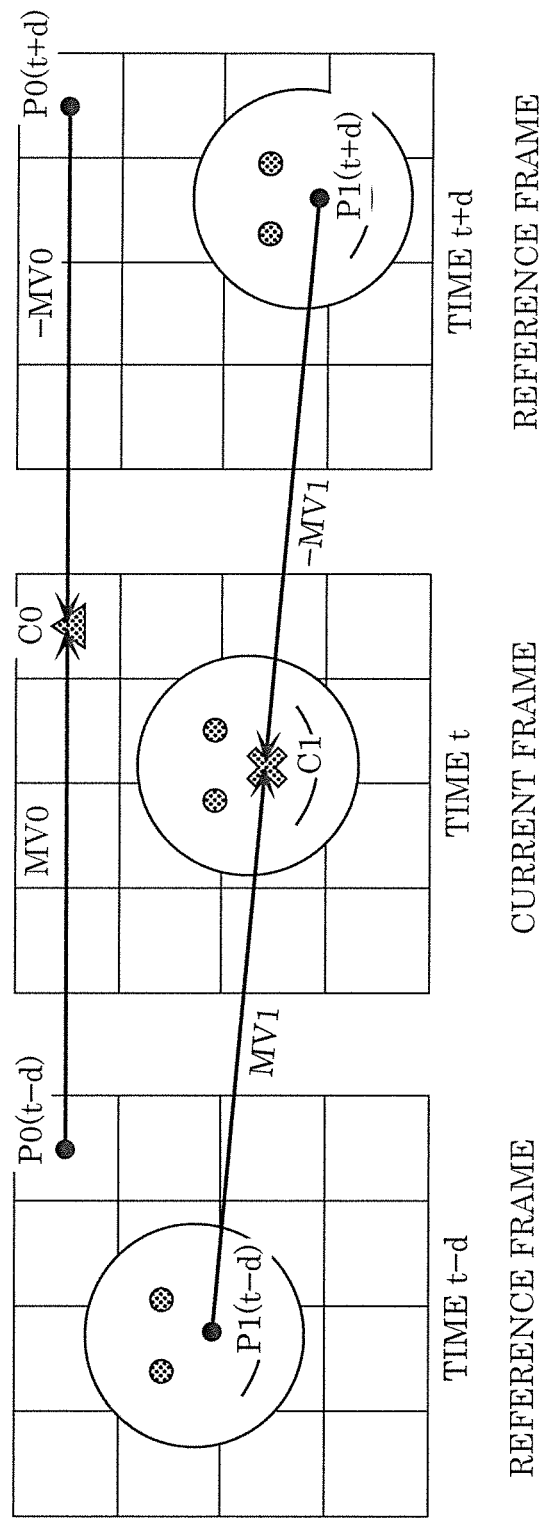
FIG. 11 is a diagram illustrating a prediction method according to Embodiment 2.

FIG. 11 is a diagram illustrating an example of operation in the case of referring to a total of two reference frames whose display times are before and after the display time of a current frame. Note that in FIGS. 11 to 13, the entire quadrilateral illustrated as a reference frame or a current frame is a processing unit (coding block 322 later described) for prediction processing. Background pixels C0 and foreground pixels C1 correspond to small regions obtained by splitting a coding block, reference pixels P0(t−2d), P0(t−d), P0(t+d), P1(t−2d), P1(t−d), and P1(t+d) correspond to corresponding regions obtained by splitting a coding block.

The image encoder notifies the image decoder of two motion vectors MV0 and MV1. The image encoder and the image decoder select, for background pixels C0, motion vector MV0 and reference pixels P0(t−d) and P0(t+d) since a correlation of reference pixels P0(t−d) and P0(t+d) indicated by motion vector MV0 is high.

The image encoder and the image decoder select, for foreground pixels C1, motion vector MV1 and reference pixels P1(t−d) and P1(t+d) since a correlation of reference pixels P1(t−d) and P1(t+d) indicated by motion vector MV1 is high.

Figure 12:
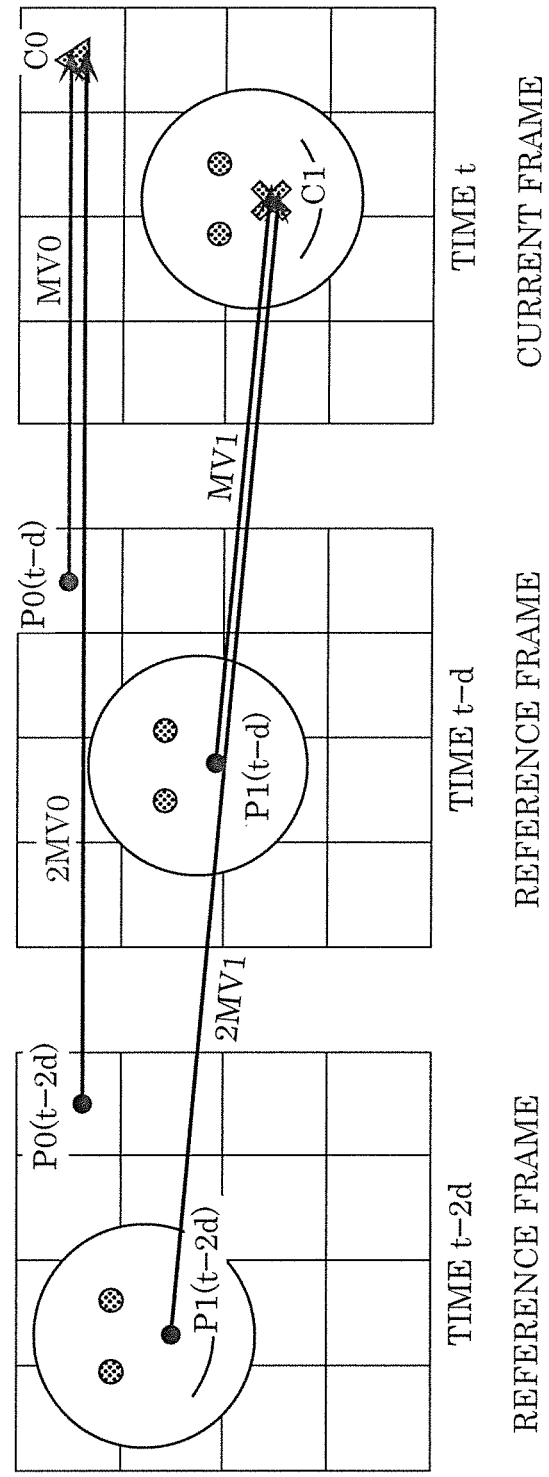
FIG. 12 is a diagram illustrating the prediction method according to Embodiment 2.

FIG. 12 is a diagram illustrating an example of operation in the case of referring to a total of two reference frames whose display times are only before the display time of a current frame.

The image encoder notifies the image decoder of motion vectors MV0 and MV1. The image encoder and the image decoder select, for background pixels C0, motion vector MV0 and reference pixels P0(t−d) and P0(t−2d), since a correlation of reference pixels P0(t−d) and P0(t−2d) indicated by motion vector MV0 is high.

The image encoder and the image decoder select, for foreground pixels C1, motion vector MV1 and reference pixels P1(t−d) and P1(t−2d) since a correlation of reference pixels P1(t−d) and P1(t−2d) indicated by motion vector MV1 is high.

Figure 13:
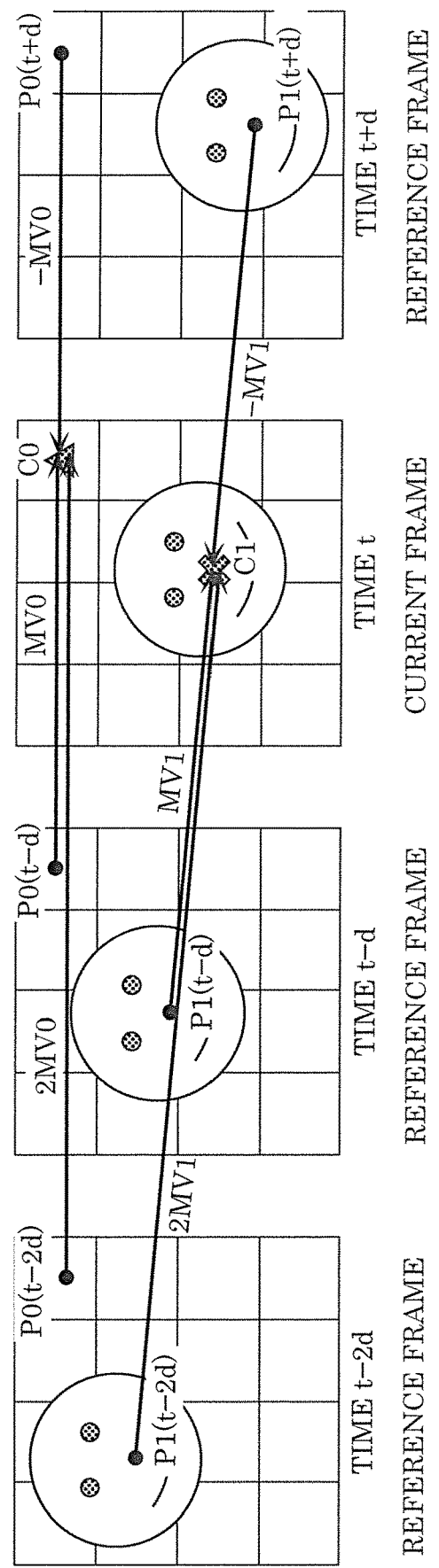
FIG. 13 is a diagram illustrating the prediction method according to Embodiment 2.

FIG. 13 is a diagram illustrating an example of operation in the case of referring to a total of three reference frames whose display times are before and after the display time of a current frame.

The image encoder notifies the image decoder of motion vectors MV0 and MV1. The image encoder and the image decoder select, for background pixels C0, motion vector MV0 and reference pixels P0(t−2d), P0(t−d), and P0(t+d) since a correlation of reference pixels P0(t−2d), P0(t−d), and P0(t+d) indicated by motion vector MV0 is high.

The image encoder and the image decoder select, for foreground pixels C1, motion vector MV1 and reference pixels P1(t−2d), P1(t−d), and P1(t+d) since a correlation of reference pixels P1(t−2d), P1(t−d), and P1(t+d) indicated by motion vector MV1 is high.

Figure 14:
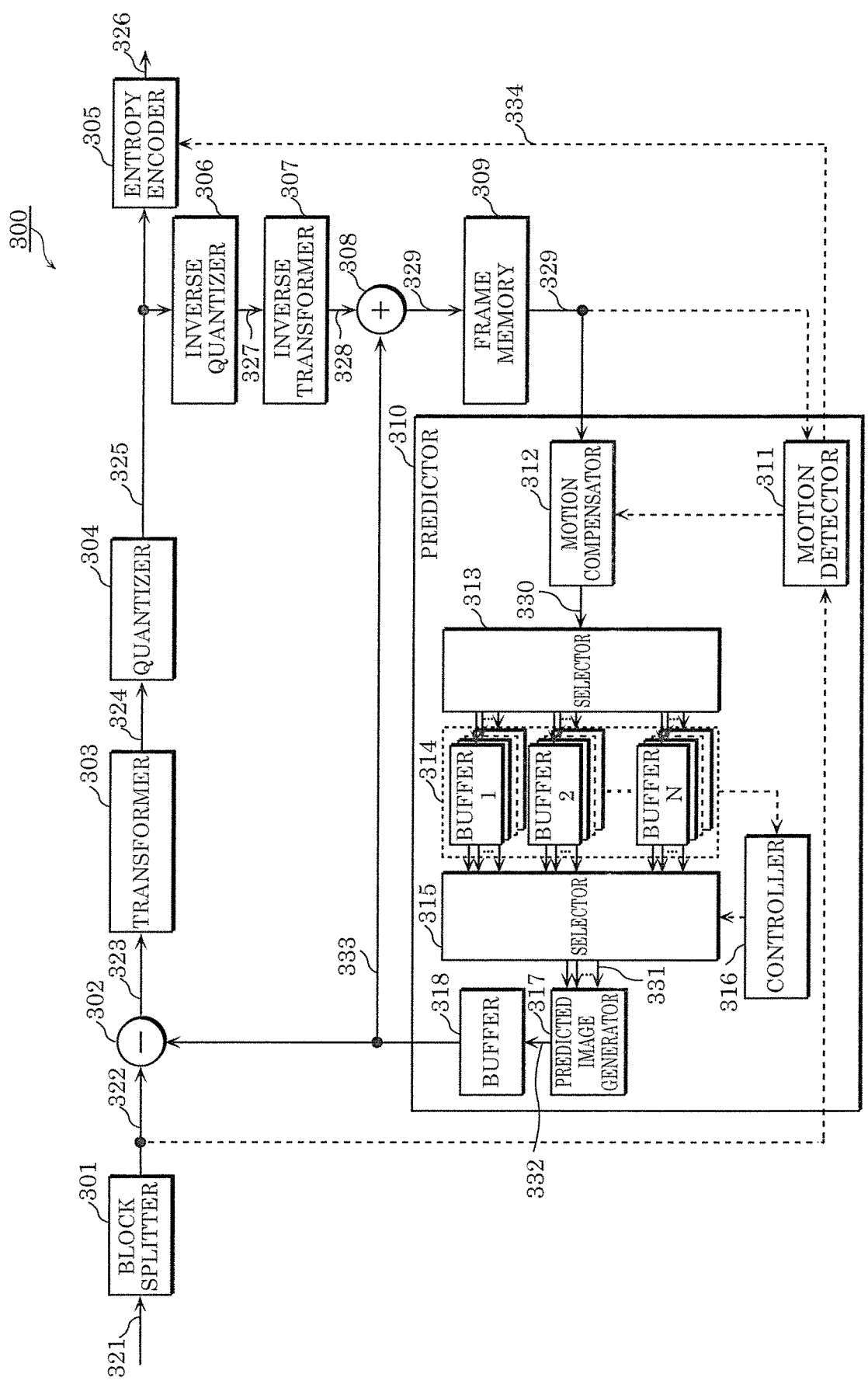
FIG. 14 is a block diagram of an image encoder according to Embodiment 2.

The following describes a configuration of the image encoder according to the present embodiment. FIG. 14 is a block diagram illustrating an example of a configuration of the image encoder according to the present embodiment. Image encoder 300 illustrated in FIG. 14 selects a motion vector and a reference frame which are to be used for prediction made for each small region and performs inter prediction, based on a motion vector and a decoded reference frame which the image decoder can use. Image encoder 300 includes block splitter 301, subtractor 302, transformer 303, quantizer 304, entropy encoder 305, inverse quantizer 306, inverse transformer 307, adder 308, frame memory 309, and predictor 310.

Block splitter 301 splits input image 321 into a plurality of coding blocks 322 which are encoding processing units. Subtractor 302 generates difference block 323 which is a difference between coding block 322 and predicted block 333. Transformer 303 generates coefficient block 324 by performing frequency transform on difference block 323. Quantizer 304 generates coefficient block 325 by quantizing coefficient block 324.

Entropy encoder 305 generates bitstream 326 by performing entropy encoding on coefficient block 325. Inverse quantizer 306 generates coefficient block 327 by performing inverse quantization on coefficient block 325, and inverse transformer 307 restores difference block 328 by performing inverse frequency transform on coefficient block 327. Adder 308 generates decoded block 329 (reconstructed image) by adding difference block 328 and predicted block 333. Decoded block 329 is stored into frame memory 309, and used for prediction processing.

Predictor 310 generates predicted block 333 using decoded block 329. Predictor 310 includes motion detector 311, motion compensator 312, selectors 313 and 315, buffers 314 and 318, controller 316, and predicted image generator 317.

Motion detector 311 detects motion to calculate a motion vector using coding block 322 and decoded block 329. Here, motion detector 311 calculates a plurality of motion vectors (N motion vectors: N is an integer greater than or equal to 2) for one coding block 322. Motion information 334 for identifying such N motion vectors is sent to entropy encoder 305 and encoded. Specifically, encoded bitstream 326 includes motion information 334 for identifying N motion vectors for each coding block 322.

Motion compensator 312 generates a plurality of reference blocks 330 by performing motion compensation using calculated N motion vectors. Specifically, when M reference frames (where M is an integer of 2 or greater) is used, motion compensator 312 generates M reference blocks 330 for each motion vector. Specifically, N×M reference blocks 330 are generated.

A plurality of (N×M) buffers 314 are divided into N buffer groups. N buffer groups are in one-to-one correspondence with N motion vectors. Each buffer group includes M buffers, and M buffers are in one-to-one correspondence with M reference frames. N×M reference blocks 330 generated by motion compensator 312 are temporarily stored into buffers 314 in correspondence, via selector 313.

Controller 316 evaluates, for each small region in coding block 322 and for each motion vector, a correlation of M reference pixels 331 on M reference frames, and selects one motion vector and a plurality of reference frames to be used for prediction. Controller 316 outputs a plurality of reference pixels 331 indicated by motion vectors selected for small regions, to predicted image generator 317 via selector 315. Here, reference pixels 331 constitute an image (pixel values) having the same size as the size of small regions on a plurality of reference frames (reference blocks 330).

Predicted image generator 317 generates, for each small region, predicted image 332 using obtained reference pixels 331. For example, predicted image generator 317 generates, for each small region, predicted image 332 using a weighted average of obtained reference pixels 331.

Predicted image 332 is stored into buffer 318, and a plurality of predicted images 332 corresponding to coding block 322 are output as predicted block 333.

Note that frequency transform processing and quantization processing may be performed one by one as different processing, or may be performed at a time. Similarly, inverse quantization processing and inverse frequency transform processing may be performed one by one as different processing, or may be performed at a time.

Quantization is processing of digitizing values sampled at predetermined spacings, in association with predetermined levels. Inverse quantization is processing of restoring a value obtained by quantization to a value in an original section. In the data compression field, quantization means processing of dividing a value into sections rougher than the sections of an original value, whereas inverse quantization means processing of redividing the rough sections into the original fine sections. In the codec technical field, quantization and inverse quantization may be referred to as rounding off, rounding, or scaling.

FIG. 14 mainly illustrates a distinguishing configuration of the present embodiment only, yet generally used inter prediction and intra prediction, for instance, may be further used. In this case, a technique which yields highest encoding efficiency is selected for each coding block 322, from among prediction processing, inter prediction, and intra prediction described above.

Here, an example in which N motion vectors are selected for each coding block 322 has been described, yet N motion vectors may be selected for each processing unit into which coding block 322 has been split.

Figure 15:
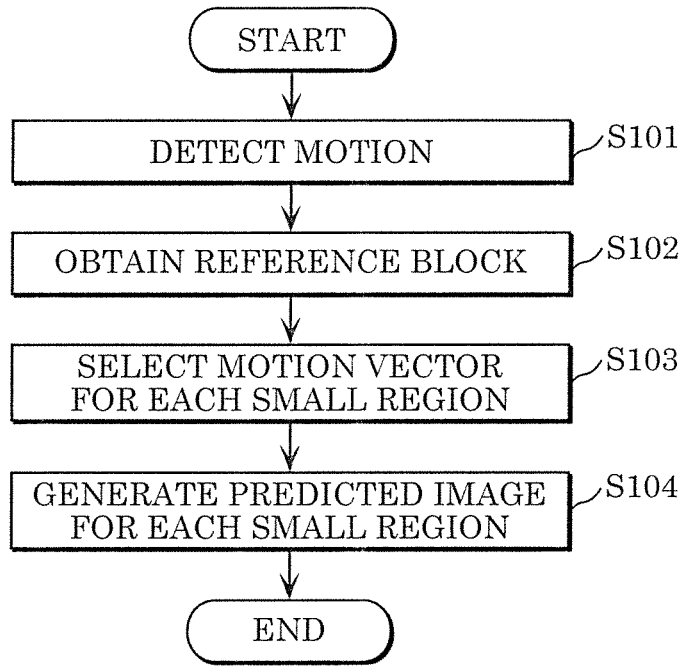
FIG. 15 is a flowchart of prediction processing according to Embodiment 2.

The following describes operation by image encoder 300. FIG. 15 is a flowchart illustrating an example of operation for inter prediction processing by image encoder 300.

Figure 16:
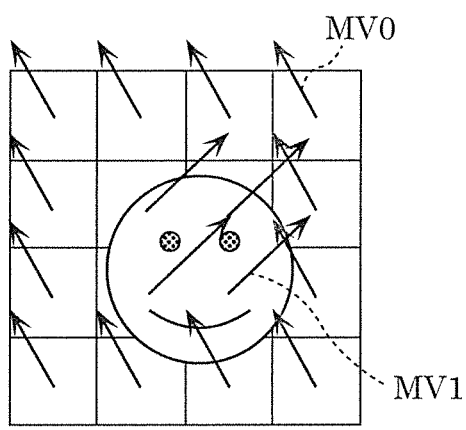
FIG. 16 is a diagram illustrating motion detection processing according to Embodiment 2.

First, motion detector 311 calculates, by motion detection, N motion vectors in coding block 322 which is a processing target (S101). Specifically, as illustrated in FIG. 16, motion detector 311 obtains a motion vector for each small region, and selects N representative motion vectors from among the obtained motion vectors. For example, motion detector 311 selects N motion vectors which highly frequently occur (which are at a peak of a histogram) from among a plurality of motion vectors. For example, as illustrated in FIG. 16, motion vector MV0 which indicates background motion, and motion vector MV1 which indicates foreground motion (motion of a moving object) are selected.

The image decoder is notified of information which indicates N selected motion vectors as a portion of encoded bitstream 326. Note that as a searching method, an arbitrary method may be used as long as the method allows motion detection for each small region.

Next, motion compensator 312 obtains a reference block using the motion vectors (S102). Specifically, as illustrated in FIG. 17, motion compensator 312 scales the motion vectors obtained in step S101, and obtains corresponding reference blocks on reference frames.

Figure 17:
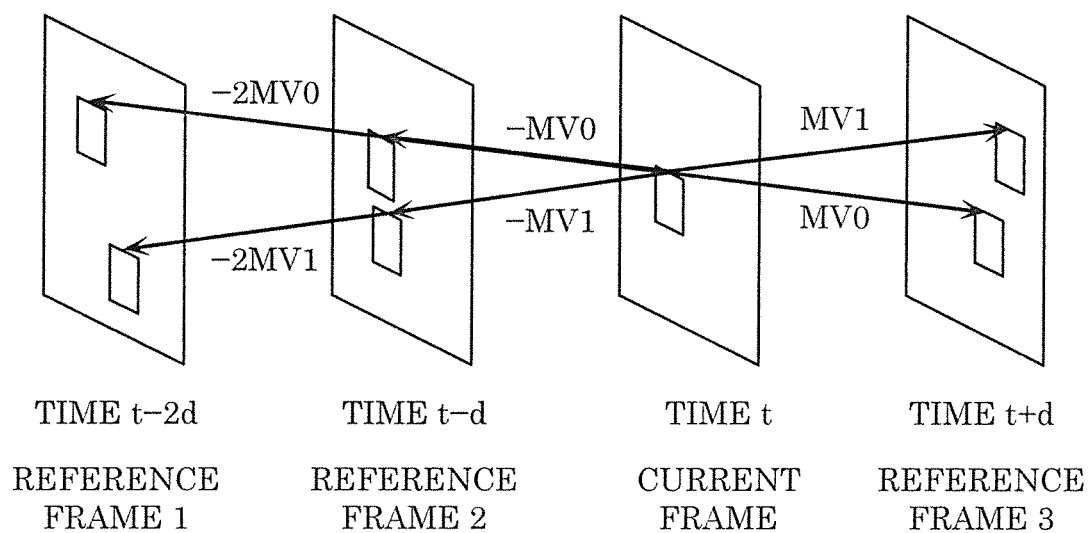
FIG. 17 is a diagram illustrating reference block obtaining processing according to Embodiment 2.

In the example in FIG. 17, a current frame at time t and reference frames 1 to 3 at time t−2d, time t−d, and time t+d. In this case, motion compensator 312 derives motion vectors −MV0 and −2MV0 by scaling motion vector MV0, and obtains a reference block on reference frame 3 indicated by motion vector MV0, a reference block on reference frame 2 indicated by motion vector MV0, and a reference block on reference frame 1 indicated by motion vector −2MV0. Similarly, motion compensator 312 derives motion vector −MV1 and −2MV1 by scaling motion vector MV1, and obtains a reference block on reference frame 3 indicated by motion vector MV1, a reference block on reference frame 2 indicated by motion vector −MV1, and a reference block on reference frame 1 indicated by motion vector −2MV1. Obtained reference blocks 330 are stored into buffer 314.

Figure 18:
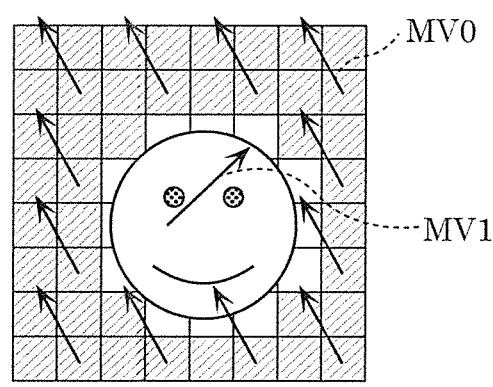
FIG. 18 is a diagram illustrating motion vector selection processing according to Embodiment 2.

Next, controller 316 selects, for each small region, a motion vector from among a plurality of motion vectors (S103). Specifically, controller 316 evaluates, for each small region, a correlation of reference pixels based on motion vectors, assuming that there is linear uniform motion. Then, controller 316 selects, for each small region, a motion vector having a high correlation as illustrated in FIG. 18.

Note that a small region may not only be a rectangular block such as 4×4 pixels or 2×2 pixels, but also be one pixel. When a motion vector is selected per pixel, determination is conceivably unstable since reference pixels on forward and backward frames may accidentally match. In view of this, controller 316 evaluates a correlation for a broad range such as 3×3 pixels or 5 pixels including pixels disposed vertically and horizontally. For example, controller 316 may take a measure such as applying, for instance, a 3×3 pixel low-pass filter to reference pixels or selecting the same vector when vectors selected for surrounding pixels are the same.

Next, predictor 310 generates, for each small region, predicted image 332 (S104). For example, as such a method, it is possible to use a method in which pixels in a reference frame having a time distance close to a current frame to be encoded are used as predicted image 332 (predicted value) or a method in which a weighted average calculated according to a time distance using a plurality of reference pixels is used as predicted image 332, for instance. To calculate a weighted average, a weighting may be explicitly notified for each sequence, each picture, or each slice. There may be a reference frame for which a weighting is set to 0.

In step S103 in FIG. 15, there may be a case where it is difficult to select a motion vector by simple evaluation of a correlation of reference pixels, like when reference pixels in a background region are covered by a foreground. Accordingly, controller 316 further obtains, using a motion vector of the foreground, a point on a current frame to be encoded corresponding to reference pixels, and determines whether a motion vector selected for pixels at the corresponding point is a motion vector of the foreground. For example, a rule is predetermined such as first notifying a motion vector of the background when the image encoder notifies the image decoder of motion vectors. Accordingly, the image decoder can be informed which motion vector is a motion vector of the background. In addition, the image encoder can determine, for a region for which it is difficult to select a motion vector, a region according to which of motion vectors is a background, by evaluating a correlation of reference pixels with current pixels.

Specifically, if pixels at a corresponding point are indicated by a motion vector of the foreground, controller 316 determines that reference pixels belong to a region according to a motion vector of the foreground, and does not use the reference pixels to predict the region considered to be a background region. On the other hand, if a motion vector selected for pixels at a corresponding point is a motion vector of the background, controller 316 determines that reference pixels belong to a region according to a motion vector of the background, and uses the reference pixels to predict the region considered to be a background region. If it is difficult to select a motion vector for pixels at a corresponding point by only making simple evaluation of a correlation of reference pixels, a corresponding point is considered to belong to a background region covered by the foreground in a reference frame. Thus, controller 316 determines that reference pixels belong to a region according to a motion vector of the background, and uses reference pixels to predict the region considered to be the background region.

Figure 19:
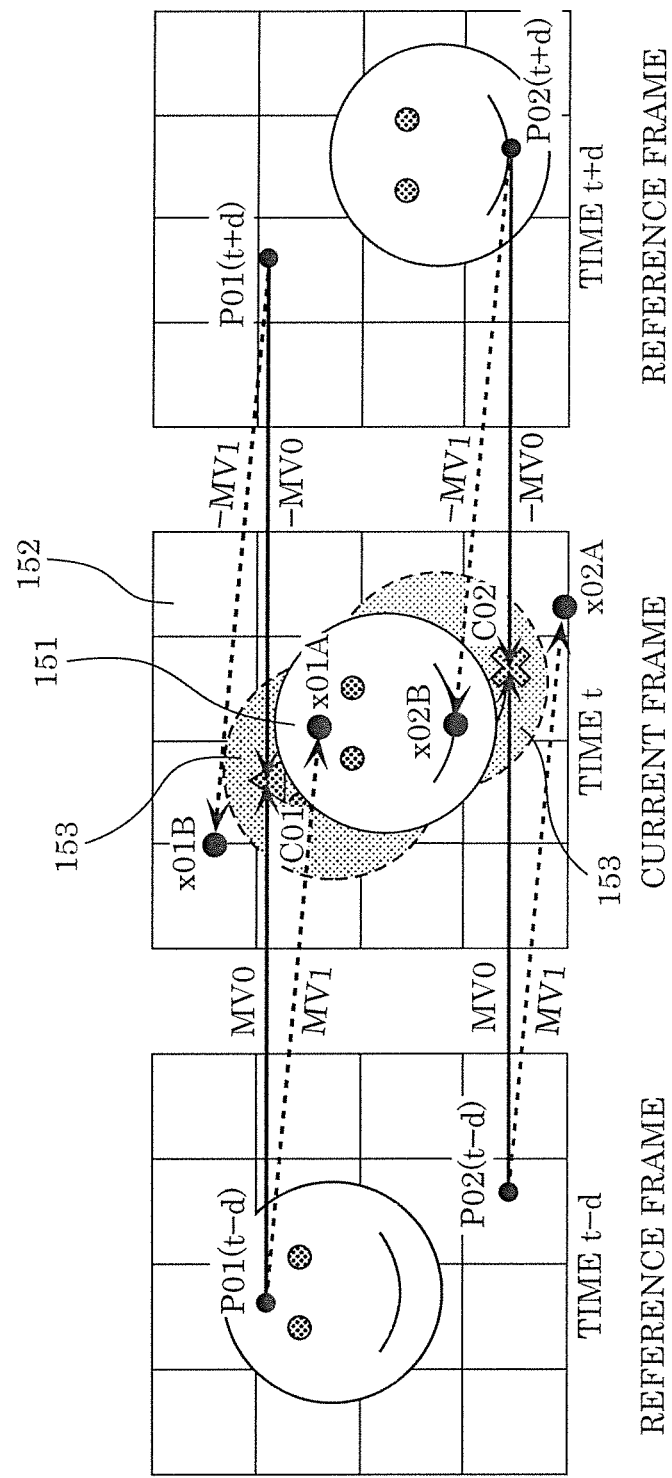
FIG. 19 is a diagram illustrating processing for an unidentified region according to Embodiment 2.

The following describes an example in the case of referring to a total of two reference frames whose display times are before and after the display time of a current frame. FIG. 19 is a diagram illustrating an example of operation in such a case. Here, motion vector MV0 is a motion vector of the background (background vector), and motion vector MV1 is a motion vector of the foreground (foreground vector).

First, through step S103 in FIG. 15, as illustrated in FIG. 19, small regions on a current frame to be encoded are divided into foreground region 151, background region 152, and unidentified region 153. Foreground region 151 is a small region for which a motion vector of the foreground is selected, and background region 152 is a small region for which a motion vector of the background is selected. Unidentified region 153 is a region other than foreground region 151 and background region 152. Unidentified region 153 is considered to be a background region covered by the foreground in a reference frame. Unidentified region 153 is a region for which any motion vectors do not indicate reference pixels having a high correlation. Note that a high/low correlation means that, for example, a correlation is higher/lower than a predetermined reference value.

Next, controller 316 obtains, for unidentified region 153, a corresponding point on a current frame based on foreground vector MV01, for reference pixels based on background vector MV0, and determines which of foreground region 151, background region 152, and unidentified region 153 the corresponding point on the current frame belongs to. Then, controller 316 uses, for prediction, reference pixels whose corresponding point belongs to the background (background region 152 or unidentified region 153). In the example of small region C01 illustrated in FIG. 19, reference pixels P01(t−d) and P01(t+d) based on background vector MV0 are present. Corresponding point X01A of reference pixels P01(t−d) belongs to foreground region 151, and thus reference pixels P01(t−d) are not used for prediction. Corresponding point X01B of reference pixels P01(t+d) belongs to background region 152, and thus reference pixels P01(t+d) are used for prediction. In the example of small region C02, reference pixels P02(t−d) and P02(t+d) based on background vector MV0 are present. Corresponding point X02A of reference pixels P02(t−d) belongs to background region 152, and thus reference pixels P02(t−d) are used for prediction. Corresponding point X02B of reference pixels P02(t+d) belongs to foreground region 151, and thus reference pixels P02(t+d) are not used for prediction.

In the method illustrated in FIG. 19, if all the pixels at a corresponding point are unencoded (undecoded) pixels outside a current block and cannot be used for determination, it is better not to use reference pixels according to the corresponding point to predict a current region. Nevertheless, if the method is a determination method which brings the same result to the image encoder and the image decoder, such reference pixels may be used for prediction of the region. Note that even if pixels at a corresponding point are unencoded (undecoded) pixels outside a current block, when other reference pixels for the current region are determined to be in the foreground, the other reference pixels may be determined to be in the background and used for prediction.

In the method in FIG. 19 and the method described above, if pixels to be used for prediction are not found, controller 316 determines that all the pixels on reference frames corresponding to pixels in a current small region are covered by the foreground, and determines a predicted value for the pixels by copying a predicted value (predicted image) for pixels in a background region in the vicinity thereof.

Figure 20:
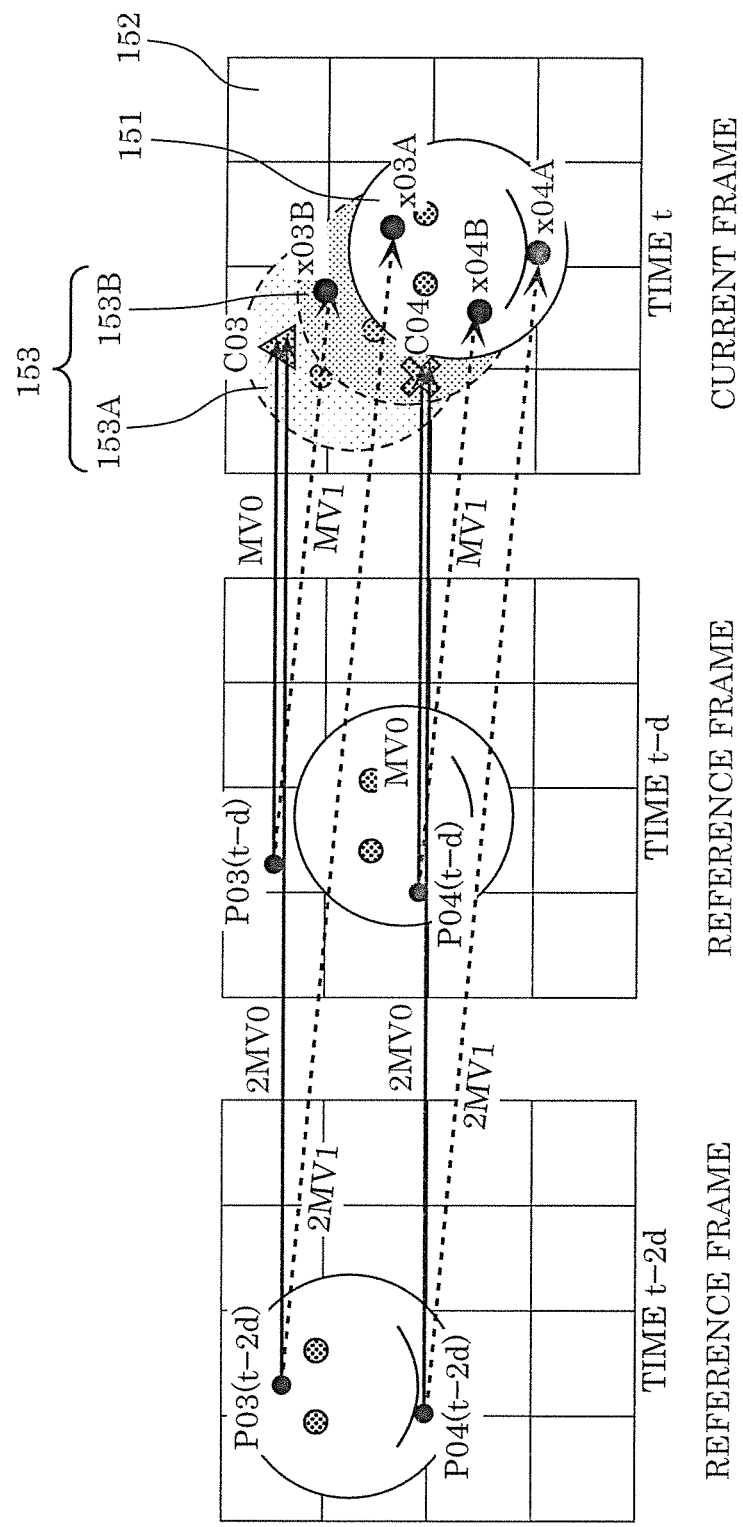
FIG. 20 is a diagram illustrating the processing for an unidentified region according to Embodiment 2.

The following describes an example in the case of referring to a total of two reference frames whose display times are before the display time of the current frame only. FIG. 20 is a diagram illustrating an example of operation in this case.

Similarly to the example in FIG. 19, controller 316 divides small regions into foreground region 151, background region 152, and unidentified region 153. Furthermore, controller 316 divides unidentified regions 153 into region 153A for which one reference pixel can be used and region 153B for which no reference pixels that can be used are present.

Specifically, in the example of small region C03 belonging to region 153A, reference pixels P03($t$–2d) and P03($t$–d) based on background vector MV0 are present. Corresponding point X03A of reference pixels P03($t$–2d) belongs to foreground region 151, and thus reference pixels P03($t$–2d) are not used for prediction. Corresponding point X03B of reference pixels P03($t$–d) belongs to background region 152, and thus reference pixels P03($t$–d) are used for prediction.

On the other hand, in the example of small region C04 belonging to region 153B, reference pixels P04($t$–2d) and P04($t$–d) based on background vector MV0 are present. Reference pixels P04($t$–2d) and P04($t$–d) both belong to foreground region 151, and thus reference pixels P04($t$–2d) and P04($t$–d) are not used for prediction. In this case, there are no pixels to be used for reference, and thus controller 316 determines a predicted value for pixels in small region C04 by copying a predicted value for pixels in background region 152 in the vicinity thereof.

Figure 21:
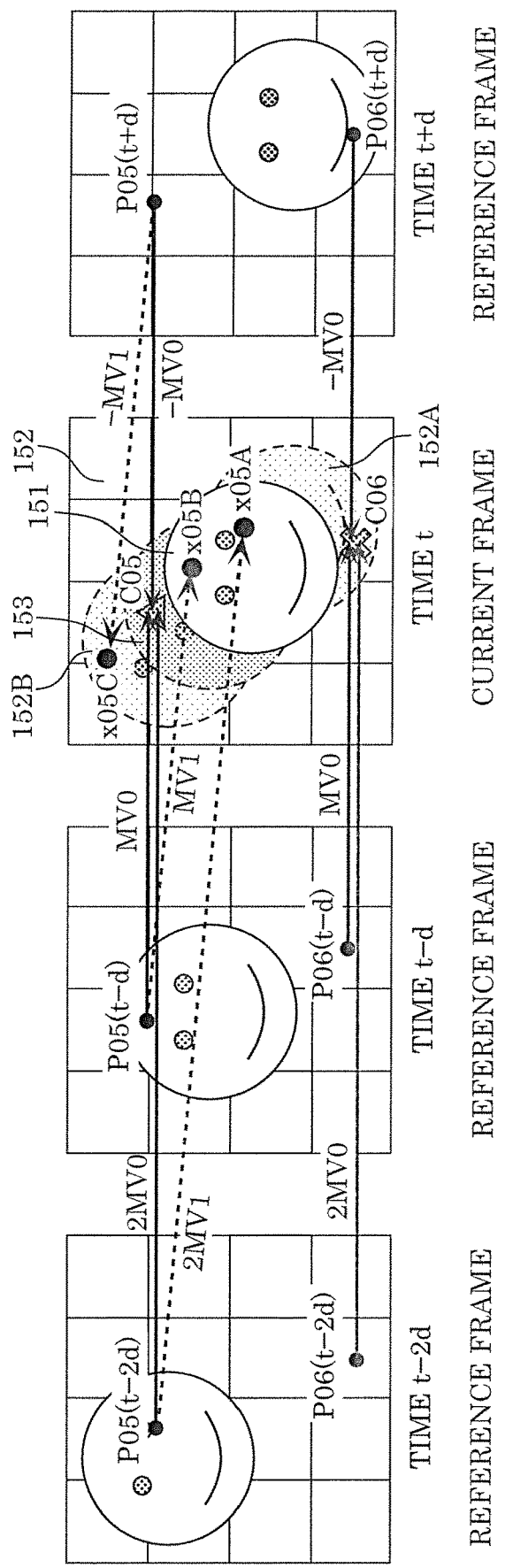
FIG. 21 is a diagram illustrating the processing for an unidentified region according to Embodiment 2.

The following describes an example in the case of referring to a total of three reference frames whose display times are before and after the display time of the current frame. FIG. 21 is a diagram illustrating an example of operation in this case.

Similarly to the example in FIGS. 19 and 20, also in this case, controller 316 divides small regions into foreground region 151, background region 152 (152A and 152B), and unidentified region 153.

Specifically, in the example of small region C05 belonging to region 153, reference pixels P05($t$–2d), P05($t$–d), and P05($t$+d) based on background vector MV0 are present. Corresponding points X05A and X05B of reference pixels P05($t$–2d) and P05($t$–d) belong to foreground region 151, and thus reference pixels P05($t$–2d) and P05($t$–d) are not used for prediction. Corresponding point X05C of reference pixels P05($t$+d) belongs to background region 152, and thus reference pixels P05($t$+d) are used for prediction.

Small region C06 belonging to background region 152A is covered by the foreground in the reference frame at time t+d, but has a high correlation with reference pixels P06($t$–d) and reference pixels P06($t$–2d) on the two reference frames. Accordingly, controller 316 determines small region C06 to be a background region, and uses reference pixels P06($t$–d) and P06($t$–2d) to determine predicted image 332 of small region C06. Similarly, background region 152B is covered by the foreground in the reference frame at time (t–2d), but has a high correlation with reference pixels on the frames at time (t–d) and time (t+d). Accordingly, controller 316 uses, for background region 152B, the reference pixels on the frames at time (t–d) and time (t+d).

Figure 22:
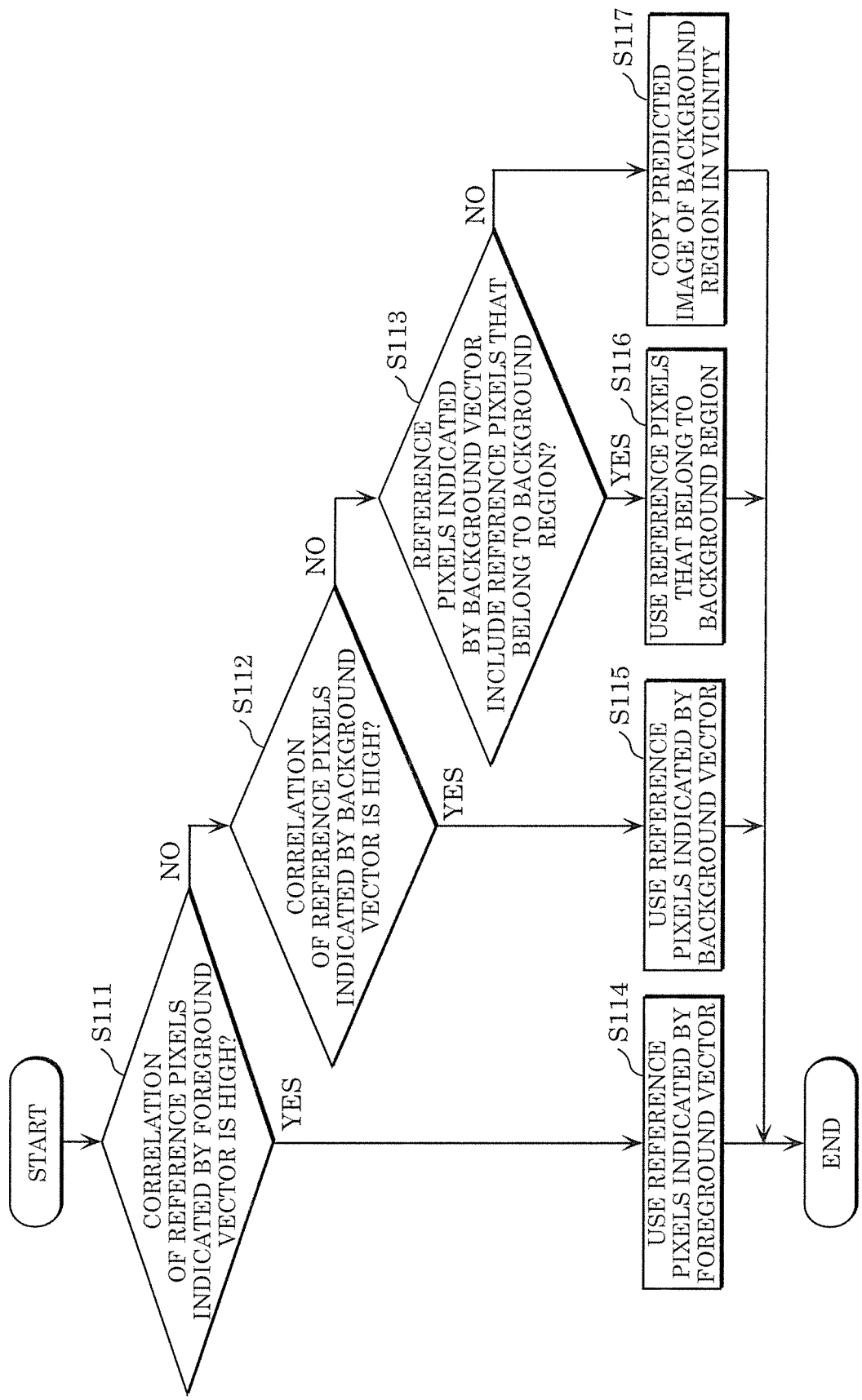
FIG. 22 is a flowchart of processing of selecting a motion vector and reference pixels according to Embodiment 2.

FIG. 22 is a flowchart of processing (steps S103 and S104 in FIG. 15) of selecting a motion vector and reference pixels according to the present embodiment. This processing is performed for each small region.

As illustrated in FIG. 22, if a correlation of a plurality of reference pixels indicated by a foreground vector (a motion vector for the foreground) is high (Yes in S111), controller 316 determines that a small region subjected to processing belongs to a foreground region, selects the foreground vector, and determines to use the plurality of reference pixels indicated by the foreground vector for prediction of the small region subjected to processing (S114).

If a correlation of a plurality of reference pixels indicated by a background vector (a motion vector for the background) is high (Yes in S112), controller 316 determines that a small region subjected to processing belongs to a background region, selects the background vector, and determines to use the plurality of reference pixels indicated by the background vector for prediction of the small region subjected to processing (S115).

Note that as described above, if three or more reference frames are used, controller 316 determines that a small region subjected to processing belongs to a background region, when a correlation of reference pixels on at least two frames is high. Furthermore, controller 316 determines to use, for prediction of a small region subjected to processing, reference pixels having a high correlation among a plurality of reference pixels indicated by a background vector.

If any of reference pixels indicated by a foreground vector and a background vector do not indicate a high correlation (No in Sill and also No in S112), controller 316 determines whether reference pixels which belong to a background region are present among the reference pixels indicated by the background vector (S113). Specifically, as described above, if a corresponding point of reference pixels belongs to a background region, controller 316 determines that the reference pixels belong to the background region.

If reference pixels that belong to the background region are present among the reference pixels indicated by the background vector (Yes in S113), controller 316 determines to use the reference pixels for prediction of a small region subjected to processing (S116).

On the other hand, if the reference pixels indicated by the background vector do not include reference pixels belonging to a background region (No in S113), that is, for example, if all the reference pixels belong to a foreground region or are present outside a block, controller 316 determines to use (copy) a predicted image of a small region included in the background region in the vicinity thereof, for a predicted image of a small region subjected to processing (S117).

Figure 23:
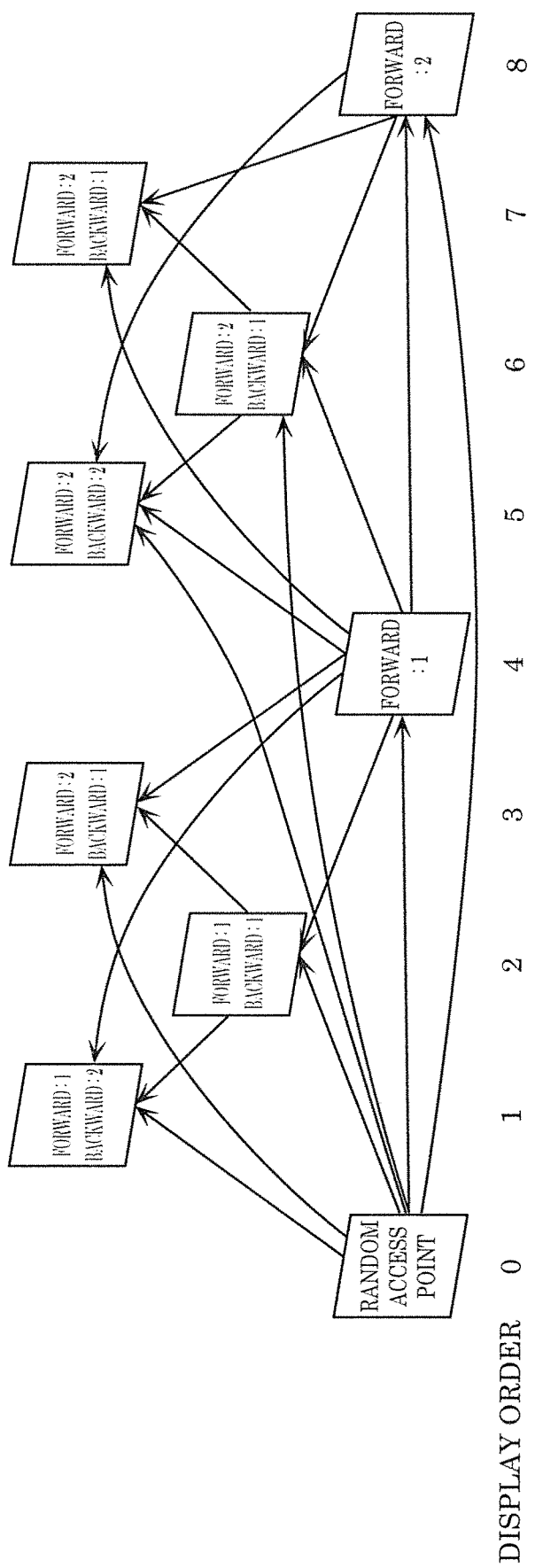
FIG. 23 is a diagram illustrating an example of an encoding structure according to Embodiment 2.

The following describes an example of application of the prediction method according to the present embodiment. FIG. 23 is a diagram illustrating a hierarchical inter prediction encoding structure called HB3. As illustrated in FIG. 23, two or more reference frames can be used for frames other than the zeroth frame (random access point) and the fourth frame in the display order. Accordingly, the prediction method according to the present embodiment is applicable to the frames excluding the zeroth and fourth frames.

Note that the following method can be used as a method of the image encoder notifying the image decoder of information indicating that the prediction method according to the present embodiment is used.

For example, as one of prediction types notified for each predicted block, a prediction type which indicates the above prediction method may be added to the conventional prediction type. Alternatively, in conventional bi-prediction in which two motion vectors are notified, only a method of generating a predicted image may be replaced with the prediction method according to the present embodiment. Information for notifying whether to add the prediction method according to the present embodiment as a new prediction type or whether to replace the prediction method of the conventional bi-prediction with the prediction method according to the present embodiment may be embedded in a sequence parameter set (hereinafter, SPS), a picture parameter set (hereinafter, PPS), or a slice header (hereinafter, SH), for instance, and the prediction method may be changed per sequence, picture, or slice.

Note that in the above description, a motion vector and a reference frame to be used are selected for each small region (having 4×4 or 2×2 pixels, for instance) in a coding block, and makes prediction. The size of such a small region may be fixed to a predetermined size such as 4×4 or 2×2 pixels, or information indicating the size may be embedded in SPS, PPS, or SH and the size may be changed per sequence, picture, or slice unit.

The size of a small region is based on a plurality of pixels such as 4×4 pixels, and only when prediction is effective if the size is smaller than 4×4 as in the case where, for instance, the boundary of an object is included in the 4×4 pixels, a hierarchical change can also be made for change in a unit of 2×2 pixels or 1 pixel. By also embedding, in SPS, PPS, or SH, change information that is information indicating whether to make a hierarchical change, control can be changed per sequence, picture, or slice.

In the above description, a motion vector and a reference frame which are to be used are selected for each small region in a coding block, based on a correlation of reference pixels on reference frames, and prediction is made. Yet, by embedding in, for instance SPS, PPS, or SH, a parameter such as a threshold used as a criterion for determining how high a correlation is, adjustment can be made according to the amount of noise in an image when encoding the image.

Figure 24:
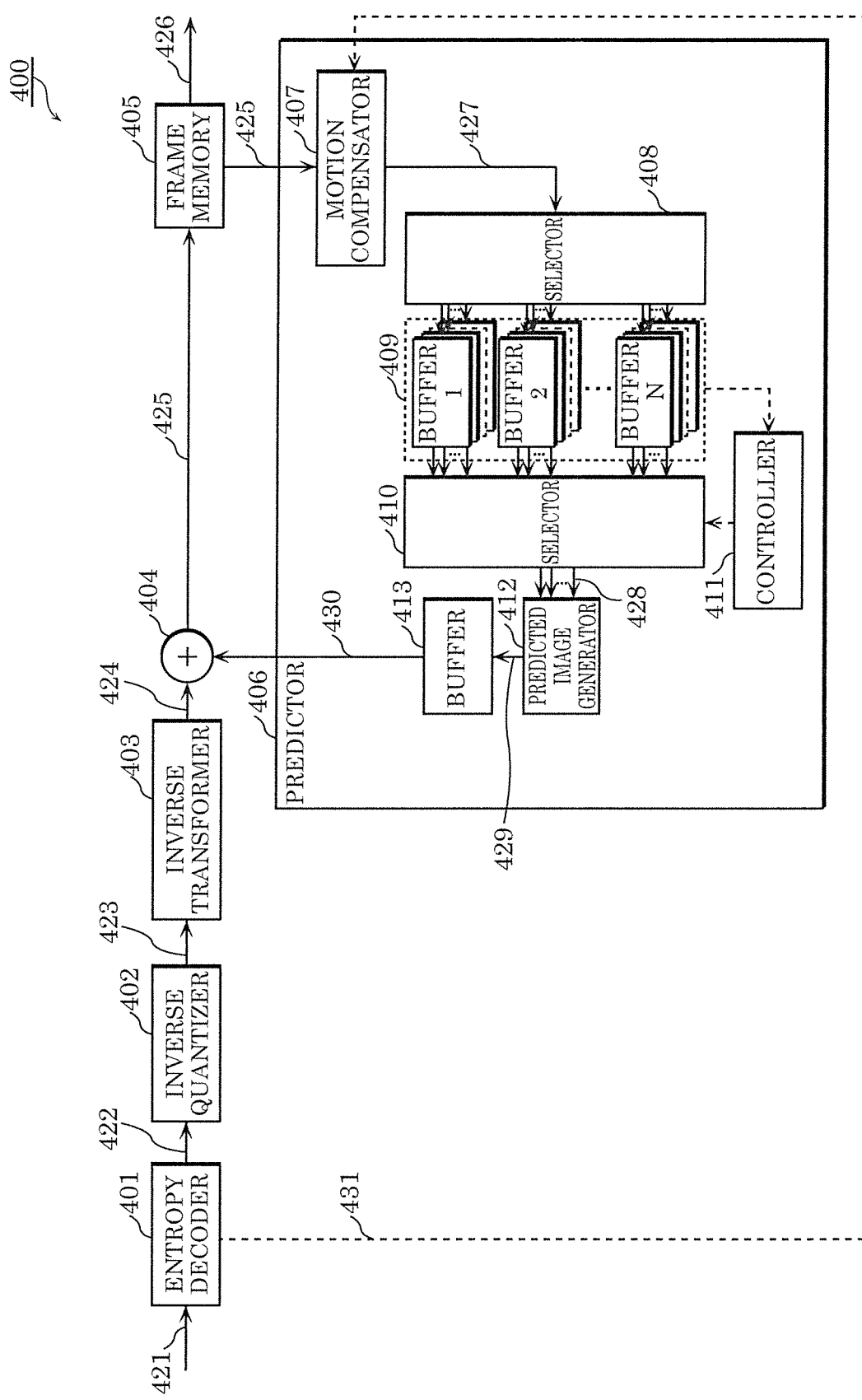
FIG. 24 is a block diagram of an image decoder according to Embodiment 2.

The following describes a configuration of the image decoder according to the present embodiment. FIG. 24 is a block diagram illustrating an example of a configuration of image decoder 400 according to the present embodiment. Image decoder 400 illustrated in FIG. 24 generates decoded image 426 by decoding bitstream 421 which is bitstream 326 generated by image encoder 300 described above.

Image decoder 400 includes entropy decoder 401, inverse quantizer 402, inverse transformer 403, adder 404, frame memory 405, and predictor 406.

Entropy decoder 401 decodes coefficient block 422 and motion information 431, from bitstream 421 generated by encoding a still image or video each including one or more pictures. Here, motion information 431 corresponds to motion information 334 described above, and is for identifying a plurality of motion vectors for each coding block.

Inverse quantizer 402 generates coefficient block 423 by performing inverse quantization on coefficient block 422. Inverse transformer 403 generates difference block 424 by performing inverse transformation on coefficient block 423.

Adder 404 generates decoded block 425 by adding difference block 424 and predicted block 430. Decoded block 425 is stored into frame memory 309 and output as decoded image 426, and also is used for prediction processing.

Note that the sizes of difference block 424, decoded block 425, and predicted block 430 are, for example, the same as the size of the above-described coding block which is a prediction processing unit.

Predictor 406 generates predicted block 430 using decoded block 425. Predictor 406 includes motion compensator 407, selectors 408 and 410, buffers 409 and 413, controller 411, and predicted image generator 412.

Note that operation of the processing sections included in predictor 406 is similar to the operation of the processing sections included in predictor 310 included in image encoder 300 described above. Note that in predictor 310, motion detector 311 detects a plurality of motion vectors for each coding block, yet in predictor 406, motion information 431 included in bitstream 421 indicates a plurality of motion vectors for each coding block.

Specifically, motion compensator 407 generates a plurality of reference blocks 427 by performing motion compensation using N motion vectors indicated by motion information 431. A plurality of (N×M) buffers 409 are divided into N buffer groups. N buffer groups are in one-to-one correspondence with N motion vectors. Each buffer group includes M buffers, and M buffers are in one-to-one correspondence with M reference frames. N×M reference blocks 427 generated by motion compensator 407 are temporarily stored in corresponding buffers 409 via selector 408.

Controller 411 evaluates, for each small region in a coding block and for each motion vector, a correlation of M reference pixels 428 on M reference frames, and selects one motion vector and a plurality of reference frames to be used for prediction. Controller 411 outputs a plurality of reference pixels 428 indicated by motion vectors selected for small regions to predicted image generator 412 via selector 410.

Predicted image generator 412 generates, for each small region, predicted image 429 using obtained reference pixels 428. Predicted image 429 is stored into buffer 413, and a plurality of predicted images 429 for a coding block are output as predicted block 430.

Note that inverse quantization processing and inverse frequency transform processing may be performed one by one as different processing, or may be performed at a time. Furthermore, according to a currently mainstream coding standard such as HEVC, inverse quantization processing and inverse frequency transform processing are performed at a time. Also on the decoding side, an expression such as scaling may be used for such processing, similarly to the encoding side.

In addition, similarly to the encoding side, generally used inter prediction and intra prediction, for instance, may be further used. In this case, information indicating which of prediction processing, inter prediction, and intra prediction described above is to be used is included in bitstream 421, and image decoder 400 selects a prediction method for each coding block according to the information.

Note that although the above description shows an example in which one foreground vector and one background vector are used for each coding block, a plurality of foreground vectors or a plurality of background vectors may be used, or a plurality of foreground vectors and a plurality of background vectors may be used. For example, two foreground vectors and two background vectors may be used. In this case, a plurality of motion vectors are obtained for each small region on reference frame 1, and two motion vectors which highly frequently occur (foreground vector 1 and background vector 2) are selected from among the motion vectors. Similarly, a plurality of motion vectors are obtained for each small region on reference frame 2, and two motion vectors which highly frequently occur (foreground vector 2 and background vector 2) are selected from among the motion vectors.

In this case, as combinations of a foreground vector and a background vector, there are four conceivable combinations, namely (foreground vector 1 and background vector 1), (foreground vector 1 and background vector 2), (foreground vector 2 and background vector 1), and (foreground vector 2 and background vector 2). Accordingly, image encoder 300 (or image decoder 400) calculates cost values of such four combinations, and selects a combination having the lowest cost value, as a pair of a foreground vector and a background vector to be used.

Specifically, a sum of a total of the prediction residual of a foreground region, a total of the prediction residual of a background region, a total of the prediction residual of the other regions is calculated as residual of a coding block. Further, a bit amount of motion vectors is calculated. An additional value or a weighting additional value of the residual of the coding block and the bit amount of motion vectors is calculated as a cost value.

Note that if there is no difference (or a small difference) in bit amount of motion vectors, a cost value may be calculated using only the residual of a coding block.

In the above description, when reference pixels of a reference frame cannot be used, a predicted image in a nearby background region is used for a predicted image of a current small region (S117). Nevertheless, a pixel value of a background region near a current small region included in a current frame may be used as a predicted image of the current small region similarly to intra prediction, or may be copied as a pixel value of the current small region.

Figure 25:
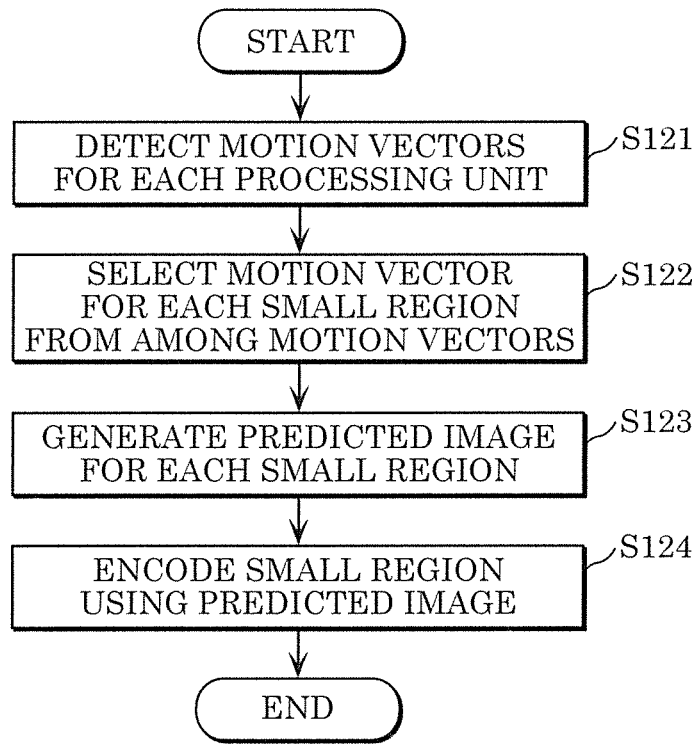
FIG. 25 is a flowchart of image encoding processing according to Embodiment 2.

As described above, image encoder 300 according to the present embodiment performs image encoding processing illustrated in FIG. 25. First, motion detector 311 detects, for each of processing units (coding blocks 322) obtained by splitting a current frame, motion vectors to be assigned to the processing unit (S121).

Next, based on the motion vectors and reference frames at different times, controller 316 selects, for each of small regions obtained by splitting a processing unit among the processing units, a motion vector to be used, from among the motion vectors (S122).

For example, the reference frames include a first frame and a second frame, and controller 316 obtains, for each of the motion vectors, a correlation between a region (reference pixels 331) on the first frame and a region (reference pixels 331) on the second frame, and selects a highly correlated motion vector, the regions being indicated by the motion vector from a current small region included in a current frame. Note that a motion vector used here is a motion vector itself or a motion vector obtained by scaling the motion vector according to a time distance between a current frame and a reference frame.

The motion vectors include a background vector indicating background motion, and a foreground vector indicating foreground motion. Controller 316 selects the background vector when a correlation between regions indicated by the background vector and a correlation between regions indicated by the foreground vector are each lower than a predetermined value.

Next, predicted image generator 317 generates, for each of the small regions, predicted image 332 using the selected motion vector (S123). For example, if a correlation between regions indicated by the background vector and a correlation between regions indicated by the foreground vector are each lower than the predetermined value, predicted image generator 317 generates predicted image 332 using a region belonging to the background, among a first region on a first frame and a second region on a second frame which are indicated by the background vector. For example, predicted image generator 317 determines that the first region (or the second region) belongs to the background if a corresponding point which is a region on the current frame and is indicated by a foreground vector from the first region (or the second region) belongs to a background. If neither the first region nor the second region belongs to the background, predicted image generator 317 generates predicted image 332 of a current small region in a current frame, using a predicted image of a region near the current small region.

Next, encoder (subtractor 302, transformer 303, quantizer 304, and entropy encoder 305, for instance) encodes each of a plurality of small regions using predicted image 332 generated for the small region (S124). Specifically, the encoder calculates a difference between a pixel value of a small region and predicted image 332, and generates bitstream 326 by performing frequency transform, quantization, and entropy encoding (variable length encoding) on the difference.

Note that information detected in step S121 and indicating a plurality of motion vectors for each processing unit is included in bitstream 326 by being encoded. On the other hand, information indicating one motion vector selected for each small region in step S122 is not included in bitstream 326. Stated differently, information indicating one motion vector for each small region is not sent to the image decoder.

Figure 26:
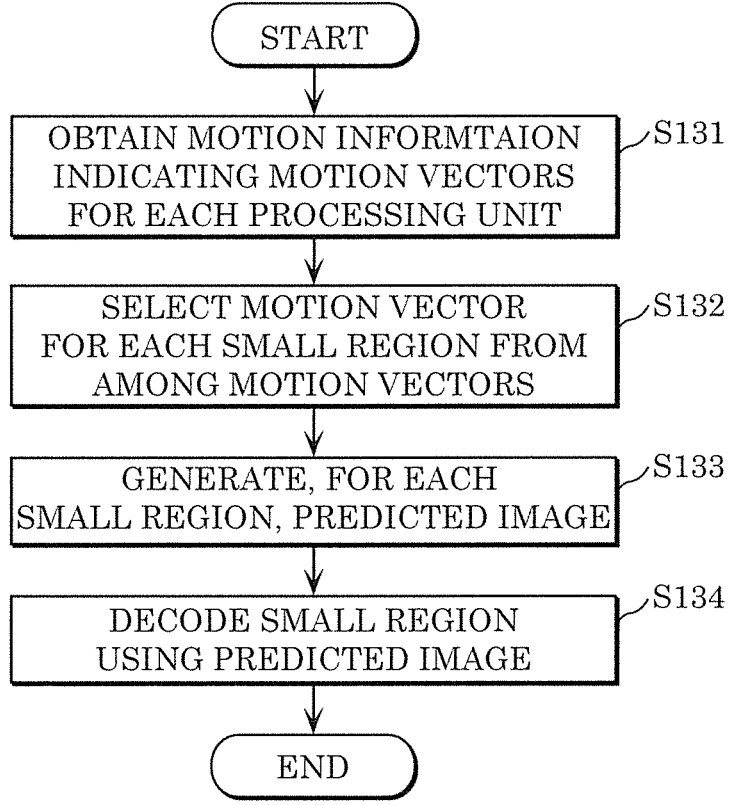
FIG. 26 is a flowchart of image decoding processing according to Embodiment 2.

Image decoder 400 according to the present embodiment performs image decoding processing illustrated in FIG. 26. First, entropy decoder 401 obtains, for each of processing units (coding blocks) obtained by splitting a current frame, motion vectors assigned to the processing unit (S131). Specifically, entropy decoder 401 obtains, from bitstream 421, motion information 431 which indicates a plurality of motion vectors assigned to a processing unit.

Next, based on the motion vectors and reference frames at different times, controller 411 selects, for each of small regions obtained by splitting a processing unit, a motion vector to be used from among the motion vectors (S132).

For example, the reference frames include a first frame and a second frame, and controller 411 obtains, for each of the motion vectors, a correlation between a region (reference pixels 428) on the first frame and a region (reference pixels 428) on a second frame, and selects a highly correlated motion vector, the regions being indicated by the motion vector from a current small region included in a current frame.

The motion vectors include a background vector which indicates background motion and a foreground vector which indicates foreground motion. Controller 411 selects a background vector if a correlation between regions indicated by the background vector and a correlation between regions indicated by the foreground vector are each lower than a predetermined value.

Next, predicted image generator 412 generates, for each of small regions, predicted image 429 using a selected motion vector (S133). For example, if a correlation between the regions indicated by the background vector and a correlation between the regions indicated by the foreground vector are each lower than the predetermined value, predicted image generator 412 generates a predicted image using a region belonging to the background among the first region on the first frame and the second region on the second frame which are indicated by the background vector. For example, if a corresponding point which is a region on the current frame and is indicated by the foreground vector from the first region (or the second region) belongs to the background, predicted image generator 412 determines that the first region (or the second region) belongs to the background. If neither the first region nor the second region belongs to the background, predicted image generator 412 generates predicted image 429 of a current small region in a current frame using a predicted image of a region near the current small region.

Next, a decoder (entropy decoder 401, inverse quantizer 402, inverse transformer 403, and adder 404, for instance) decodes each of a plurality of small regions using predicted image 429 generated for the small region (S134). Specifically, the decoder restores the difference value of a small region by performing entropy decoding (variable-length decoding), inverse quantization, and inverse frequency transform on encoded data of the small region. The decoder restores a pixel value of the small region by adding predicted image 429 to the difference value.

Note that the information which indicates a motion vector for each small region is not included in bitstream 421. Specifically, information which indicates a motion vector for each small region is not sent to the image decoder.

From the above, a motion vector to be used for a small region can be selected from among a plurality of motion vectors associated with each processing unit in the image decoder. Accordingly, it is possible to use different motion vectors for a plurality of small regions included in a processing unit. It is not necessary to include, in an encoded bitstream, information for designating a motion vector for each small region, and thus an increase in the data volume of the encoded bitstream can be inhibited. Thus, image encoder 300 and image decoder 400 according to the present embodiment can improve encoding efficiency.

Embodiment 3

The present embodiment describes a method of determining quantization control for processing blocks using, for example, motion vectors obtained by applying the method according to Embodiment 2.

Figure 27:
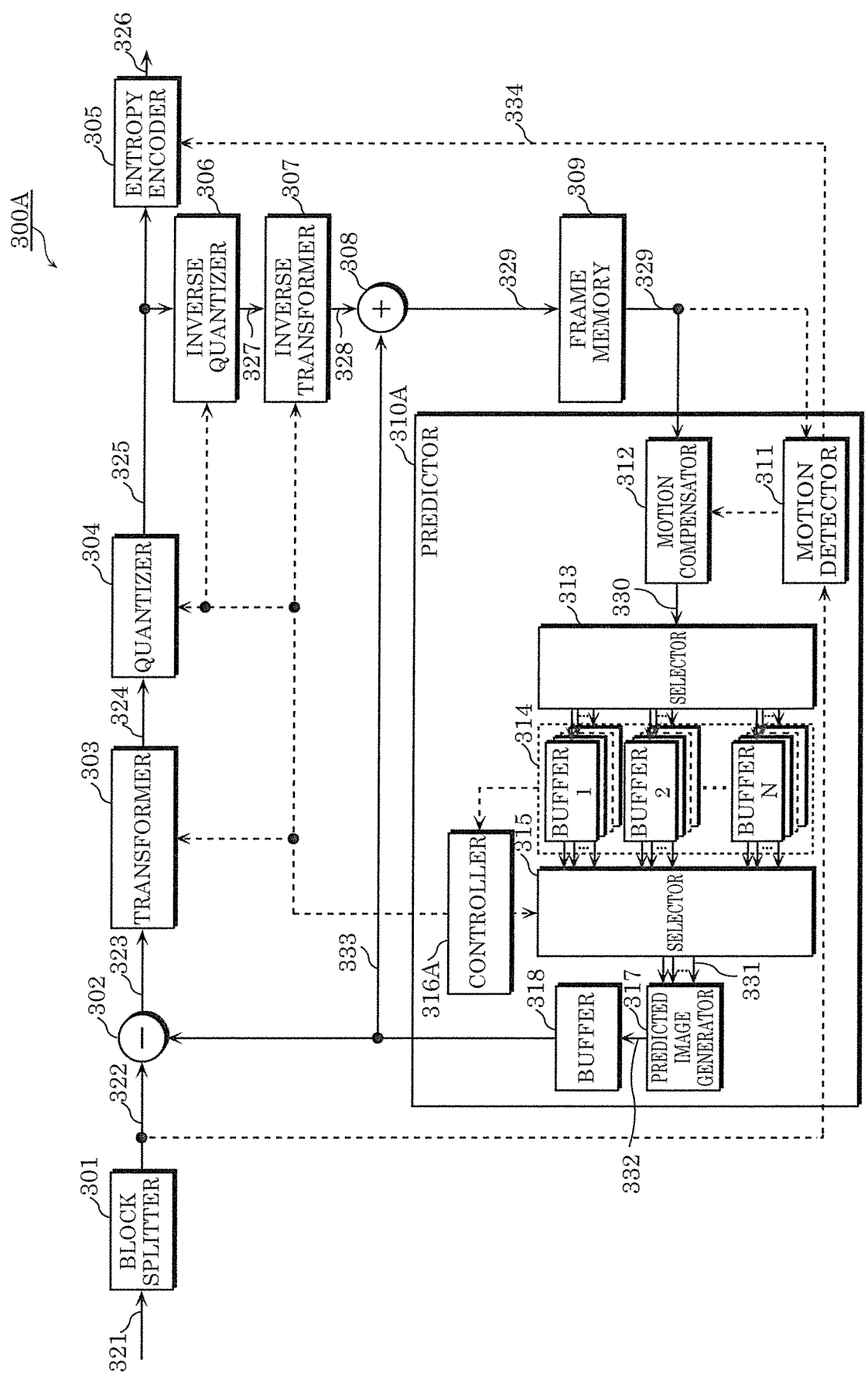
FIG. 27 is a block diagram illustrating an image encoder according to Embodiment 3.

FIG. 27 is a block diagram illustrating an example of a configuration of an image encoder according to the present embodiment. Image encoder 300A illustrated in FIG. 27 is image encoder 300 illustrated in FIG. 14 to which the functionality of controller 316A included in predictor 310A is added, instead of controller 316 included in predictor 310. Specifically, controller 316A has a function for controlling quantization and inverse quantization performed by quantizer 304 and inverse transformer 307.

Figure 28:
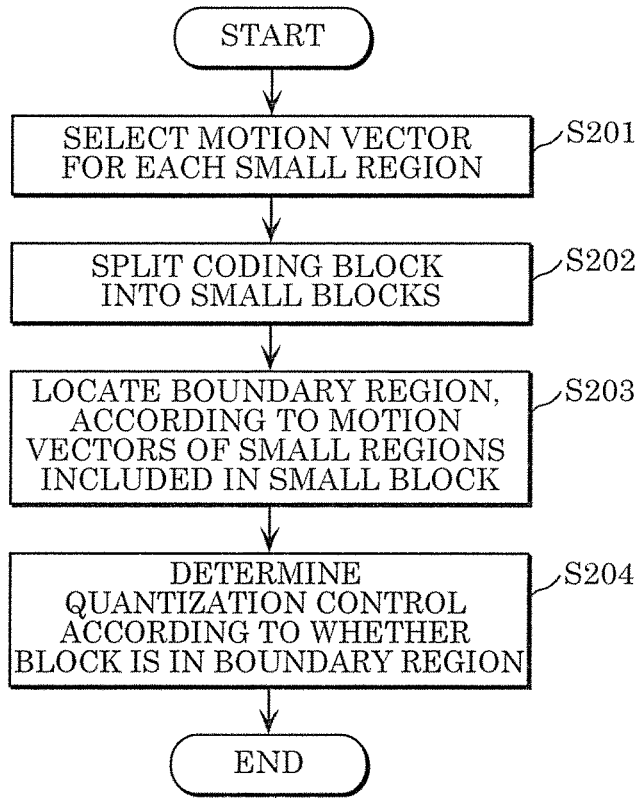
FIG. 28 is a flowchart illustrating processing of determining quantization control according to Embodiment 3.

FIG. 28 is a flowchart illustrating an example of operation in processing of determining quantization control according to the present embodiment.

Figure 29:
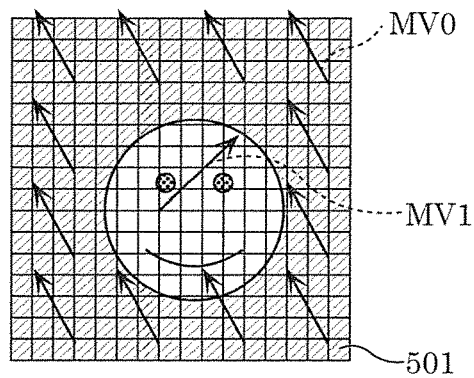
FIG. 29 is a diagram illustrating processing of selecting motion vectors according to Embodiment 3.

First, controller 316A selects a motion vector for each small region 501 (S201). Specifically, controller 316A selects a motion vector for each small region 501 through processing in steps S101 to S103 illustrated in FIG. 15. For example, as illustrated in FIG. 29, a motion vector is selected for each small region 501 that is smaller than 4×4 pixel region (for example, 2×2 or 1 pixel region). Motion vector MV0 is selected for the shaded background region, and motion vector MV1 is selected for the foreground region.

Figure 30:
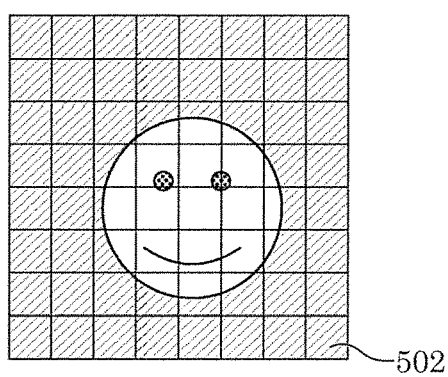
FIG. 30 is a diagram illustrating processing of splitting a coding block into small blocks according to Embodiment 3.

Next, as illustrated in FIG. 30, controller 316A splits a coding block into small blocks 502 which are the units for determining the size for frequency transform (S202). The size of small block 502 is greater than the size of small region 501 for which a motion vector is selected, and is, for example, a 4×4, 8×4, 4×8, 8×8, 16×8, 8×16, or 16×16 pixel size. Note that it is better if the size of small block 502 is the smallest block size among sizes of frequency transform blocks that image encoder 300A can use. The present embodiment describes, as an example, the case in which the size of small block 502 is a 4×4 pixel size.

Figure 31:
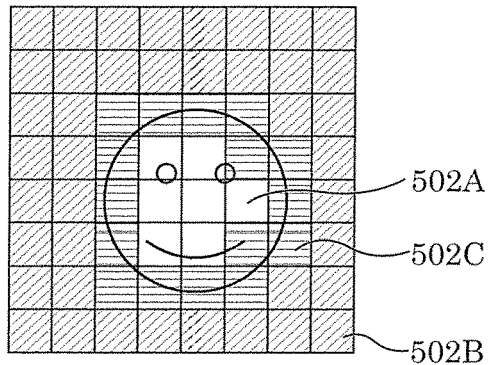
FIG. 31 is a diagram illustrating processing of locating boundary regions according to Embodiment 3.

Next, controller 316A locates a boundary region which includes a boundary between a foreground region and a background region, according to the motion vectors of small regions 501 included in each small block 502 (S203). Specifically, controller 316A divides small blocks 502 into three types of blocks, namely small block 502B in the background region which includes only small regions 501 having motion vector MV0, small block 502A in the foreground region which includes only small regions 501 having motion vector MV1, and small block 502C which includes both at least one small region 501 having motion vector MV0 and at least one small region 501 having motion vector MV1, as illustrated in FIG. 31. Controller 316A determines small block 502C which includes both at least one small region 501 having motion vector MV0 and at least one small region 501 having motion vector MV1 to be included in the boundary region.

Figure 32:
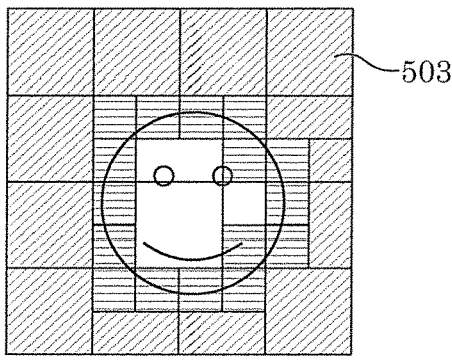
FIG. 32 is a diagram illustrating processing of determining quantization control according to Embodiment 3.

Next, controller 316A determines quantization control according to whether small block 502 is included in the boundary region (S204). Specifically, controller 316A determines that frequency transform block 503 included in the boundary region as illustrated in FIG. 32 is to be quantized without weighting each frequency component. Controller 316A determines that frequency transform block 503 not included in the boundary region is to be quantized with each frequency component being weighted. Note that FIG. 32 illustrates an example in which frequency transform blocks 503 having different sizes are used, yet frequency transform blocks 503 may have the same size.

Weighting each frequency component means to perform quantization with each frequency component being weighted using, for instance, a quantization matrix when encoding, for instance. This sets, for example, a quantization width for a high-frequency component to a width greater than the quantization width for a low-frequency component.

Specifically, controller 316A sets, for example, a quantization width for a high frequency component of frequency transform block 503 included in the boundary region to a width smaller than the quantization width for a high frequency component of frequency transform block 503 not included in the boundary region.

Accordingly, a sharp edge in the boundary region between the foreground and the background can be reproduced more precisely, and thus image quality can be improved.

Note that instead of the above processing, controller 316A may set a quantization width of frequency transform block 503 included in the boundary region to a width greater than the quantization width of frequency transform block 503 not included in the boundary region. Accordingly, an amount of encoding can be reduced while inhibiting noticeable deterioration in image quality in the boundary region.

Figure 33:
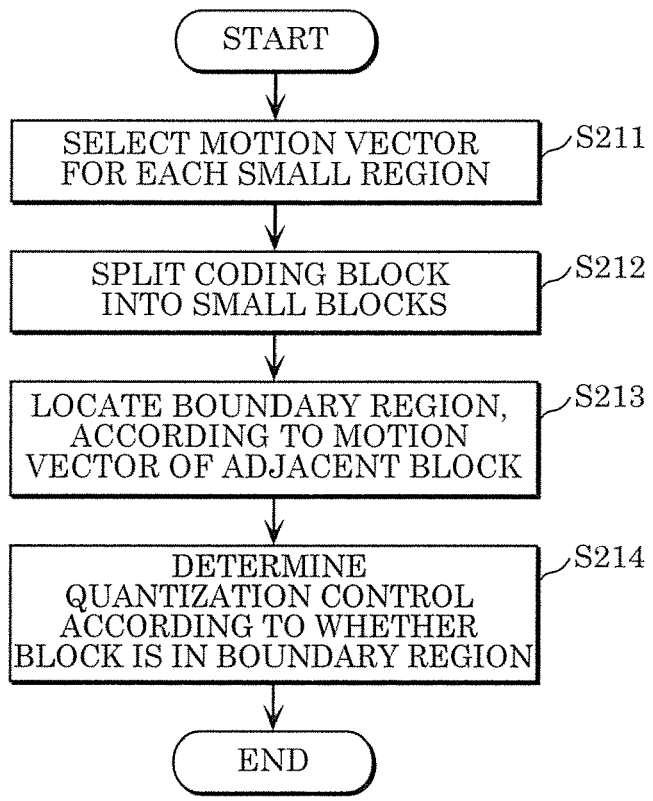
FIG. 33 is a flowchart illustrating a variation of the processing of determining quantization control according to Embodiment 3.
Figure 34:
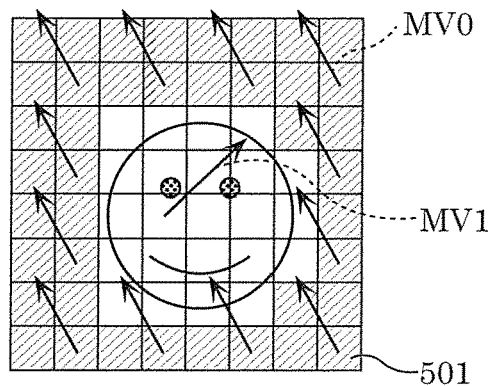
FIG. 34 is a diagram illustrating processing of selecting motion vectors according to Embodiment 3.

Next, a different example of operation of processing of determining quantization control is to be described. FIG. 33 is a flowchart illustrating processing of determining quantization control according to a variation of the present embodiment.

Figure 35:
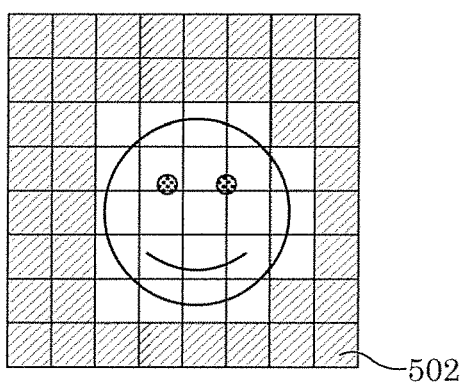
FIG. 35 is a diagram illustrating processing of splitting a coding block into small blocks according to Embodiment 3.

Next, similarly to step S202 illustrated in FIG. 28, controller 316A splits a coding block into small blocks 502 which are the units for determining the size for frequency transform (S212). Examples of the size of small blocks 502 include 4×4, 8×4, 4×8, 8×8, 16×8, 8×16, and 16×16 pixel sizes. Note that it is better if the size of small block 502 is the smallest block size among the sizes of frequency transform blocks that can be used by image encoder 300A. The present embodiment describes, as an example, the case where small block 502 has a 4×4 pixel size, as illustrated in FIG. 35.

Figure 36:
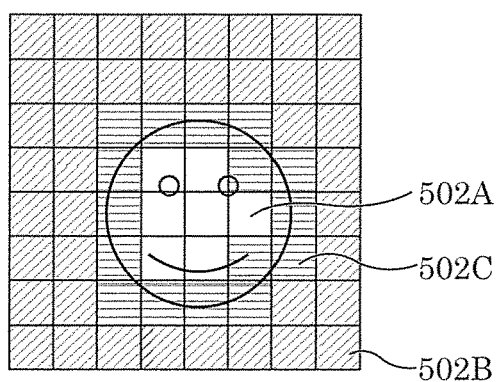
FIG. 36 is a diagram illustrating processing of locating boundary regions according to Embodiment 3.

Next, controller 316A locates a boundary region according to motion vectors of adjacent blocks (S213). Specifically, controller 316A divides small blocks 502 into three types according to motion vectors of small blocks 502 (small regions 501). More specifically, as illustrated in FIG. 36, controller 316A divides, according to motion vectors of small blocks 502, small blocks 502 into small block 502B in the background region for which motion vector MV0 is selected, and small block 502A in the foreground region for which motion vector MV1 is selected. Furthermore, controller 316A determines, for each small block 502A in the foreground region, eight adjacent small blocks 502 surrounding small block 502A include at least one small block 502B in the background region. If at least one small block 502B in the background region is included, controller 316A classifies such small block 502A as small block 502C in the boundary region.

Figure 37:
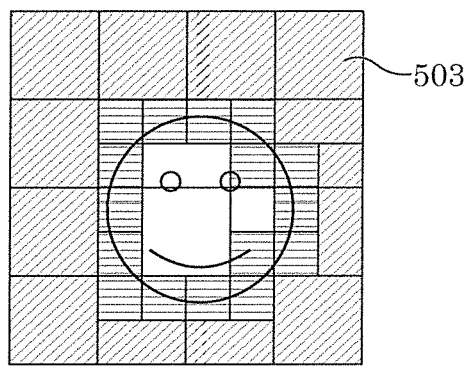
FIG. 37 is a diagram illustrating processing of determining quantization control according to Embodiment 3.

Next, similarly to step S204 illustrated in FIG. 28, controller 316A determines the size of frequency transform block 503 as illustrated in, for example, FIG. 37, according to whether a block is included in the boundary region (S214). Accordingly, similarly to the processing illustrated in FIG. 28, distortion of the boundary region can be inhibited, and furthermore information can be efficiently compressed for regions other than the boundary region.

Next, similarly to step S204 illustrated in FIG. 28, controller 316A determines quantization control for frequency transform block 503, according to whether frequency transform block 503 is included in the boundary region (S214). Specifically, controller 316A determines that frequency transform block 503 included in the boundary region as illustrated in FIG. 37 is to be quantized without weighting each frequency component. Controller 316A determines that frequency transform block 503 not included in the boundary region is to be quantized with each frequency component being weighted.

Accordingly, a sharp edge in the boundary region between the foreground and the background can be reproduced more precisely, and thus image quality can be improved.

Alternatively, controller 316A may set a quantization width of frequency transform block 503 included in the boundary region to a width greater than a quantization width of frequency transform block 503 not included in the boundary region. Accordingly, an amount of encoding can be reduced while inhibiting noticeable deterioration in image quality in the boundary region.

Note that here, an example in which small regions 501 and 502 have the same size is described, yet similar processing can be performed also when small region 501 is larger than small block 502.

Although the above is a description of an example in which if motion vectors of two adjacent small blocks 502 are different, small block 502A in the foreground region is determined to be small block 502C in the boundary region, yet at least one of two adjacent small blocks 502 may be determined to be small block 502C in the boundary region. For example, small block 502B in the background region may be determined to be small block 502C in the boundary region, or alternatively both two adjacent small blocks 502 may be determined to be small blocks 502C in the boundary region.

The processing of determining quantization control described above is performed by both the image encoder and the image decoder in accordance with the same rule. The image encoder, therefore, does not need to explicitly notify the image decoder of information indicating change of quantization control, for instance. Accordingly, the amount of encoded data can be reduced, and thus encoding efficiency can be improved. Furthermore, the image encoder and the image decoder quantize blocks in the boundary region, using a method different from the methods for other regions. Accordingly, the image encoder and the image decoder can quantize blocks in a manner suitable for the boundary region.

Note that the image encoder and the image decoder do not need to adaptively change quantization control, by applying the processing of determining quantization control described above to all the blocks. For example, the image encoder and the image decoder may stop, based on a switch signal, adaptively changing quantization control by adopting the method described above.

Figure 38:
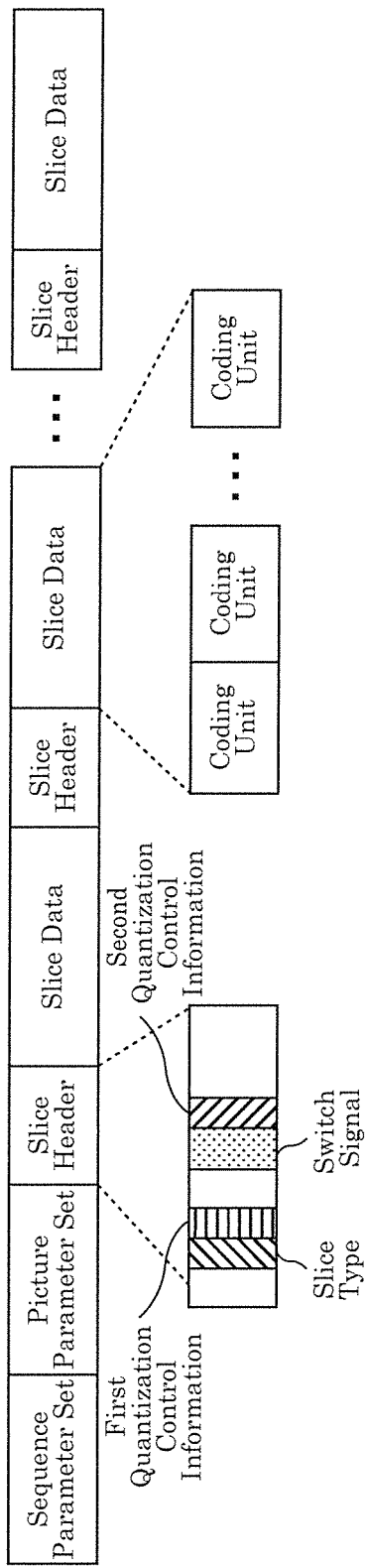
FIG. 38 illustrates an example of a configuration of an encoded stream according to Embodiment 3.

FIG. 38 illustrates an example of a configuration of an encoded stream generated by image encoder 300A. For example, as illustrated in FIG. 38, a switch signal may be included in the slice header in which control information per slice unit is stored. Accordingly, all the coding blocks (Coding Units) in the slice can be collectively controlled. Specifically, whether to use the above described processing of determining quantization control or not can be switched per slice unit. A switch signal may be included only in the slice header of a B slice. Stated differently, the processing of determining quantization control described above may not be used for an I slice and a P slice, but may be used for only a B slice.

As illustrated in FIG. 38, a slice header includes first quantization control information. The first quantization control information is information regarding quantization control, and for example, indicates a quantization parameter (quantization width), a quantization matrix, and others. If the processing of determining quantization control described above is not used, frequency transformation blocks 503 included in the slice are quantized or inversely quantized using the quantization width and the quantization matrix which are indicated in the first quantization control information.

On the other hand, if the processing of determining quantization control described above is used, the quantization matrix indicated in the first quantization control information is used for a region other than the boundary region, for example, but is not used for the boundary region.

As illustrated in FIG. 38, an encoded stream may include second quantization control information. The second quantization control information is information which indicates quantization control when the processing of determining quantization control described above is used. Note that only when a switch signal indicates that the processing of determining quantization control described above is to be used, the second quantization control information may be included in the encoded stream.

For example, the second quantization control information indicates a quantization parameter (quantization width) used for the boundary region. In this case, a quantization parameter indicated by the second quantization control information is used for the boundary region, whereas a quantization parameter indicated by the first quantization control information is used for a region other than the boundary region.

Alternatively, the second quantization control information may indicate a quantization matrix to be used for the boundary region. In this case, a quantization matrix indicated by the second quantization control information is used for the boundary region, and a quantization matrix indicated by the first quantization control information is used for a region other than the boundary region. For example, a difference between weights given to frequency components is smaller in the quantization matrix indicated by the second quantization control information than the difference between weights in the quantization matrix indicated by the first quantization control information.

In addition to the above, the second quantization control information may indicate a quantization parameter or a quantization matrix to be used for a region other than the boundary region.

Note that even when the second quantization control information is conveyed, information indicating to which region the second quantization control information is to be applied is not transmitted. In other words, information indicating the boundary region is not conveyed. Accordingly, the amount of data of an encoded stream can be reduced by using the method according to the present embodiment.

A switch signal may be included in an SPS which includes control information per sequence unit or in a PPS which includes control information per picture unit. Accordingly, switching control can be performed for each sequence or each inter-frame prediction type.

Figure 39:
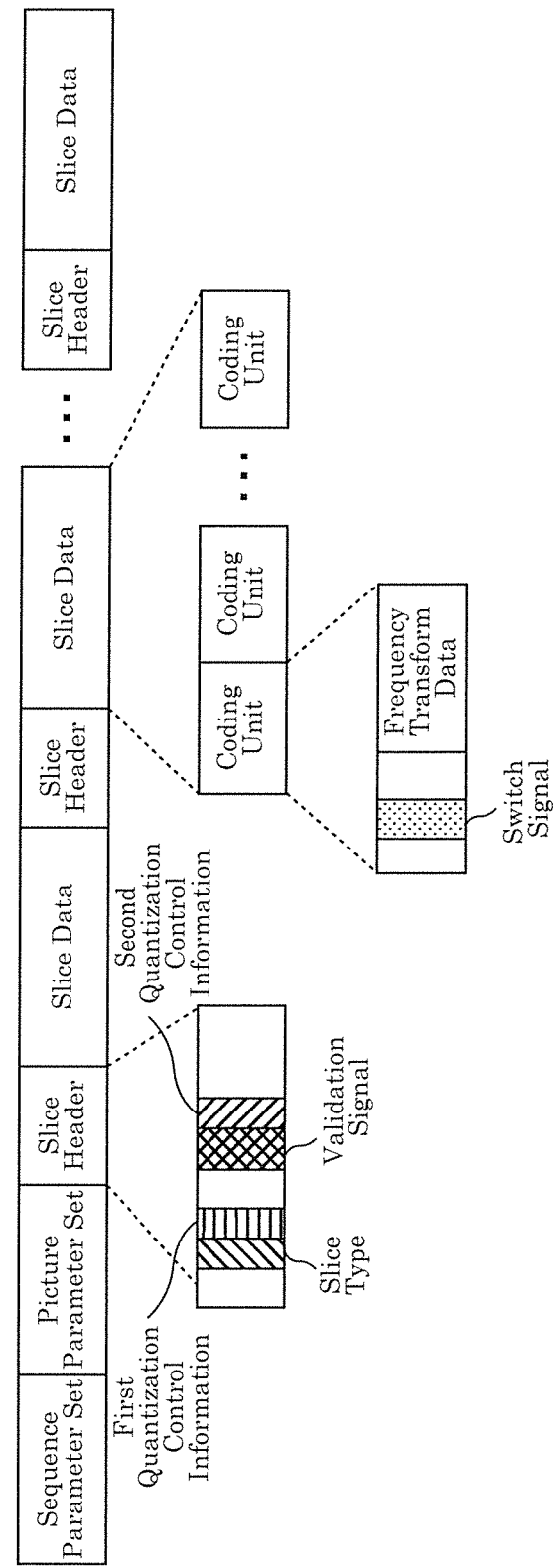
FIG. 39 illustrates an example of a configuration of an encoded stream according to Embodiment 3.

FIG. 39 illustrates a different example of a configuration of an encoded stream generated by image encoder 300A. As illustrated in FIG. 39, a switch signal may be included for each coding block. Accordingly, switching control can be performed for each coding block. In this case, as illustrated in FIG. 39, a validation signal is included in a slice header, for instance. The validation signal may be included in only the slice header of a B slice. The validation signal indicates whether to use the above described processing of determining quantization control or not for at least one of coding blocks included in the slice. If the validation signal indicates that the processing of determining quantization control described above is to be used for at least one of coding blocks included in the slice, a switch signal for controlling the coding blocks is included in an encoded stream. This achieves switching control for each coding block.

Figure 40:
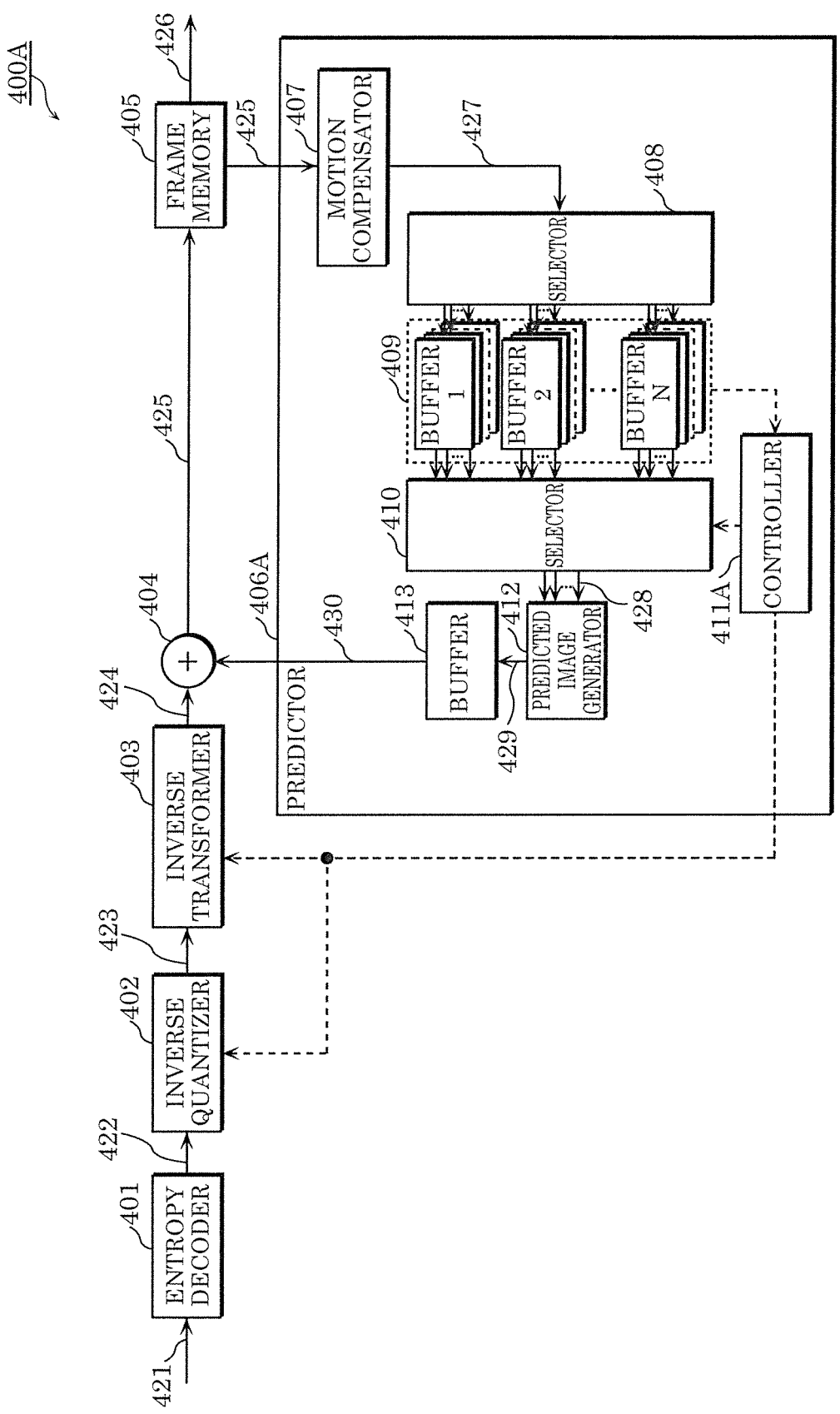
FIG. 40 is a block diagram of an image decoder according to Embodiment 3.

The following describes an image decoder according to the present embodiment. FIG. 40 is a block diagram illustrating an example of a configuration of image decoder 400A according to the present embodiment. Image decoder 400A generates decoded image 426 by decoding bitstream 421 which is bitstream 326 generated by image encoder 300A described above.

Image decoder 400A illustrated in FIG. 40 is image decoder 400 illustrated in FIG. 24 to which functionality of controller 411A included in predictor 406A is added, instead of controller 411 included in predictor 406. Specifically, controller 411A has a function for controlling inverse quantization performed by inverse quantizer 402.

As described above, image decoder 400A also performs similar processing of determining quantization control to the processing performed by image encoder 300A.

As described above, in video inter frame prediction coding in which a motion vector to be used in inter frame prediction is selected for each small region using a predetermined method, image encoder 300A and image decoder 400A according to the present embodiment locate the boundary region between a moving object and the background, and determine quantization control according to the located boundary region.

If small region 501 which is a motion vector selection unit is smaller than small block 502 which is a quantization control determination unit, image encoder 300A and image decoder 400A determine a quantization control determination unit which includes both a motion vector selection unit for which a first motion vector is selected and a motion vector selection unit for which a second motion vector is selected to be a boundary region.

If the motion vector selection unit is the same as or larger than the quantization control determination unit, image encoder 300A and image decoder 400A determine a quantization control determination unit to be a boundary region, which (i) is adjacent to a frequency transform block size determination unit that includes only a motion vector selection unit for which the first motion vector is selected, and (ii) at least partially includes a motion vector selection unit for which the second motion vector is selected.

Image encoder 300A and image decoder 400A quantize blocks in the boundary region without weighting frequency components.

Image encoder 300A and image decoder 400A set the quantization width in the boundary region to a width greater than the quantization widths in the other regions.

In the above, an example in which there are two types of motion vectors in an image, yet there may be three or more types of motion vectors.

Figure 41:
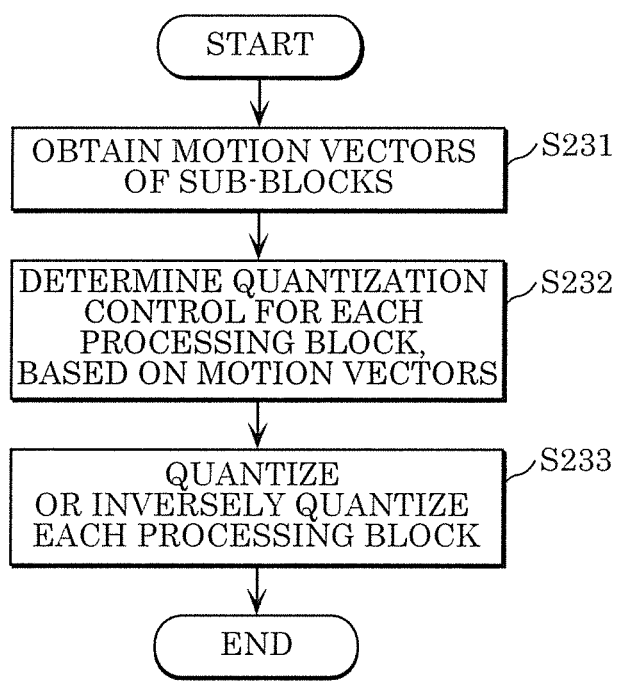
FIG. 41 is a flowchart illustrating an encoding method and a decoding method according to Embodiment 3.

As described above, image encoder 300A and image decoder 400A according to the present embodiment perform processing illustrated in FIG. 41.

First, image encoder 300A and image decoder 400A obtain motion vectors of sub-blocks (small regions 501) obtained by splitting a current frame (S231). Specifically, image encoder 300A calculates motion vectors using encoded frames. Image decoder 400A calculates motion vectors using decoded frames.

Next, image encoder 300A and image decoder 400A determine, based on the obtained motion vectors, for each of processing blocks obtained by splitting the current frame, quantization control to be performed on the processing block (S232). Specifically, image encoder 300A and image decoder 400A locate, based on the motion vectors, a boundary region between a foreground and a background, and determine, for each of the processing blocks, quantization control according to whether the processing block is included in the boundary region.

For example, image encoder 300A and image decoder 400A split the current frame into determination blocks (small blocks 502) each of which includes at least two sub-blocks, and if a determination block includes sub-blocks having different motion vectors, determines the determination block to be included in the boundary region.

If two adjacent sub-blocks have different motion vectors, image encoder 300A and image decoder 400A determine at least one of the two adjacent sub-blocks to be included in the boundary region.

Image encoder 300A and image decoder 400A determine that a processing block not included in the boundary region is to be weighted for each of frequency components, and a processing block included in the boundary region is not to be weighted for each of frequency components.

Alternatively, image encoder 300A and image decoder 400A set a quantization width of a first processing block included in the boundary region to a width greater than a quantization width of a second processing block not included in the boundary region.

Next, image encoder 300A and image decoder 400A quantize and/or inversely quantize each of the processing blocks by the quantization control determined for the processing block (S233). Specifically, image encoder 300A quantizes and inversely quantizes each of the processing blocks. Image decoder 400A inversely quantizes each of the processing blocks.

The above has described the image encoder and the image decoder according to the present embodiment, yet the present disclosure is not limited to the present embodiment.

The processors included in the image encoder and the image decoder according to the above embodiment are typically achieved as large scale integrated circuits (LSIs). These may be each achieved as a single chip or may be achieved as a single chip that includes some or all of the processors.

Furthermore, the way to achieve integration is not limited to LSIs, and implementation through a dedicated circuit or a general-purpose processor is also possible. A field programmable gate array (FPGA) that can be programmed after manufacturing an LSI or a reconfigurable processor that allows re-configuration of the connection and configuration of circuit cells inside an LSI can be used.

Each of the elements in the above-described embodiments may be configured in the form of an exclusive hardware product, or may be achieved by executing a software program suitable for the element. Each of the elements may be achieved by a program executor such as a CPU and a processor reading and executing the software program recorded on a recording medium such as a hard disc or a semiconductor memory.

In other words, the image encoder and the image decoder include processing circuitry and a storage (accessible from the processing circuitry) electrically connected to the processing circuitry. The processing circuitry includes at least dedicated hardware and a program executor. If the processing circuitry includes the program executor, the storage stores a software program to be executed by the program executor. The processing circuitry performs the image encoding method and the image decoding method according to the above embodiment using the storage.

Furthermore, the present disclosure may be achieved by the above software program or a non-transitory computer-readable recording medium in which the above program is recorded. Also, it is needless to say that the above program can be distributed via a transmission medium such as the Internet.

The numerals used above are all examples in order to specifically describe the present disclosure, and thus the present disclosure is not limited to the exemplified numerals.

Split of functional blocks in the block diagrams is an example, and thus a plurality of functional blocks may be achieved as one functional block, one functional block may be split into a plurality of blocks, or some functions may be transferred to another functional block. Single hardware or software may process similar functions of a plurality of functional blocks, in parallel or by time division.

The orders in which steps included in the image encoding method and the image decoding method are performed are examples for specifically describing the present disclosure, and an order other than the above may be applied. Further, some of the steps may be performed simultaneously (in parallel) with other steps.

The above has described, based on the embodiments, the image encoder, the image decoder, the image encoding method, and the image decoding method according to one or more aspects of the present disclosure, yet the present disclosure is not limited to the above embodiments. The scope of the one or more aspects of the present disclosure also encompasses embodiments as a result of adding, to the embodiments, various modifications that may be conceived by those skilled in the art, and embodiments obtained by combining elements in different embodiments as long as the resultant embodiments do not depart from the spirit of the present disclosure.

Embodiment 4

As described in each of the above embodiments, each functional block can typically be realized as an MPU and memory, for example. Moreover, processes performed by each of the functional blocks are typically realized by a program execution unit, such as a processor, reading and executing software (a program) recorded on a recording medium such as ROM. The software may be distributed via, for example, downloading, and may be recorded on a recording medium such as semiconductor memory and distributed. Note that each functional block can, of course, also be realized as hardware (dedicated circuit).

Moreover, the processing described in each of the embodiments may be realized via integrated processing using a single apparatus (system), and, alternatively, may be realized via decentralized processing using a plurality of apparatuses. Moreover, the processor that executes the above-described program may be a single processor or a plurality of processors. In other words, integrated processing may be performed, and, alternatively, decentralized processing may be performed.

Embodiments of the present disclosure are not limited to the above exemplary embodiments; various modifications may be made to the exemplary embodiments, the results of which are also included within the scope of the embodiments of the present disclosure.

Next, application examples of the moving picture encoding method (image encoding method) and the moving picture decoding method (image decoding method) described in each of the above embodiments and a system that employs the same will be described. The system is characterized as including an image encoding device that employs the image encoding method, an image decoding device that employs the image decoding method, and an image encoding/decoding device that includes both the image encoding device and the image decoding device. Other configurations included in the system may be modified on a case-by-case basis.

(Usage Examples)

Figure 42:
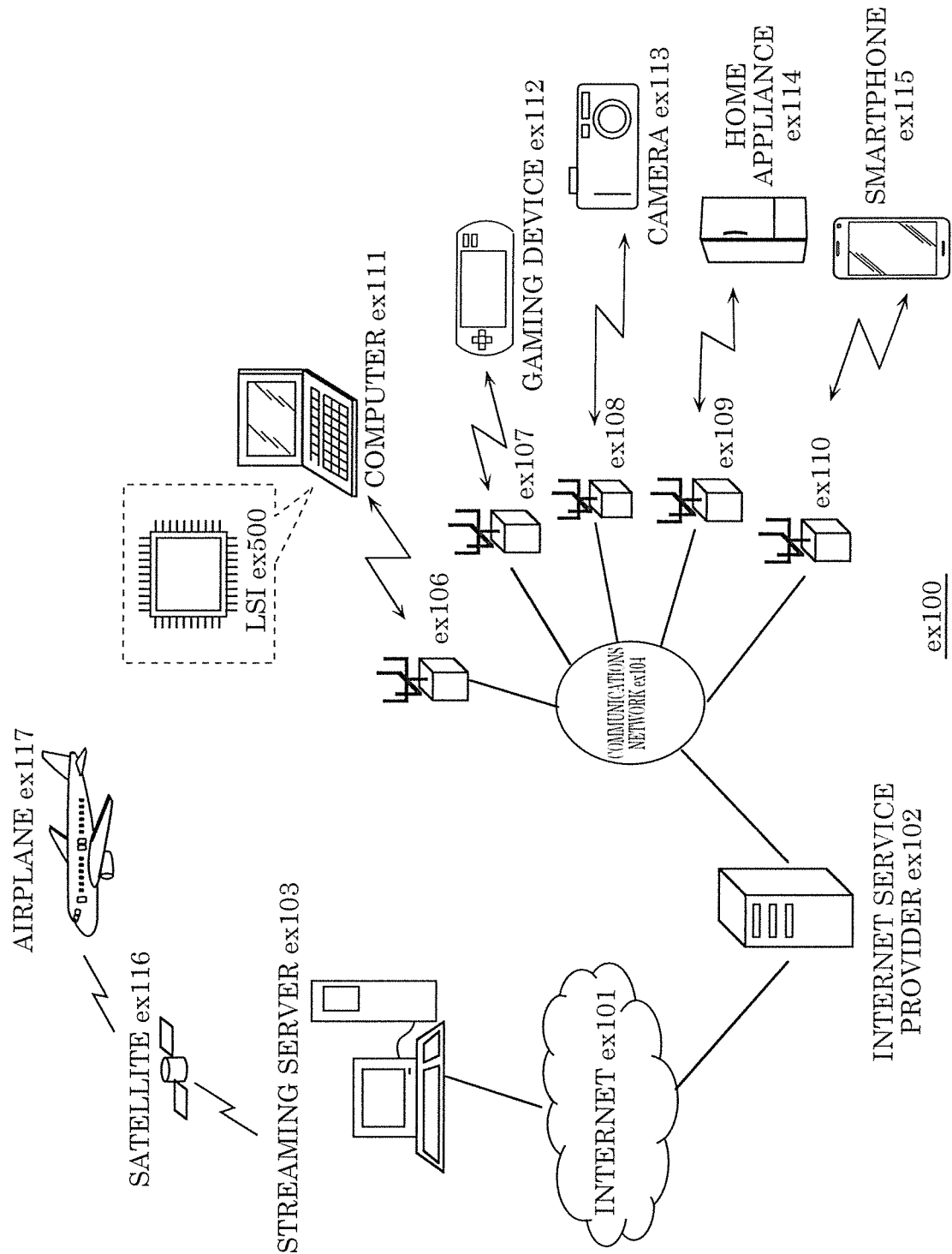
FIG. 42 illustrates an overall configuration of a content providing system for implementing a content distribution service.

FIG. 42 illustrates an overall configuration of content providing system ex100 for implementing a content distribution service. The area in which the communication service is provided is divided into cells of desired sizes, and base stations ex106, ex107, ex108, ex109, and ex110, which are fixed wireless stations, are located in respective cells.

In content providing system ex100, devices including computer ex111, gaming device ex112, camera ex113, home appliance ex114, and smartphone ex115 are connected to internet ex101 via internet service provider ex102 or communications network ex104 and base stations ex106 through ex110. Content providing system ex100 may combine and connect any combination of the above elements. The devices may be directly or indirectly connected together via a telephone network or near field communication rather than via base stations ex106 through ex110, which are fixed wireless stations. Moreover, streaming server ex103 is connected to devices including computer ex111, gaming device ex112, camera ex113, home appliance ex114, and smartphone ex115 via, for example, internet ex101. Streaming server ex103 is also connected to, for example, a terminal in a hotspot in airplane ex117 via satellite ex116.

Note that instead of base stations ex106 through ex110, wireless access points or hotspots may be used. Streaming server ex103 may be connected to communications network ex104 directly instead of via internet ex101 or internet service provider ex102, and may be connected to airplane ex117 directly instead of via satellite ex116.

Camera ex113 is a device capable of capturing still images and video, such as a digital camera. Smartphone ex115 is a smartphone device, cellular phone, or personal handyphone system (PHS) phone that can operate under the mobile communications system standards of the typical 2G, 3G, 3.9G, and 4G systems, as well as the next-generation 5G system.

Home appliance ex118 is, for example, a refrigerator or a device included in a home fuel cell cogeneration system.

In content providing system ex100, a terminal including an image and/or video capturing function is capable of, for example, live streaming by connecting to streaming server ex103 via, for example, base station ex106. When live streaming, a terminal (e.g., computer ex111, gaming device ex112, camera ex113, home appliance ex114, smartphone ex115, or airplane ex117) performs the encoding processing described in the above embodiments on still-image or video content captured by a user via the terminal, multiplexes video data obtained via the encoding and audio data obtained by encoding audio corresponding to the video, and transmits the obtained data to streaming server ex103. In other words, the terminal functions as the image encoding device according to one aspect of the present disclosure.

Streaming server ex103 streams transmitted content data to clients that request the stream. Client examples include computer ex111, gaming device ex112, camera ex113, home appliance ex114, smartphone ex115, and terminals inside airplane ex117, which are capable of decoding the above-described encoded data. Devices that receive the streamed data decode and reproduce the received data. In other words, the devices each function as the image decoding device according to one aspect of the present disclosure.
(Decentralized Processing)

Streaming server ex103 may be realized as a plurality of servers or computers between which tasks such as the processing, recording, and streaming of data are divided. For example, streaming server ex103 may be realized as a content delivery network (CDN) that streams content via a network connecting multiple edge servers located throughout the world. In a CDN, an edge server physically near the client is dynamically assigned to the client. Content is cached and streamed to the edge server to reduce load times. In the event of, for example, some kind of an error or a change in connectivity due to, for example, a spike in traffic, it is possible to stream data stably at high speeds since it is possible to avoid affected parts of the network by, for example, dividing the processing between a plurality of edge servers or switching the streaming duties to a different edge server, and continuing streaming.

Decentralization is not limited to just the division of processing for streaming; the encoding of the captured data may be divided between and performed by the terminals, on the server side, or both. In one example, in typical encoding, the processing is performed in two loops. The first loop is for detecting how complicated the image is on a frame-by-frame or scene-by-scene basis, or detecting the encoding load. The second loop is for processing that maintains image quality and improves encoding efficiency. For example, it is possible to reduce the processing load of the terminals and improve the quality and encoding efficiency of the content by having the terminals perform the first loop of the encoding and having the server side that received the content perform the second loop of the encoding. In such a case, upon receipt of a decoding request, it is possible for the encoded data resulting from the first loop performed by one terminal to be received and reproduced on another terminal in approximately real time. This makes it possible to realize smooth, real-time streaming.

In another example, camera ex113 or the like extracts a feature amount from an image, compresses data related to the feature amount as metadata, and transmits the compressed metadata to a server. For example, the server determines the significance of an object based on the feature amount and changes the quantization accuracy accordingly to perform compression suitable for the meaning of the image. Feature amount data is particularly effective in improving the precision and efficiency of motion vector prediction during the second compression pass performed by the server. Moreover, encoding that has a relatively low processing load, such as variable length coding (VLC), may be handled by the terminal, and encoding that has a relatively high processing load, such as context-adaptive binary arithmetic coding (CABAC), may be handled by the server.

In yet another example, there are instances in which a plurality of videos of approximately the same scene are captured by a plurality of terminals in, for example, a stadium, shopping mall, or factory. In such a case, for example, the encoding may be decentralized by dividing processing tasks between the plurality of terminals that captured the videos and, if necessary, other terminals that did not capture the videos and the server, on a per-unit basis. The units may be, for example, groups of pictures (GOP), pictures, or tiles resulting from dividing a picture. This makes it possible to reduce load times and achieve streaming that is closer to real-time.

Moreover, since the videos are of approximately the same scene, management and/or instruction may be carried out by the server so that the videos captured by the terminals can be cross-referenced. Moreover, the server may receive encoded data from the terminals, change reference relationship between items of data or correct or replace pictures themselves, and then perform the encoding. This makes it possible to generate a stream with increased quality and efficiency for the individual items of data.

Moreover, the server may stream video data after performing transcoding to convert the encoding format of the video data. For example, the server may convert the encoding format from MPEG to VP, and may convert 11.264 to 11.265.

In this way, encoding can be performed by a terminal or one or more servers. Accordingly, although the device that performs the encoding is referred to as a "server" or "terminal" in the following description, some or all of the processes performed by the server may be performed by the terminal, and likewise some or all of the processes performed by the terminal may be performed by the server. This also applies to decoding processes. (3D, Multi-angle)

In recent years, usage of images or videos combined from images or videos of different scenes concurrently captured or the same scene captured from different angles by a plurality of terminals such as camera ex113 and/or smartphone ex115 has increased. Videos captured by the terminals are combined based on, for example, the separately-obtained relative positional relationship between the terminals, or regions in a video having matching feature points.

In addition to the encoding of two-dimensional moving pictures, the server may encode a still image based on scene analysis of a moving picture either automatically or at a point in time specified by the user, and transmit the encoded still image to a reception terminal. Furthermore, when the server can obtain the relative positional relationship between the video capturing terminals, in addition to two-dimensional moving pictures, the server can generate three-dimensional geometry of a scene based on video of the same scene captured from different angles. Note that the server may separately encode three-dimensional data generated from, for example, a point cloud, and may, based on a result of recognizing or tracking a person or object using three-dimensional data, select or reconstruct and generate a video to be transmitted to a reception terminal from videos captured by a plurality of terminals.

This allows the user to enjoy a scene by freely selecting videos corresponding to the video capturing terminals, and allows the user to enjoy the content obtained by extracting, from three-dimensional data reconstructed from a plurality of images or videos, a video from a selected viewpoint. Furthermore, similar to with video, sound may be recorded from relatively different angles, and the server may multiplex, with the video, audio from a specific angle or space in accordance with the video, and transmit the result.

In recent years, content that is a composite of the real world and a virtual world, such as virtual reality (VR) and augmented reality (AR) content, has also become popular. In the case of VR images, the server may create images from the viewpoints of both the left and right eyes and perform encoding that tolerates reference between the two viewpoint images, such as multi-view coding (MVC), and, alternatively, may encode the images as separate streams without referencing. When the images are decoded as separate streams, the streams may be synchronized when reproduced so as to recreate a virtual three-dimensional space in accordance with the viewpoint of the user.

In the case of AR images, the server superimposes virtual object information existing in a virtual space onto camera information representing a real-world space, based on a three-dimensional position or movement from the perspective of the user. The decoding device may obtain or store virtual object information and three-dimensional data, generate two-dimensional images based on movement from the perspective of the user, and then generate superimposed data by seamlessly connecting the images. Alternatively, the decoding device may transmit, to the server, motion from the perspective of the user in addition to a request for virtual object information, and the server may generate superimposed data based on three-dimensional data stored in the server in accordance with the received motion, and encode and stream the generated superimposed data to the decoding device. Note that superimposed data includes, in addition to RGB values, an a value indicating transparency, and the server sets the a value for sections other than the object generated from three-dimensional data to, for example, 0, and may perform the encoding while those sections are transparent. Alternatively, the server may set the background to a predetermined RGB value, such as a chroma key, and generate data in which areas other than the object are set as the background.

Decoding of similarly streamed data may be performed by the client (i.e., the terminals), on the server side, or divided therebetween. In one example, one terminal may transmit a reception request to a server, the requested content may be received and decoded by another terminal, and a decoded signal may be transmitted to a device having a display. It is possible to reproduce high image quality data by decentralizing processing and appropriately selecting content regardless of the processing ability of the communications terminal itself. In yet another example, while a TV, for example, is receiving image data that is large in size, a region of a picture, such as a tile obtained by dividing the picture, may be decoded and displayed on a personal terminal or terminals of a viewer or viewers of the TV. This makes it possible for the viewers to share a big-picture view as well as for each viewer to check his or her assigned area or inspect a region in further detail up close.

In the future, both indoors and outdoors, in situations in which a plurality of wireless connections are possible over near, mid, and far distances, it is expected to be able to seamlessly receive content even when switching to data appropriate for the current connection, using a streaming system standard such as MPEG-DASH. With this, the user can switch between data in real time while freely selecting a decoding device or display apparatus including not only his or her own terminal, but also, for example, displays disposed indoors or outdoors. Moreover, based on, for example, information on the position of the user, decoding can be performed while switching which terminal handles decoding and which terminal handles the displaying of content. This makes it possible to, while in route to a destination, display, on the wall of a nearby building in which a device capable of displaying content is embedded or on part of the ground, map information while on the move. Moreover, it is also possible to switch the bit rate of the received data based on the accessibility to the encoded data on a network, such as when encoded data is cached on a server quickly accessible from the reception terminal or when encoded data is copied to an edge server in a content delivery service.

(Scalable Encoding)

Figure 43:
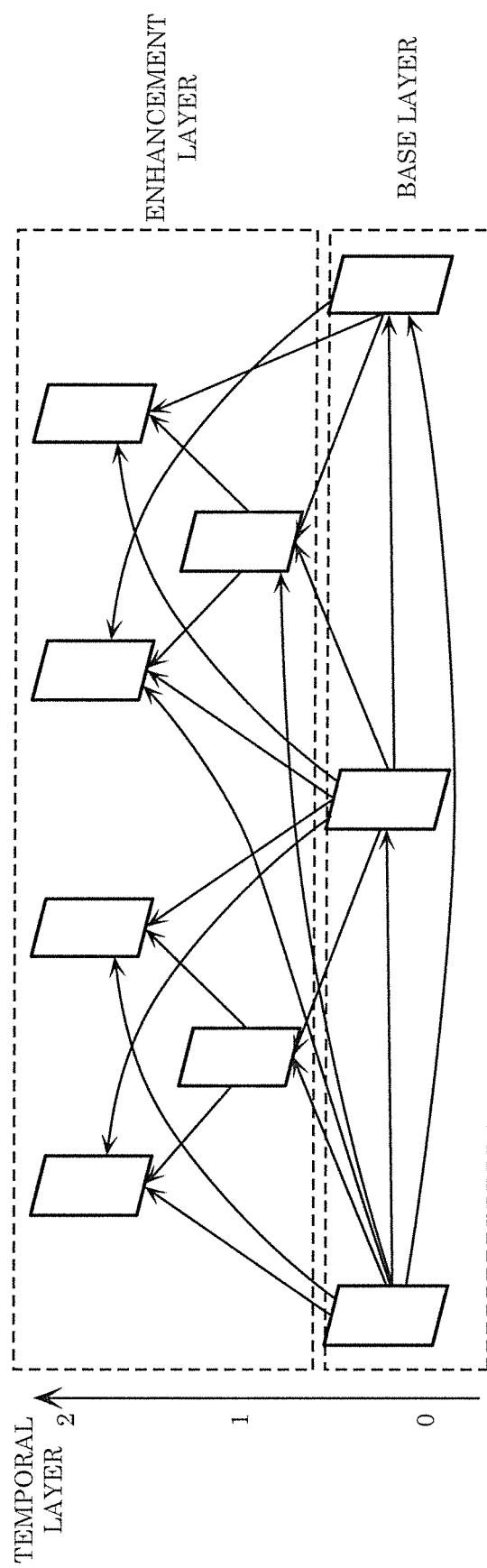
FIG. 43 illustrates one example of encoding structure in scalable encoding.

The switching of content will be described with reference to a scalable stream, illustrated in FIG. 43, that is compression coded via implementation of the moving picture encoding method described in the above embodiments. The server may have a configuration in which content is switched while making use of the temporal and/or spatial scalability of a stream, which is achieved by division into and encoding of layers, as illustrated in FIG. 43. Note that there may be a plurality of individual streams that are of the same content but different quality. In other words, by determining which layer to decode up to based on internal factors, such as the processing ability on the decoding device side, and external factors, such as communication bandwidth, the decoding device side can freely switch between low resolution content and high resolution content while decoding. For example, in a case in which the user wants to continue watching, at home on a device such as a TV connected to the internet, a video that he or she had been previously watching on smartphone ex115 while on the move, the device can simply decode the same stream up to a different layer, which reduces server side load.

Furthermore, in addition to the configuration described above in which scalability is achieved as a result of the pictures being encoded per layer and the enhancement layer is above the base layer, the enhancement layer may include metadata based on, for example, statistical information on the image, and the decoding device side may generate high image quality content by performing super-resolution imaging on a picture in the base layer based on the metadata. Super-resolution imaging may be improving the SN ratio while maintaining resolution and/or increasing resolution. Metadata includes information for identifying a linear or a non-linear filter coefficient used in super-resolution processing, or information identifying a parameter value in filter processing, machine learning, or least squares method used in super-resolution processing.

Figure 44:
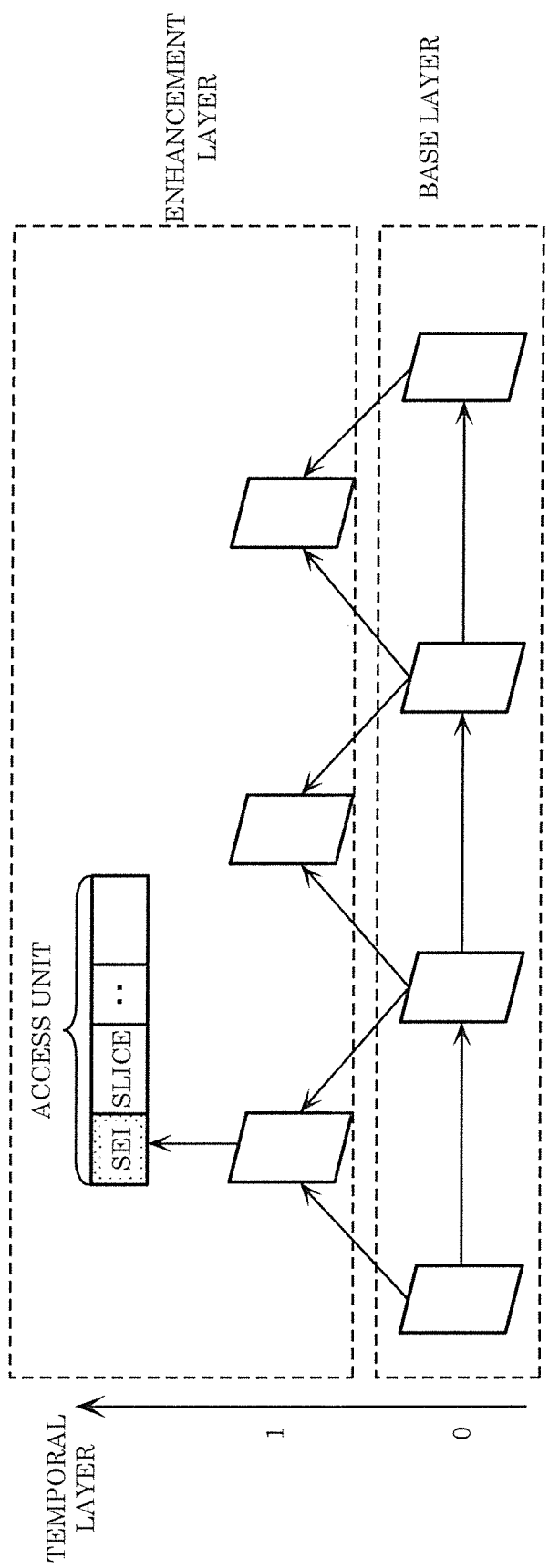
FIG. 44 illustrates one example of encoding structure in scalable encoding.

Alternatively, a configuration in which a picture is divided into, for example, tiles in accordance with the meaning of, for example, an object in the image, and on the decoding device side, only a partial region is decoded by selecting a tile to decode, is also acceptable. Moreover, by storing an attribute about the object (person, car, ball, etc.) and a position of the object in the video (coordinates in identical images) as metadata, the decoding device side can identify the position of a desired object based on the metadata and determine which tile or tiles include that object. For example, as illustrated in FIG. 44, metadata is stored using a data storage structure different from pixel data such as an SEI message in HEVC. This metadata indicates, for example, the position, size, or color of the main object.

Moreover, metadata may be stored in units of a plurality of pictures, such as stream, sequence, or random access units. With this, the decoding device side can obtain, for example, the time at which a specific person appears in the video, and by fitting that with picture unit information, can identify a picture in which the object is present and the position of the object in the picture.

(Web Page Optimization)

Figure 45:
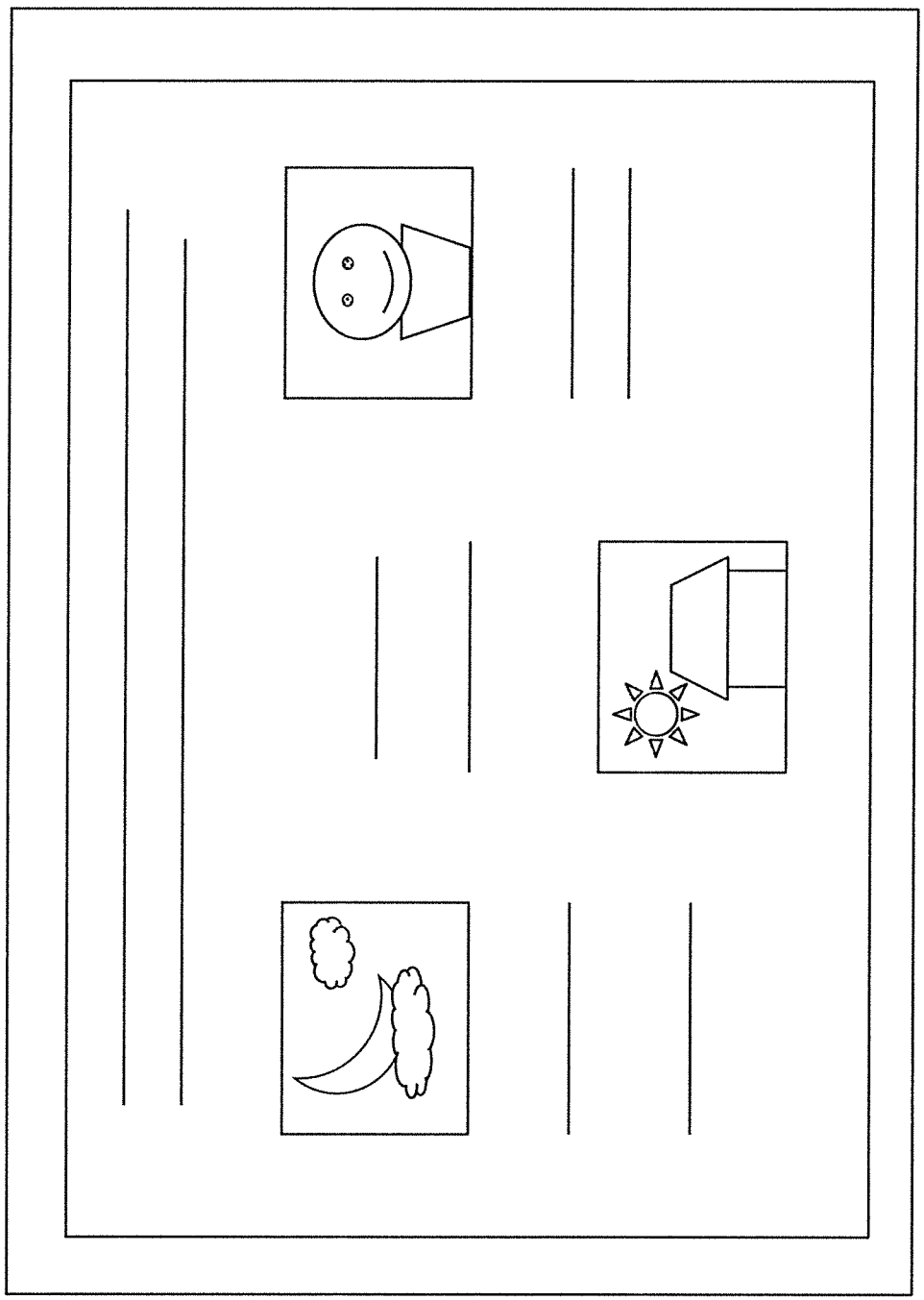
FIG. 45 illustrates an example of a display screen of a web page.
Figure 46:
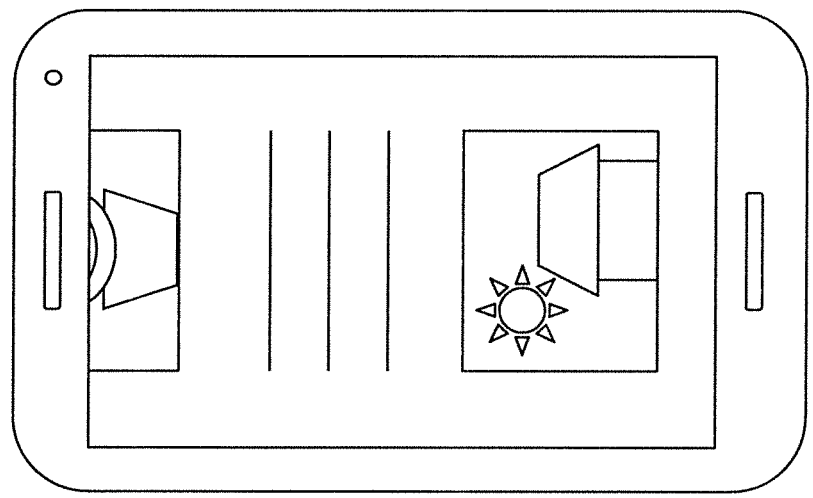
FIG. 46 illustrates an example of a display screen of a web page.

FIG. 45 illustrates an example of a display screen of a web page on, for example, computer ex111. FIG. 46 illustrates an example of a display screen of a web page on, for example, smartphone ex115. As illustrated in FIG. 45 and FIG. 46, a web page may include a plurality of image links which are links to image content, and the appearance of the web page differs depending on the device used to view the web page. When a plurality of image links are viewable on the screen, until the user explicitly selects an image link, or until the image link is in the approximate center of the screen or the entire image link fits in the screen, the display apparatus (decoding device) displays, as the image links, still images included in the content or I pictures, displays video such as an animated gif using a plurality of still images or I pictures, for example, or receives only the base layer and decodes and displays the video.

When an image link is selected by the user, the display apparatus decodes giving the highest priority to the base layer. Note that if there is information in the HTML code of the web page indicating that the content is scalable, the display apparatus may decode up to the enhancement layer. Moreover, in order to guarantee real time reproduction, before a selection is made or when the bandwidth is severely limited, the display apparatus can reduce delay between the point in time at which the leading picture is decoded and the point in time at which the decoded picture is displayed (that is, the delay between the start of the decoding of the content to the displaying of the content) by decoding and displaying only forward reference pictures (I picture, P picture, forward reference B picture). Moreover, the display apparatus may purposely ignore the reference relationship between pictures and coarsely decode all B and P pictures as forward reference pictures, and then perform normal decoding as the number of pictures received over time increases.

(Autonomous Driving)

When transmitting and receiving still image or video data such two- or three-dimensional map information for autonomous driving or assisted driving of an automobile, the reception terminal may receive, in addition to image data belonging to one or more layers, information on, for example, the weather or road construction as metadata, and associate the metadata with the image data upon decoding. Note that metadata may be assigned per layer and, alternatively, may simply be multiplexed with the image data.

In such a case, since the automobile, drone, airplane, etc., including the reception terminal is mobile, the reception terminal can seamlessly receive and decode while switching between base stations among base stations ex106 through ex110 by transmitting information indicating the position of the reception terminal upon reception request. Moreover, in accordance with the selection made by the user, the situation of the user, or the bandwidth of the connection, the reception terminal can dynamically select to what extent the metadata is received or to what extent the map information, for example, is updated.

With this, in content providing system ex100, the client can receive, decode, and reproduce, in real time, encoded information transmitted by the user.

(Streaming of Individual Content)

In content providing system ex100, in addition to high image quality, long content distributed by a video distribution entity, unicast or multicast streaming of low image quality, short content from an individual is also possible. Moreover, such content from individuals is likely to further increase in popularity. The server may first perform editing processing on the content before the encoding processing in order to refine the individual content. This may be achieved with, for example, the following configuration.

In real-time while capturing video or image content or after the content has been captured and accumulated, the server performs recognition processing based on the raw or encoded data, such as capture error processing, scene search processing, meaning analysis, and/or object detection processing. Then, based on the result of the recognition processing, the server—either when prompted or automatically—edits the content, examples of which include: correction such as focus and/or motion blur correction; removing low-priority scenes such as scenes that are low in brightness compared to other pictures or out of focus; object edge adjustment; and color tone adjustment. The server encodes the edited data based on the result of the editing. It is known that excessively long videos tend to receive fewer views. Accordingly, in order to keep the content within a specific length that scales with the length of the original video, the server may, in addition to the low-priority scenes described above, automatically clip out scenes with low movement based on an image processing result. Alternatively, the server may generate and encode a video digest based on a result of an analysis of the meaning of a scene.

Note that there are instances in which individual content may include content that infringes a copyright, moral right, portrait rights, etc. Such an instance may lead to an unfavorable situation for the creator, such as when content is shared beyond the scope intended by the creator. Accordingly, before encoding, the server may, for example, edit images so as to blur faces of people in the periphery of the screen or blur the inside of a house, for example. Moreover, the server may be configured to recognize the faces of people other than a registered person in images to be encoded, and when such faces appear in an image, for example, apply a mosaic filter to the face of the person. Alternatively, as pre- or post-processing for encoding, the user may specify, for copyright reasons, a region of an image including a person or a region of the background be processed, and the server may process the specified region by, for example, replacing the region with a different image or blurring the region. If the region includes a person, the person may be tracked in the moving picture the head region may be replaced with another image as the person moves.

Moreover, since there is a demand for real-time viewing of content produced by individuals, which tends to be small in data size, the decoding device first receives the base layer as the highest priority and performs decoding and reproduction, although this may differ depending on bandwidth. When the content is reproduced two or more times, such as when the decoding device receives the enhancement layer during decoding and reproduction of the base layer and loops the reproduction, the decoding device may reproduce a high image quality video including the enhancement layer. If the stream is encoded using such scalable encoding, the video may be low quality when in an unselected state or at the start of the video, but it can offer an experience in which the image quality of the stream progressively increases in an intelligent manner. This is not limited to just scalable encoding; the same experience can be offered by configuring a single stream from a low quality stream reproduced for the first time and a second stream encoded using the first stream as a reference.

(Other Usage Examples)

The encoding and decoding may be performed by LSI ex500, which is typically included in each terminal. LSI ex500 may be configured of a single chip or a plurality of chips. Software for encoding and decoding moving pictures may be integrated into some type of a recording medium (such as a CD-ROM, a flexible disk, or a hard disk) that is readable by, for example, computer ex111, and the encoding and decoding may be performed using the software. Furthermore, when smartphone ex115 is equipped with a camera, the video data obtained by the camera may be transmitted. In this case, the video data is coded by LSI ex500 included in smartphone ex115.

Note that LSI ex500 may be configured to download and activate an application. In such a case, the terminal first determines whether it is compatible with the scheme used to encode the content or whether it is capable of executing a specific service. When the terminal is not compatible with the encoding scheme of the content or when the terminal is not capable of executing a specific service, the terminal first downloads a codec or application software then obtains and reproduces the content.

Aside from the example of content providing system ex100 that uses internet ex101, at least the moving picture encoding device (image encoding device) or the moving picture decoding device (image decoding device) described in the above embodiments may be implemented in a digital broadcasting system. The same encoding processing and decoding processing may be applied to transmit and receive broadcast radio waves superimposed with multiplexed audio and video data using, for example, a satellite, even though this is geared toward multicast whereas unicast is easier with content providing system ex100.

(Hardware Configuration)

Figure 47:
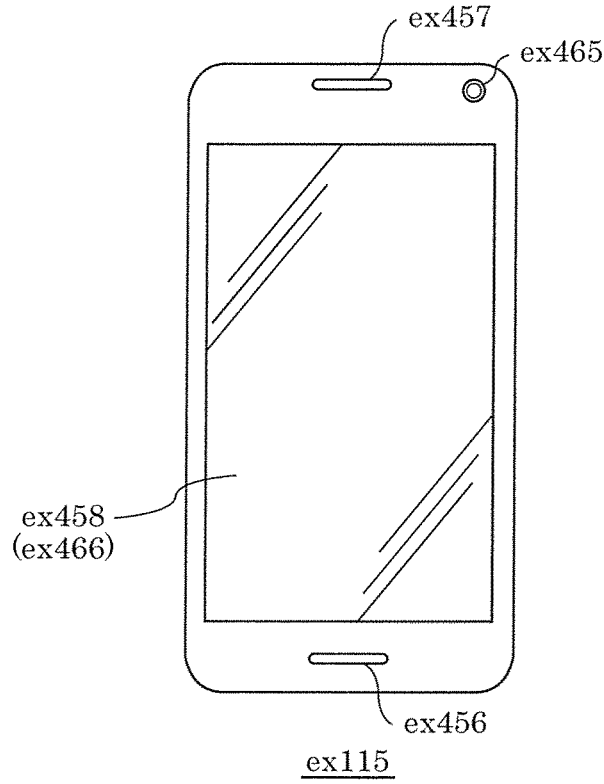
FIG. 47 illustrates one example of a smartphone.
Figure 48:
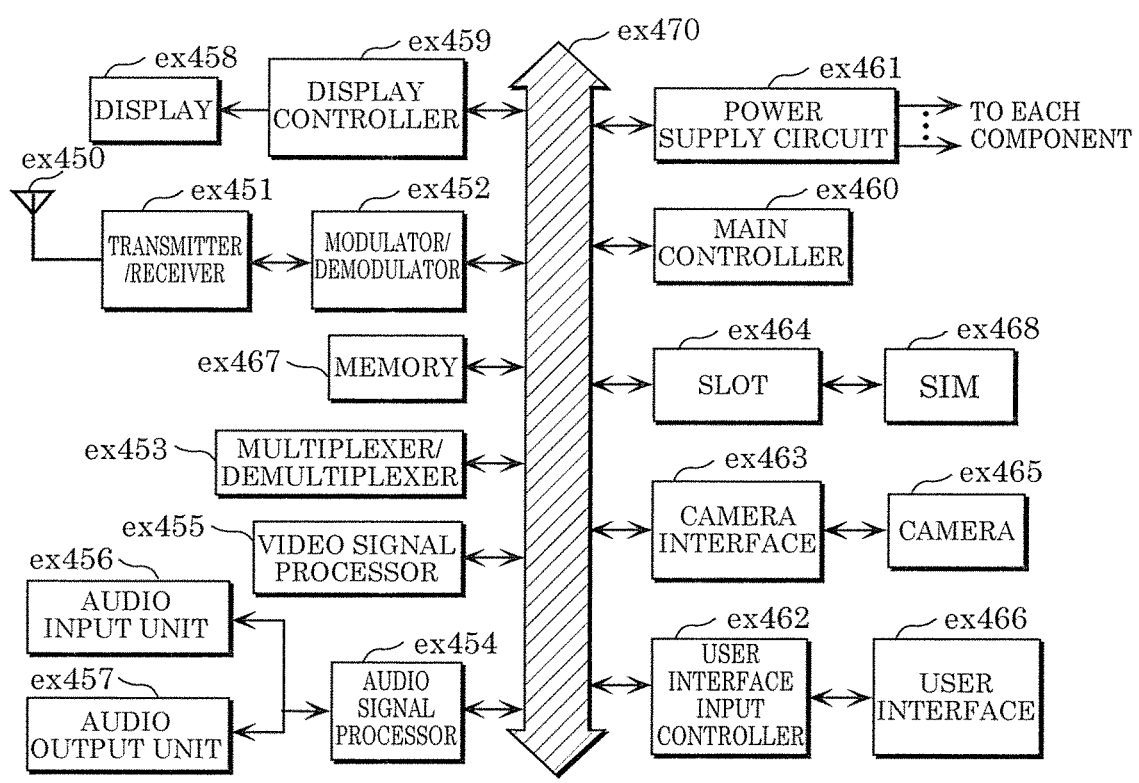
FIG. 48 is a block diagram illustrating a configuration example of a smartphone.

FIG. 47 illustrates smartphone ex115. FIG. 48 illustrates a configuration example of smartphone ex115. Smartphone ex115 includes antenna ex450 for transmitting and receiving radio waves to and from base station ex110, camera ex465 capable of capturing video and still images, and display ex458 that displays decoded data, such as video captured by camera ex465 and video received by antenna ex450. Smartphone ex115 further includes user interface ex466 such as a touch panel, audio output unit ex457 such as a speaker for outputting speech or other audio, audio input unit ex456 such as a microphone for audio input, memory ex467 capable of storing decoded data such as captured video or still images, recorded audio, received video or still images, and mail, as well as decoded data, and slot ex464 which is an interface for SIM ex468 for authorizing access to a network and various data. Note that external memory may be used instead of memory ex467.

Moreover, main controller ex460 which comprehensively controls display ex458 and user interface ex466, power supply circuit ex461, user interface input controller ex462, video signal processor ex455, camera interface ex463, display controller ex459, modulator/demodulator ex452, multiplexer/demultiplexer ex453, audio signal processor ex454, slot ex464, and memory ex467 are connected via bus ex470.

When the user turns the power button of power supply circuit ex461 on, smartphone ex115 is powered on into an operable state by each component being supplied with power from a battery pack.

Smartphone ex115 performs processing for, for example, calling and data transmission, based on control performed by main controller ex460, which includes a CPU, ROM, and RAM. When making calls, an audio signal recorded by audio input unit ex456 is converted into a digital audio signal by audio signal processor ex454, and this is applied with spread spectrum processing by modulator/demodulator ex452 and digital-analog conversion and frequency conversion processing by transmitter/receiver ex451, and then transmitted via antenna ex450. The received data is amplified, frequency converted, and analog-digital converted, inverse spread spectrum processed by modulator/demodulator ex452, converted into an analog audio signal by audio signal processor ex454, and then output from audio output unit ex457. In data transmission mode, text, still-image, or video data is transmitted by main controller ex460 via user interface input controller ex462 as a result of operation of, for example, user interface ex466 of the main body, and similar transmission and reception processing is performed. In data transmission mode, when sending a video, still image, or video and audio, video signal processor ex455 compression encodes, via the moving picture encoding method described in the above embodiments, a video signal stored in memory ex467 or a video signal input from camera ex465, and transmits the encoded video data to multiplexer/demultiplexer ex453. Moreover, audio signal processor ex454 encodes an audio signal recorded by audio input unit ex456 while camera ex465 is capturing, for example, a video or still image, and transmits the encoded audio data to multiplexer/demultiplexer ex453. Multiplexer/demultiplexer ex453 multiplexes the encoded video data and encoded audio data using a predetermined scheme, modulates and converts the data using modulator/demodulator (modulator/demodulator circuit) ex452 and transmitter/receiver ex451, and transmits the result via antenna ex450.

When video appended in an email or a chat, or a video linked from a web page, for example, is received, in order to decode the multiplexed data received via antenna ex450, multiplexer/demultiplexer ex453 demultiplexer the multiplexed data to divide the multiplexed data into a bitstream of video data and a bitstream of audio data, supplies the encoded video data to video signal processor ex455 via synchronous bus ex470, and supplies the encoded audio data to audio signal processor ex454 via synchronous bus ex470. Video signal processor ex455 decodes the video signal using a moving picture decoding method corresponding to the moving picture encoding method described in the above embodiments, and video or a still image included in the linked moving picture file is displayed on display ex458 via display controller ex459. Moreover, audio signal processor ex454 decodes the audio signal and outputs audio from audio output unit ex457. Note that since real-time streaming is becoming more and more popular, there are instances in which reproduction of the audio may be socially inappropriate depending on the user's environment. Accordingly, as an initial value, a configuration in which only video data is reproduced, i.e., the audio signal is not reproduced, is preferable. Audio may be synchronized and reproduced only when an input, such as when the user clicks video data, is received.

Although smartphone ex115 was used in the above example, three implementations are conceivable: a transceiver terminal including both an encoding device and a decoding device; a transmitter terminal including only an encoding device; and a receiver terminal including only a decoding device. Further, in the description of the digital broadcasting system, an example is given in which multiplexed data obtained as a result of video data being multiplexed with, for example, audio data, is received or transmitted, but the multiplexed data may be video data multiplexed with data other than audio data, such as text data related to the video. Moreover, the video data itself rather than multiplexed data maybe received or transmitted.

Although main controller ex460 including a CPU is described as controlling the encoding or decoding processes, terminals often include GPUs. Accordingly, a configuration is acceptable in which a large area is processed at once by making use of the performance ability of the GPU via memory shared by the CPU and GPU or memory including an address that is managed so as to allow common usage by the CPU and GPU. This makes it possible to shorten encoding time, maintain the real-time nature of the stream, and reduce delay. In particular, processing relating to motion estimation, deblocking filtering, sample adaptive offset (SAO), and transformation/quantization can be effectively carried out by the GPU instead of the CPU in units of, for example pictures, all at once.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable to an image decoder and an image encoder. Specifically, the present disclosure is applicable to televisions, recorders, personal computers, digital still cameras, digital video cameras, and smartphones.

What is claimed is:
1. A decoder, comprising:
a processor; and
a memory, wherein
using the memory, the processor:
 for each of a plurality of sub-blocks obtained by splitting a current frame, obtains multiple motion vectors for the sub-block;
 for each of a plurality of processing blocks obtained by splitting each of the sub-blocks, selects a motion vector for the processing block from among the multiple motion vectors obtained for the sub-block from which the processing block is obtained; and
 for each of a plurality of determination blocks including at least four of the processing blocks,
  determines quantization control to be performed on the determination block by determining whether at least two of the at least four processing blocks included in the determination block have different motion vectors so as to determine whether the determination block is located in a boundary region between a foreground and a background in the current frame and (ii) determines the quantization control for the determination block according to whether the determination block is located in the boundary region, and
  inversely quantizes the determination block by the quantization control determined for the determination block.

2. The decoder according to claim 1, wherein
for each of the sub-blocks, the multiple motion vectors are obtained by calculation performed using decoded frames.

3. The decoder according to claim 1, wherein
the processor determines that the determination block is located in the boundary region when the at least two of the processing blocks have different motion vectors, the at least two of the processing blocks being adjacent to each other.

4. The decoder according to claim 1, wherein
a determination block not included in the boundary region is to be weighted for each of frequency components, and a determination block included in the boundary region is not to be weighted for each of frequency components.

5. The decoder according to claim 1, wherein
a quantization width of a first determination block included in the boundary region is set to a width greater than a quantization width of a second determination block not included in the boundary region.

6. The decoder according to claim 1, wherein
each of the determination blocks have a 4×4 pixel region.

7. A decoding method, comprising:
for each of a plurality of sub-blocks obtained by splitting a current frame, obtaining multiple motion vectors for the sub-block;
for each of a plurality of processing blocks obtained by splitting each of the sub-blocks, selecting a motion vector for the processing block from among the multiple motion vectors obtained for the sub-block from which the processing block is obtained; and
for each of a plurality of determination blocks including at least four of the processing blocks,
 determining quantization control to be performed on the determination block by determining whether at least two of the processing blocks included in the determination block have different motion vectors so as to determine whether the determination block is located in a boundary region between a foreground and a background in the current frame and (ii) determines the quantization control for the determination block according to whether the determination block is located in the boundary region, and
 inversely quantizing the determination block by the quantization control determined for the determination block.

8. A decoder, comprising:
a processor; and
a memory, wherein
using the memory, the processor:
 for each of a plurality of sub-blocks obtained by splitting a current frame, obtains multiple motion vectors for the sub-block;
 for each of a plurality of processing blocks obtained by splitting each of the sub-blocks, selects a motion vector for the processing block from among the multiple motion vectors obtained for the sub-block from which the processing block is obtained; and
 for each of a plurality of determination blocks including at least two of the processing blocks,
  determines quantization control to be performed on the determination block by determining whether the at least two of the processing blocks included in the determination block have different motion vectors so as to determine whether the determination block is located in a boundary region between a foreground and a background in the current frame and (ii) determines the quantization control for the determination block according to whether the determination block is located in the boundary region, and inversely quantizes the determination block by the quantization control determined for the determination block, a quantization width of a first quantization block included in the boundary region is set to a width greater than a quantization width of a second determination block not included in the boundary region.

* * * * *